United States Patent [19]
Morikawa et al.

[11] Patent Number: 5,671,463
[45] Date of Patent: Sep. 23, 1997

[54] IMAGE FORMING APPARATUS CAPABLE OF FORMING A PLURALITY OF IMAGES FROM DIFFERENT ORIGINALS ON A SINGLE COPY SHEET

[75] Inventors: Takeshi Morikawa; Kazuo Inui, both of Toyokawa, Japan

[73] Assignee: Minolta Co., Ltd., Osaka, Japan

[21] Appl. No.: 362,954

[22] Filed: Dec. 23, 1994

[30] Foreign Application Priority Data

Dec. 28, 1993 [JP] Japan ..................... 5-336821
Feb. 28, 1994 [JP] Japan ..................... 6-029686

[51] Int. Cl.⁶ .......................................... G03G 15/36
[52] U.S. Cl. .................. 399/86; 399/197; 399/370; 399/376
[58] Field of Search .................... 355/244, 243, 355/311; 399/86, 197, 370, 376

[56] References Cited

U.S. PATENT DOCUMENTS

| | | | |
|---|---|---|---|
| 4,721,381 | 1/1988 | Matsuo | 355/313 |
| 4,825,250 | 4/1989 | Miyata et al. | 355/218 |
| 4,924,265 | 5/1990 | Partilla et al. | 355/204 |
| 4,999,674 | 3/1991 | Miyata et al. | 355/218 |
| 5,079,598 | 1/1992 | Kaneko et al. | 355/309 |
| 5,099,336 | 3/1992 | Moriya | 355/244 X |
| 5,257,081 | 10/1993 | Kato et al. | 355/324 |
| 5,296,907 | 3/1994 | Kawabuchi et al. | 355/313 |
| 5,345,302 | 9/1994 | Hamakawa | 355/311 |
| 5,475,475 | 12/1995 | Kohtani et al. | 355/244 |

FOREIGN PATENT DOCUMENTS

| | | |
|---|---|---|
| 61-62088 | 3/1986 | Japan . |
| 3-51864 | 3/1991 | Japan . |
| 5-244388 | 9/1993 | Japan . |

*Primary Examiner*—Nestor Ramirez
*Attorney, Agent, or Firm*—Burns, Doane, Swecker & Mathis, LLP

[57] ABSTRACT

In the present invention, the image data of a plurality of sheets are separately and appropriately enlarged or reduced so as to be formed on a single copy sheet by independently controlling at output the magnification of the respective images in accordance with the size of the copy sheet and the image data separately stored in the memory means. Furthermore, when a first mode for copying a plurality of original documents on a single copy sheet, and a second mode for copying only a cover page on a copy sheet different from the copy sheet of the other original documents, are simultaneously selected, the cover page is copied on a cover page copy sheet and a plurality of the other original documents are copied on a single copy sheet.

7 Claims, 50 Drawing Sheets

FIG.30
documents
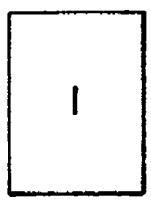 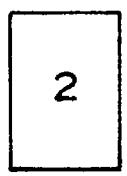 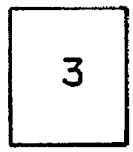 
A4    B5    A5    A6
A4→A5 reduction    B5→A5 reduction    ×1.00    A6→A4 enlargement
copy sheets
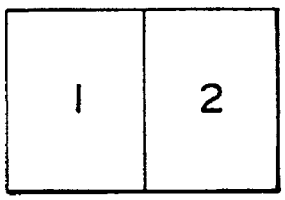 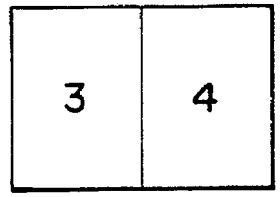
A4    A4

FIG. 31

| page | document size | appended inf. (mag. rate) |
|---|---|---|
| 1 | A4 | ×0.707 |
| 2 | B5 | ×0.813 |
| 3 | A5 | ×1 |
| 4 | A6 | ×1.410 |
| ⋮ | ⋮ | ⋮ |
| N−1 | B5 | ×0.813 |
| N | A4 | ×0.707 |

IMAGE FORMING APPARATUS CAPABLE OF FORMING A PLURALITY OF IMAGES FROM DIFFERENT ORIGINALS ON A SINGLE COPY SHEET

BACKGROUND OF THE INVENTION

1. Field of the Invention

The present invention relates to an image forming apparatus. More specifically, the present invention relates to an image forming apparatus capable of distinguishing between a document sheet and a cover sheet, and to an image forming apparatus capable of controlling magnification of a copy based on the size of the original document.

2. Discussion of Related Art

In a conventional electrophotographic copying apparatus, automatic document feeders (hereinafter referred to as "ADF") are widely used for ease of document handling and to increase copying speed. Various operation modes have been developed and utilized, e.g., special page modes such as a cover page mode and a partition page mode.

The cover page mode uses a first document page among a plurality of documents as a cover page (the last document page may also be the back cover page), and supplies a copy sheet that is different from the copy sheets of the main body of documents when copying the cover page document.

The partition page mode specifies a particular document page among a plurality of document pages as a partition page, and supplies a copy sheet that is different from the copy sheets of the main body of documents when copying the partition page document. In the cover page/partition page mode, copy processing is not performed for the cover page or partition page.

When an ADF is used in a conventional partition page mode, an operator enters the number of the document page to specify the insertion position of the partition page. However, such an arrangement is disadvantageous insofar as it requires operator labor and is susceptible to error.

In the special page modes, a special original document corresponding to a cover page, back page, partition paper or the like may be copied using either a copy sheet which is different from the common original document pages, or may be developed using a different color toner.

The two-in-one mode is an operation mode that also uses an ADF. The two-in-one mode arranges two original documents on a document platen, and copies the images of said documents on a single copy sheet. For example, when two horizontal A4 size (the short edge of the sheet being placed parallel to the sheet transport direction) documents are arranged on a document platen, the images of said documents are copied at a magnification of 0.707 on a vertical A4 size copy sheet (the long edge of the sheet being placed parallel to the sheet transport direction). The two-in-one mode is extremely economical inasmuch as the number of required copy sheets can be reduced by half. In this connection, the operation mode for copying a single document on a single copy sheet is called the one-to-one mode.

Copying accomplished by means of a combination of the previously described special page mode and two-in-one mode is disadvantageous, inasmuch as the cover page copy sheet must accommodate two document pages per the requirements of the two-in-one mode, irrespective of the fact that a cover page document is typically one page. Furthermore, the cover page is difficult to read because the two-in-one mode utilizes image reductions when copying. Accordingly, an operator must separate the cover page document from the main body of documents, and make copies using the two-in-one mode for said main body of documents, while copying the cover page using the one-to-one mode, thereby increasing the labor involved.

Digital copying apparatus having a two-in-one function for copying two consecutive original documents onto the same surface of a single copy sheet are also available commercially.

In a copying apparatus having the aforesaid two-in-one function, when copying two original documents of the same size at the same copy magnification, one original document can be copied to one half of a surface of a copy sheet, and another original document can be copied to another one half of the same surface of the copy sheet, thereby producing copy output having an excellent appearance. However, when the two original documents are not the same size and both are copied onto a copy sheet at the same copy magnification a disadvantage arises inasmuch as the image of one of said original documents copied onto the copy sheet exceeds one half of said copy sheet, such that an excellent appearance is not achieved.

When making a two-in-one copy in the cover page mode, a first document sheet and a second document sheet, i.e., two original documents comprising a cover page document and a first page of the normal documents, are copied using a cover page copy sheet or developed in a different cover page color. Conventionally, even though the cover page original document and the normal original document are identified and specified to be copied onto separate copy sheets, a disadvantage arises inasmuch as the user cannot produce a desired copy by copying both original documents onto the same surface of a single copy sheet.

SUMMARY

An object of the present invention is to provide an image forming apparatus capable of automatically identifying cover page documents and/or partition page documents, and executing a special page mode.

Another object of the present invention is to provide an image forming apparatus capable of readily making visually pleasing copies when combining a special page mode and a two-in-one mode.

Yet another object of the present invention is to provide a copying apparatus having a function for copying a plurality of original documents onto a single copy sheet, and which is capable of producing copies desired by a user.

Another object of the present invention is to provide a copying apparatus having a function for copying a plurality of original documents onto a single copy sheet, wherein images of uniform size are output on a copy sheet even when original documents of dissimilar size are copied onto the same copy sheet.

A still further object of the present invention is to provide a copying apparatus having a function for copying a plurality of original documents onto a single copy sheet, wherein the copy output desired by a user can be obtained even when copying in the cover page mode.

According to one embodiment of the present invention, the image data of a plurality of sheets are separately and appropriately enlarged or reduced so as to be formed on a single copy sheet by independently controlling at output the magnification of the respective images in accordance with the size of the copy sheet and the image data separately stored in the memory means.

In another embodiment of the present invention, when a first mode for copying a plurality of original documents on a single copy sheet, and a second mode for copying only a cover page on a copy sheet different from the copy sheet of the other original documents, are simultaneously selected, the cover page is copied on a cover page copy sheet and a plurality of the other original documents are copied on a single copy sheet.

In another embodiment, the present invention provides an image forming apparatus comprising:

document transporting means for sequentially transporting a group of original documents to a predetermined position on a document platen one by one, said group of original documents including main body pages and partition pages which have a dimension different from the main body pages;

image forming means for forming an image of each of the original documents on a respective copy sheet in synchronization with an operation of said document transporting means;

sheet supplying means having a plurality of supply portions, and which feeds copy sheets one sheet at a time from a selected one of the supply portions to said image forming means;

detection means for detecting a dimension of each of the original documents while said original document is being transported to said predetermined position; and control means for controlling the sheet supplying means in accordance with a detection of said detection means so as to supply a copy sheet for the partition pages from a supply portion different from a supply portion for the main body pages image forming means for forming an original document image on a copy sheet by means of an electrophotographic method.

The present invention further provides that document size is automatically detected by a detection means when special documents (e.g., partition page document or cover page document) and non-special documents (e.g., main body of documents) of different sizes are transported by an ADF, such that, in the case of a special document, a partition page or cover page copy sheet is fed from a supply aperture that is different from the supply aperture for non-special documents. Accordingly, an operator need not enter each insertion position for partition pages via the operation panel, thereby eliminating such labor and the possibility of error.

The aforesaid image forming apparatus may be provided with a counting means for entering the number of sheets in a group of documents, and counting the number of transported documents. When the previously mentioned special document specifying means detects a document of a specific size, a determination is made as to whether or not said document is a cover page document or partition page document via the count value of the counting means. In such circumstances, if the first page of the document is a specific size, this document is designated a back cover page document. If a document page other than the first page or last page is a specific size, this document is designated a partition page document.

BRIEF DESCRIPTION OF THE DRAWINGS

FIG. 30 is an illustration showing the relationship between an original document and the image on a copy sheet;

FIG. 31 is an illustration showing the contents of the document management table of the copying apparatus of FIG. 23;

DETAILED DESCRIPTION OF THE PREFERRED EMBODIMENTS

The preferred embodiments of the image forming apparatus of the present invention are described hereinafter with reference to the accompanying drawings.

Construction and Operation of the Copying Apparatus

Figure 1:
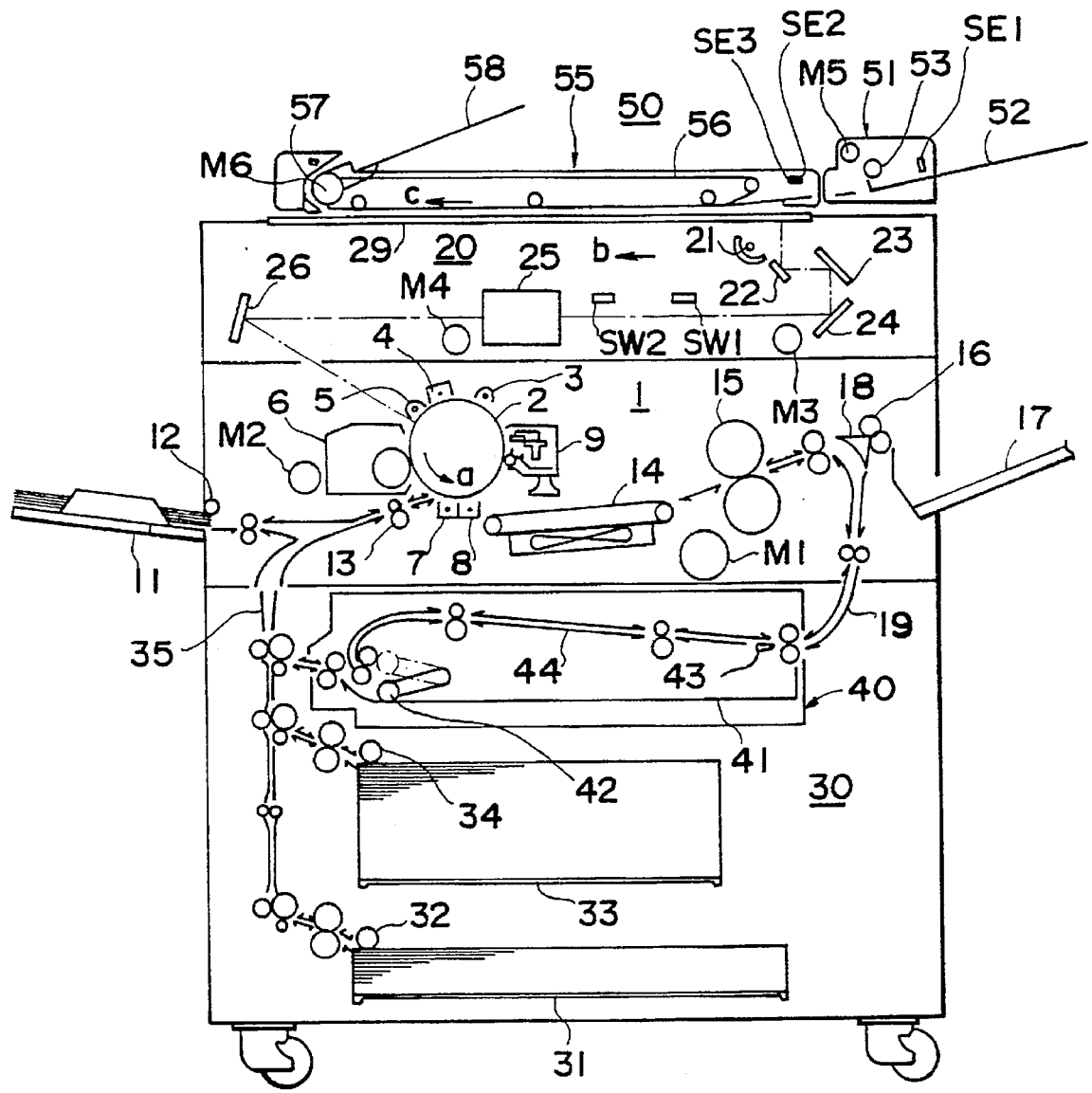
FIG. 1 shows the construction of an electrophotographic copying apparatus which is an embodiment of the image forming apparatus of the present invention.

As shown in FIG. 1, an image forming section 1 is provided in the center section of the copying apparatus body, an exposure optical unit 20 is provided in the top section thereof, and a paper supply section 30 is provided in the bottom section thereof. An automatic document feeder (ADF) 50 is provided on top of the copying apparatus body.

The forming section 1 is centrally provided with a photosensitive drum 2 which is rotatably driven in the arrow "a" direction. Arranged sequentially around the periphery of said photosensitive drum 2 in the direction of rotation are: a residual load eraser lamp 3, a charger 4, an image edge/image interval eraser 5, a developing device 6, transfer charger 7, copy paper separation charger 8, and a residual toner cleaner 9. The construction of the image forming elements, and the image forming process are well known and thus are omitted from the present description.

The optical unit 20 comprises an exposure lamp 21, movable mirrors 22, 23, 24, an image forming lens 25, and a stationary mirror 26. Lamp 21 and mirror 22 are integratedly movable in the arrow "b" direction as a single unit at a speed v/m (where v is the circumferential speed of photosensitive drum 2, and m is the copy magnification). Movable mirrors 23 and 24 are integratedly movable in the arrow "b" direction as a single unit at a speed v/2m. An original document is placed on document platen 29, and the image of said document is exposed in slit-like manner on the surface of the photosensitive drum 2 via the movement of lamp 21, and mirrors 22, 23, 24 in the arrow "b" direction.

The optical unit 20 is provided with switches SW1 and SW2 to detect the movement position. Switch SW1 detects whether or not optical unit 20 is at standby at the home position. Switch SW2 emits a signal as a reference for timing the transport of a copy sheet to the transfer section.

Paper supply section 30 is provided with cassette type supply aperture 31, elevator type supply aperture 33, and refeeding unit 40. Copy sheets are normally fed one sheet at a time via the rotation of feed rollers 32 and 34, and are transported through transport path 35 to timing roller 13. A copy sheet is temporarily stopped at timing roller 13, then is transported to the transfer section via timing roller 13 synchronously with an image formed on the surface of photosensitive drum 2. After image transfer, the copy sheet is transported to fixing unit 15 via transport belt 14, whereupon the toner image is fused onto said copy sheet which is subsequently discharged to discharge tray 17 via discharge roller 16.

The copying apparatus is also provided with a manual feed aperture 11. Manual feed aperture 11 allows a plurality of copy sheets stacked thereon to be fed one sheet at a time to the timing roller 13 based on the rotation of a feed roller 12.

An operator preselects the desired paper supply aperture 31, 33, or 11.

Refeeding unit 40 is used for processing duplex and composite copies, and is provided with an intermediate tray 41 having a refeeding roller 42, and a path selector member 43, and an inverting path 44. In order to transport a copy sheet to the refeeding unit 40, a path selector member 18 is provided immediately in front of the discharge roller 16, and a transport path 19 is provided which extends from said selector member 18 to the refeeding unit 40.

When the duplex copy mode is selected, a copy sheet which as been copied on one side thereof is directed via the selector member 18 to the transport path 19, and accommodated directly on the intermediate tray 41 via selector member 43 so as to have the image surface facing upward. When the composite copy mode is selected, a copy sheet which has been copied on one side thereof is directed to an inverting path 44 via selector member 43, and is accommodated on intermediate tray 41 so as to have the image surface facing downward. During refeeding, copy sheets are fed one sheet at a time from the intermediate tray 41 in accordance with the rotation of a refeeding roller 42, and are transported to the timing roller 13.

The photosensitive drum 2 and the copy sheet transport system are rotatably driven via various clutches and the like by a main motor M1. The developing device 6 is rotatably driven by a developing motor M2. The optical unit 20 is driven in the arrow "b" direction and the opposite direction by a scanning motor M3, and the image forming lens 25 is moved via lens motor M4 to predetermined positions on the optical axis when changing the copy magnification.

ADF Construction and Operation

The ADF 50 comprises a document supply section 51 and a document transport section 55. This supply section 51 is provided with a feed roller 53 at the leading edge of document tray 52, and a sensor SE1 is provided on the tray 52 to detect the presence or absence of a document. Feed roller 53 is rotatably driven by feed motor M5 so as to transport documents one sheet at a time in page sequence from the document tray 52 onto a document platen 29.

Transport section 55 is provided with a document discharge tray 58 and an endless transport belt 56 which is rotatably driven in the arrow "c" direction. Transport belt 56 transports a document fed from the supply section 51 to a predetermined position on the document platen 29, and then stops. At this time, the document is scanned by the optical unit 20, and the scanned image is exposed on the surface of the photosensitive drum 2 which is rotating in the arrow "a" direction. After exposure, transport belt 56 is again rotatably driven, and the document is discharged through a discharge path 57 to the discharge tray 58.

Figure 6:
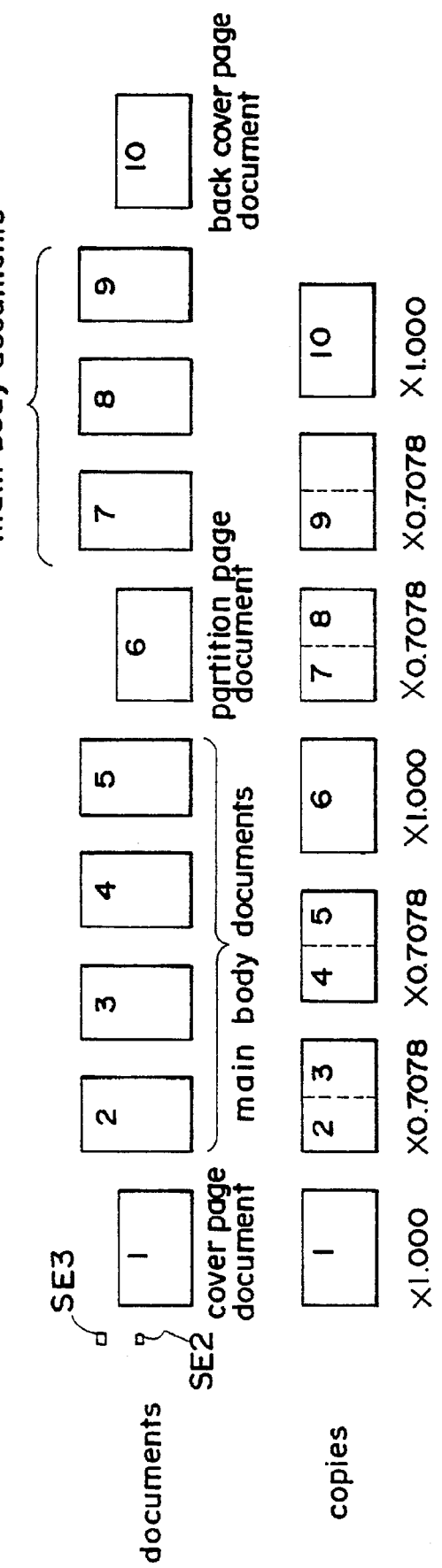
FIG. 6 is an illustration showing copies when the cover page/partition page mode and the two-in-one mode are used in combination in the aforesaid copying apparatus.

Transport belt 56 is rotatably driven by motor M6. Transport section 55 is provided with sensors SE2 and SE3 to detect fed documents. Sensor SE2 is disposed adjacent to a position by which documents of all sizes pass, as shown in FIG. 6, and detects the length of a document by means of the timing interval of switching ON and OFF which is timed by a timer. Sensor SE3 is disposed at a position to detect horizontally fed A4 size documents without detecting vertically fed A4 size documents, and detects a horizontally fed A4 size document and vertically fed A4 size document via its ON/OFF state.

Transport section 55 can be opened upward by pivoting on the interior side. Thus, an operator can manually place a document on document platen 29.

Operation Modes

The aforesaid copying apparatus is capable of making copies by the operation modes described below, and these operation modes are discussed in terms of the use of ADF 50.

One-in-one mode: a single document is transported one sheet at a time by ADF 50 to a predetermined position on document platen 29, where the document is stopped, and an image is formed on a single copy sheet. Supply apertures 31, 33, and 11 are previously selected by the operator. Copy magnification is also optionally settable.

Duplex copy mode/composite copy mode: further description is omitted.

Two-in-one mode: two documents are consecutively fed by ADF 50 to predetermined positions on document platen 29 so as to be aligned side by side in the document transport direction, where the documents are stopped, and the images of both documents are copied onto the same surface of a single copy sheet. If the documents are A4 size, said documents are on tray 52 in the horizontal direction (short edge of document being parallel to the transport direction), and conform to a vertical A3 size document when aligned side by side on document platen 29. When copying to a vertical A4 size copy sheet, the copy magnification is set at 0.7078.

Cover page mode/partition page mode: If a document (detected by sensor SE3) of a different size or orientation is the first page among a group of documents, said document is designated a cover page document; if said document is the last page it is designated a back cover page document; if said document is in an intermediate position in the group, it is designated a partition page document (all other documents are common documents). Copy sheets for cover page documents and back cover page documents are fed from a supply aperture previously selected by an operator, and a copy is made. Copy sheets for a partition page document are fed from a supply aperture previously selected by an operator, and copies are made. In the cover page/partition page mode, common documents are typically fed horizontally, i.e., with the short edge of the document being parallel to the transport direction. Cover page, back cover page, and partition page documents are typically fed in a vertical direction from the document tray 52 of ADF 50. The control circuit described later is provided with an internal counter for counting the number of remaining documents. The counter subtracts each document fed form the number of documents entered by an operator. Vertically fed A4 size cover page documents, back cover page documents, and partition page documents are not detected by the sensor SE3, such that when sensor SE3 is switched OFF during paper supply, a first page document is designated a cover page document, a last page document is designated a back cover page document, and a nonfirst page, nonlast page document is designated a partition page document.

A combination mode combining the cover page/partition page mode and the two-in-one mode is described hereinafter.

As shown in FIG. 6, the combination mode uses horizontally fed A4 size main body "common" documents, and vertically fed A4 size special documents (cover page document, back cover page document, partition page document). In the combination mode, the images of the common documents are formed on a vertical A4 size copy sheet at a magnification of 0.7078 using the two-in-one mode. The images of special documents, if they are a cover page document or back cover page document, are copied on copy sheets fed from a supply aperture accommodating cover pages at equal magnification using the one-in-one mode. The image of special documents, if a partition page document, are copied on copy sheets fed from a supply aperture accommodating partition pages at equal magnification using the one-in-one mode.

FIG. 6 shows an example of a copy of a ten page original document. The first page cover page document is copied to a cover page at equal magnification, the second through fifth pages of the common documents are reduced (0.7078 magnification) and copied to pages 2, 3 and pages 4, 5 via the two-in-one mode. The sixth page partition page document is copied on a partition page at equal magnification. The seventh and eighth pages of the common documents are reduced, and copied using the two-in-one mode. The ninth page of the common documents is reduced and copied via the two-in-one mode, and the copy sheet is blank on the right half. Finally, the tenth page back cover page document is copied to a cover page at equal magnification.

Although the present invention has been described above with respect to two-in-one copying, the same principles are equally applicable to combining a special page mode with duplex copying. In duplex copying, images are printed on both sides of a copy sheet. Thus, a two page document may be printed on one sheet. Duplex copying is well known in the art, and thus further details thereof are omitted.

In accordance with the duplex mode-combination mode, and with reference to FIG. 6, pages 1 and 10 would be copied onto cover page sheets and page 6 would be copied onto a partition page sheet, as described above. Pages 2–5 and 7–9, i.e., the horizontally fed documents, would be copied in a duplex copying mode at equal magnification. Of course, the opposite side of the sheet containing page 9 would be blank.

Digital Copying Apparatus

Figure 7:
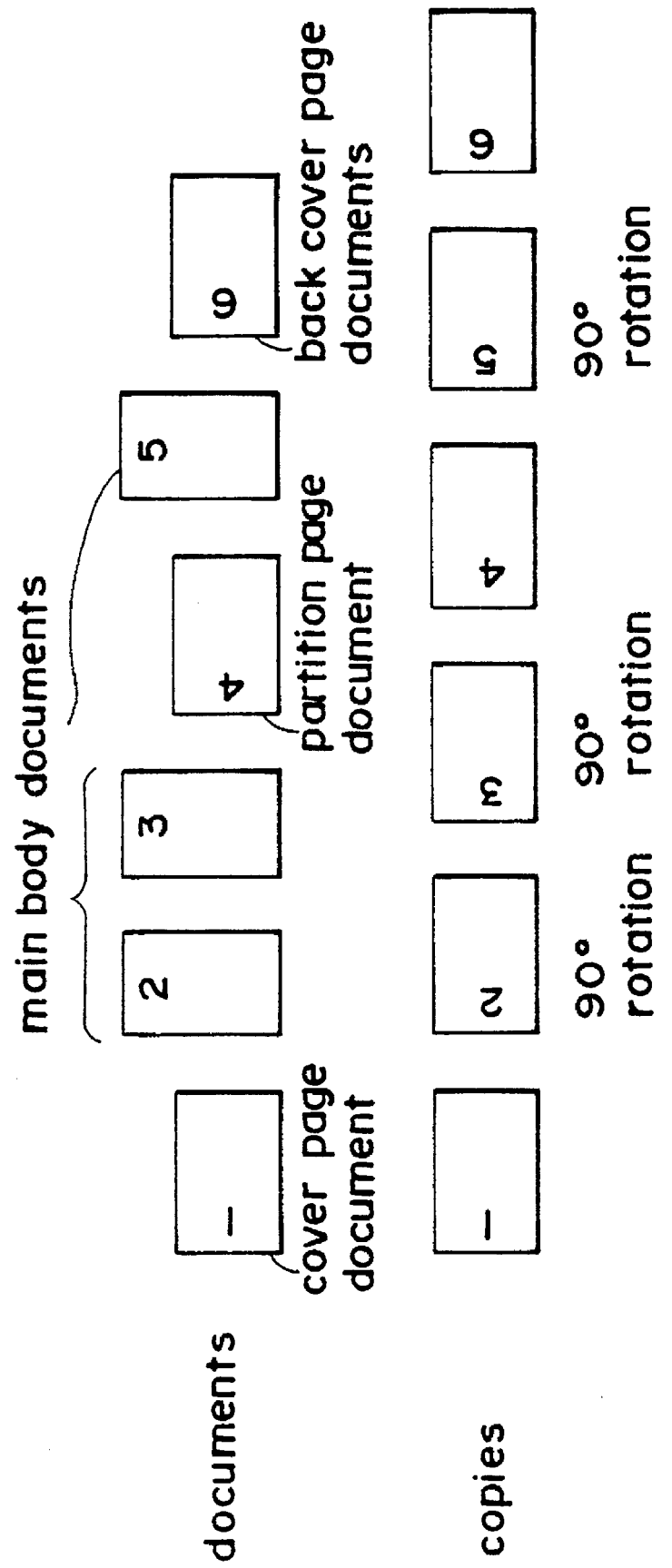
FIG. 7 is an illustration showing copies when the cover page/partition page mode and an image rotation mode are used in combination in a digital copying apparatus.

When the copying apparatus is a digital copying apparatus, i.e., when said apparatus is a type provided with an image reader for optically reading document images and which forms an image on the surface of a photosensitive member by driving a laser beam optical system based on image data read by said image reader, the image direction of the copy discharged to tray 17 can be manipulated by combining an image rotation mode when processing via the cover page/partition page mode in the one-to-one mode. For example, as shown in FIG. 7, a first page cover page document, fourth page partition page document, and sixth page back cover page document are copied on vertical size cover pages and partition page, and the second, third, and fifth pages of common documents are scanned and the read image data are rotated 90°, and copied on vertical size copy sheets.

Operation Panel Construction

Figure 2:
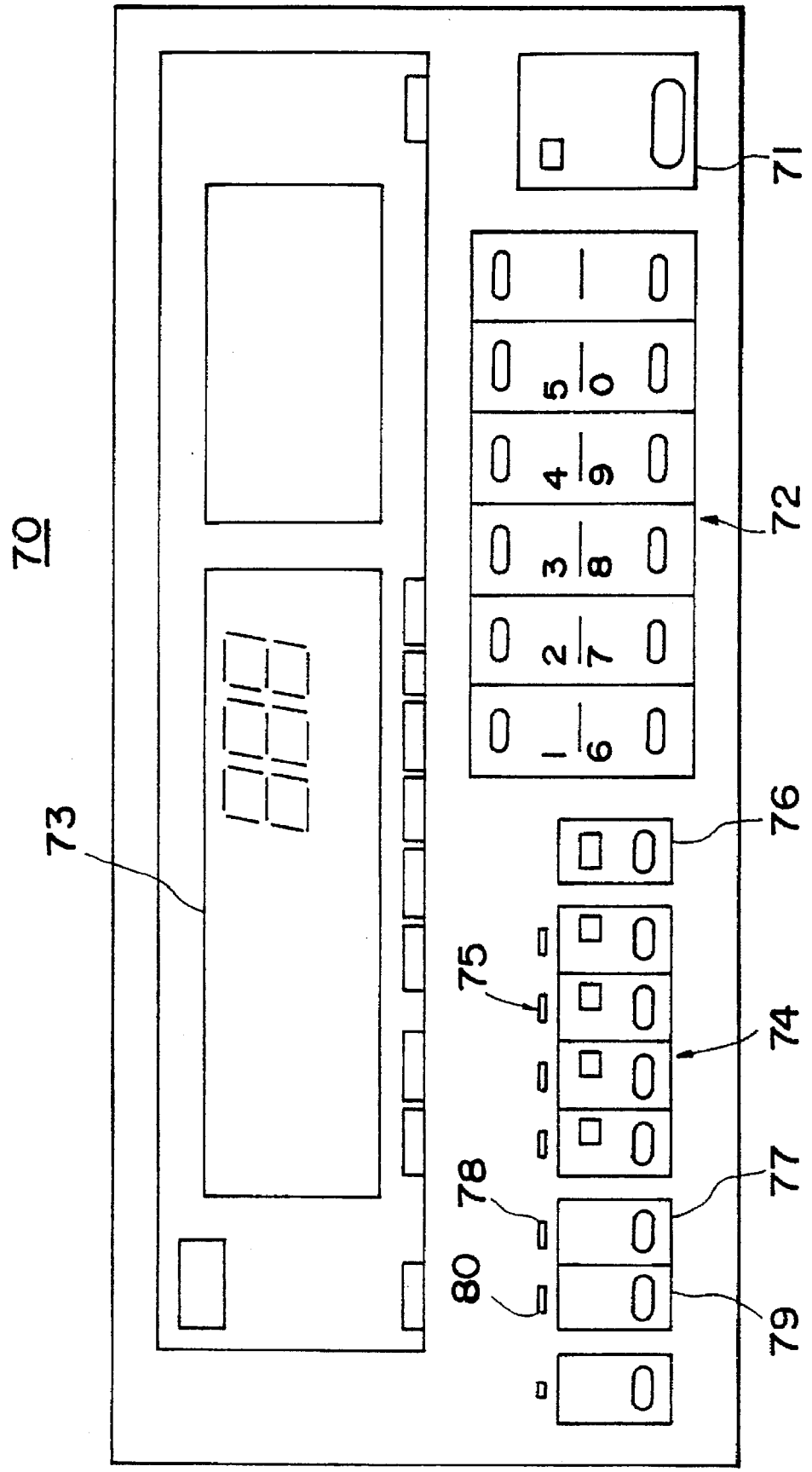
FIG. 2 is a plan view of the operation panel of said copying apparatus of FIG. 1.

FIG. 2 shows an operation panel 70 provided on the body of the copying apparatus. Operation panel 70 is provided with the keys and displays described below.

Copy start key 71: starts the copy operation.

Ten-key pad 72: enters numerical values for number of copies, number of documents and the like.

Fluorescent display 73: displays numerical values input by ten-key pad 72, and copy apparatus states.

Copy magnification setting keys 74: touch entry of various preset copy magnifications.

LED 75: displays input from keys 74.

Document number entry key 76: enters number of documents set on ADF 50. The number of documents is input by ten-key pad 72, and said document number is displayed on fluorescent display 73 and the control circuit internal counter (described later) is started by switching ON key 76.

Two-in-one mode setting key 77: selects the two-in-one mode.

LED 78: displays two-in-one mode selected by key 77.

Cover page/partition page setting key 79: selects the cover page/partition page mode.

LED 80: displays the cover page/partition page mode selected by key 79.

Operation panel 70 is also provided (although not illustrated) with a duplex copy mode setting key, a composite copy mode setting key, a copy sheet size display for copy sheets accommodated in supply apertures 31 and 33, and supply aperture 31, 33, and 11 selection keys, and the like. The supply aperture selection keys select the supply apertures for cover page document copies, and partition page copies.

Control Circuit

Figure 3:
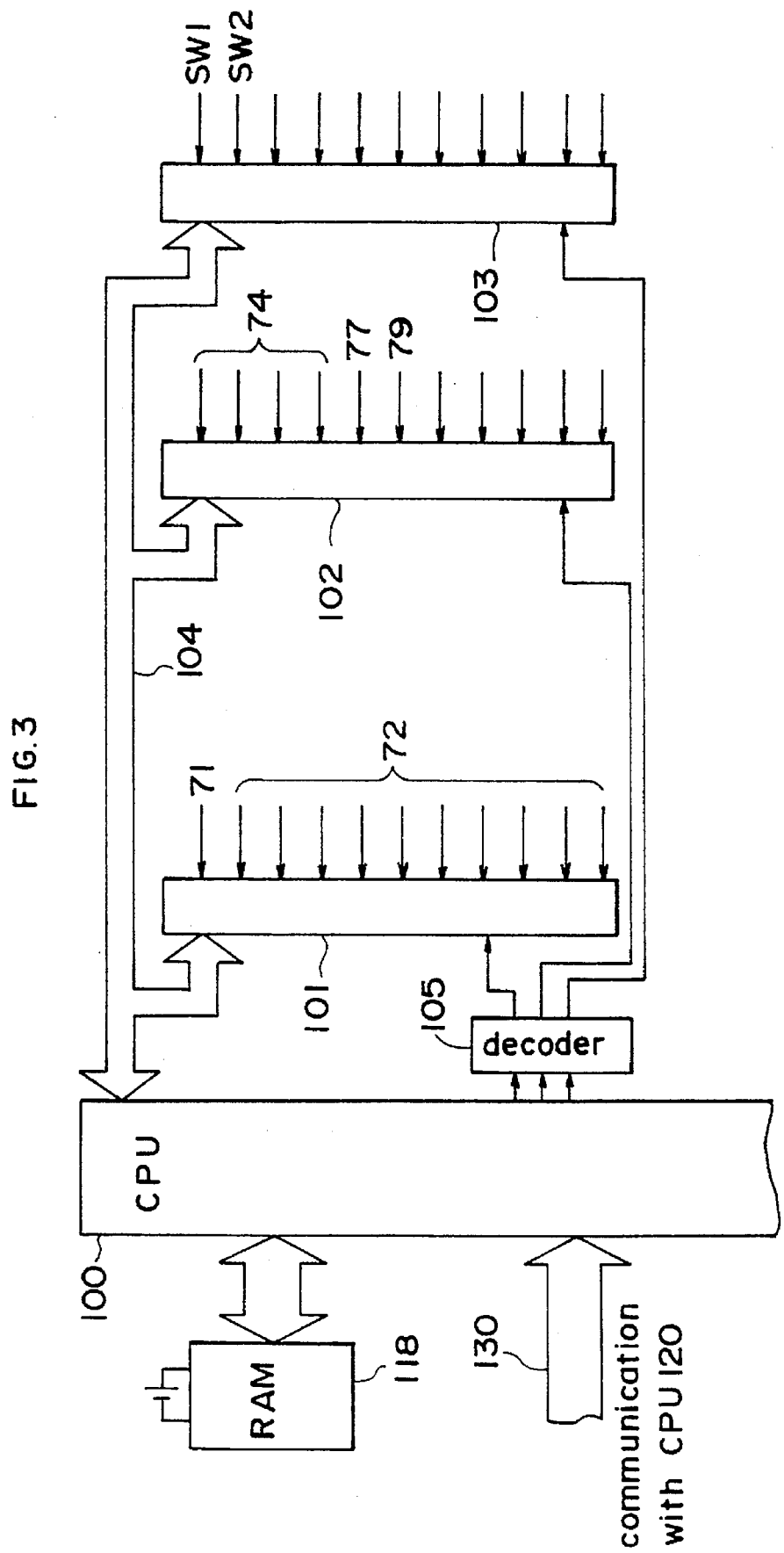
FIG. 3 is a block diagram of the control circuit of said copying apparatus of FIG. 1.
Figure 4:
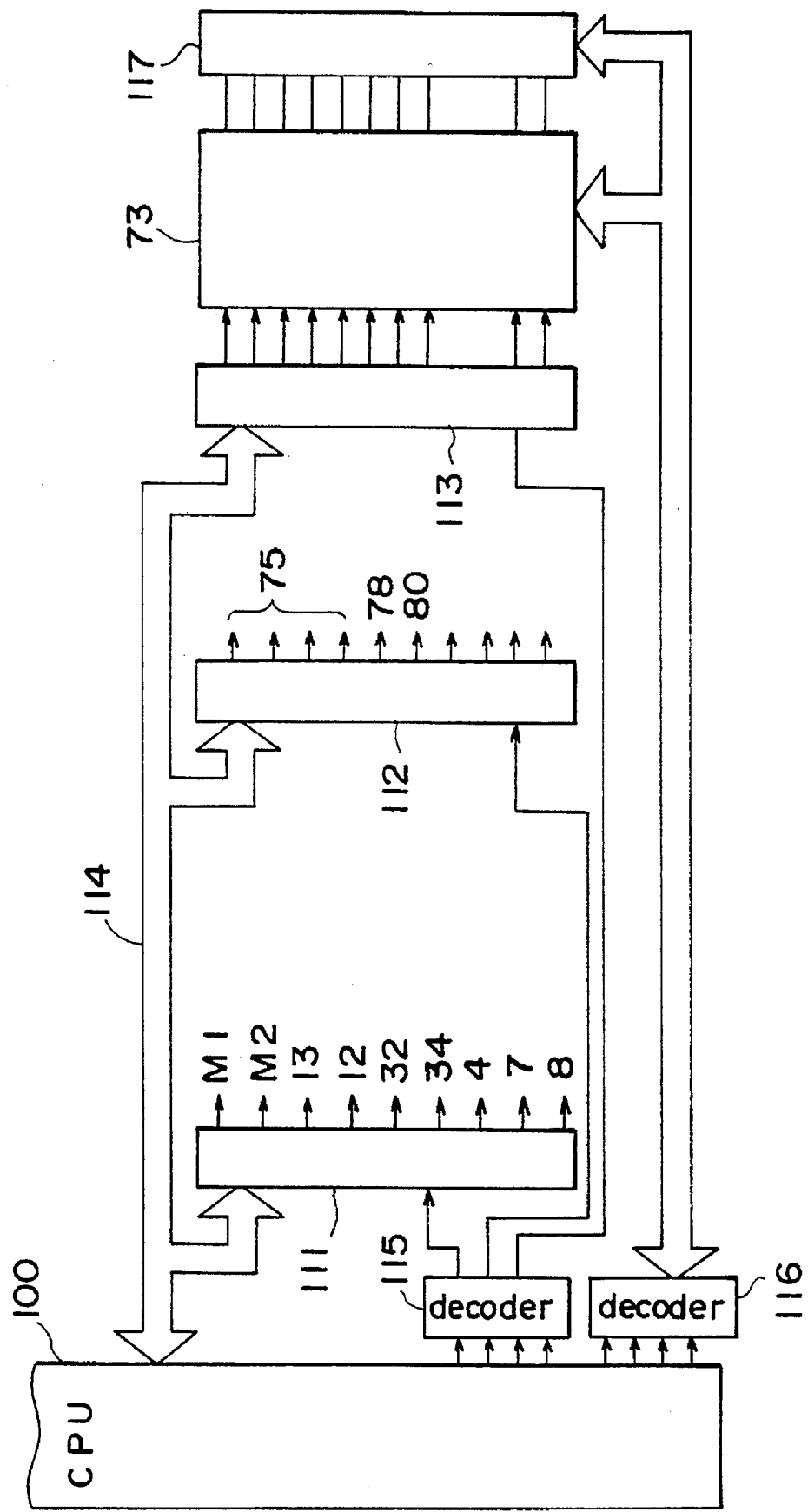
FIG. 4 is a block diagram continuing FIG. 3 showing the control circuit of the copying apparatus.
Figure 5:
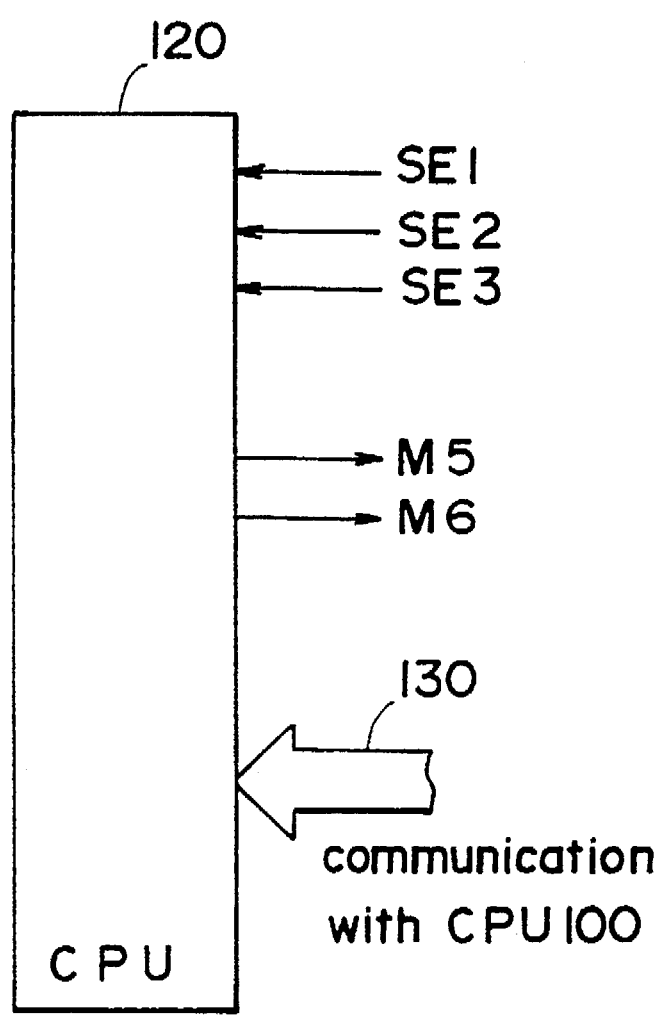
FIG. 5 is a block diagram of the ADF control circuit of the copying apparatus.

FIGS. 3 and 4 show the input/output (I/O) construction of first CPU100 for controlling the main unit of the copying apparatus. First CPU100 is provided with input expansion integrated circuits (IC) IC101, 102, 103, and output expansion IC111, 112, 113. Input expansion IC101, 102, 103 are connected to various types of keys, switches and sensors, and are controlled by first CPU100 connected to data line 104 and decoder 105. Output expansion IC111, 112, 113 are connected to various types of image forming elements and motors, copy sheet transport clutches, display LEDs, and fluorescent display 73, and are controlled by first CPU100 connected to data line 104 and decoder 105. LED matrix 117 for displays other than fluorescent display 73 is controlled via decoder 116. First CPU100 is provided with random access memory (RAM) RAM118 which has a battery backup power supply. FIG. 5 shows the I/O construction of second CPU120 for controlling ADF 50. Second CPU120 receives signals emitted from sensors SE1, SE2, SE3 for detecting documents, and outputs control signals to feed the motor M5 and the transport belt motor M6. First CPU100 and second CPU120 are capable of mutual signal transmission communications via bus 130.

Control Sequence

The control sequence for the copying apparatus main unit and ADF 50 executed via the first CPU100 and the second CPU120 are described hereinafter with reference to the flow charts of FIGS. 8–22.

In the following description, ON-edge is defined as a change of state of switches, sensors, signals and the like from an OFF state to an ON state; OFF-edge is defined as the change of state from an ON state to an OFF state. Sensors SE1, SE2, SE3 are switched ON when a document is detected.

Figure 8:
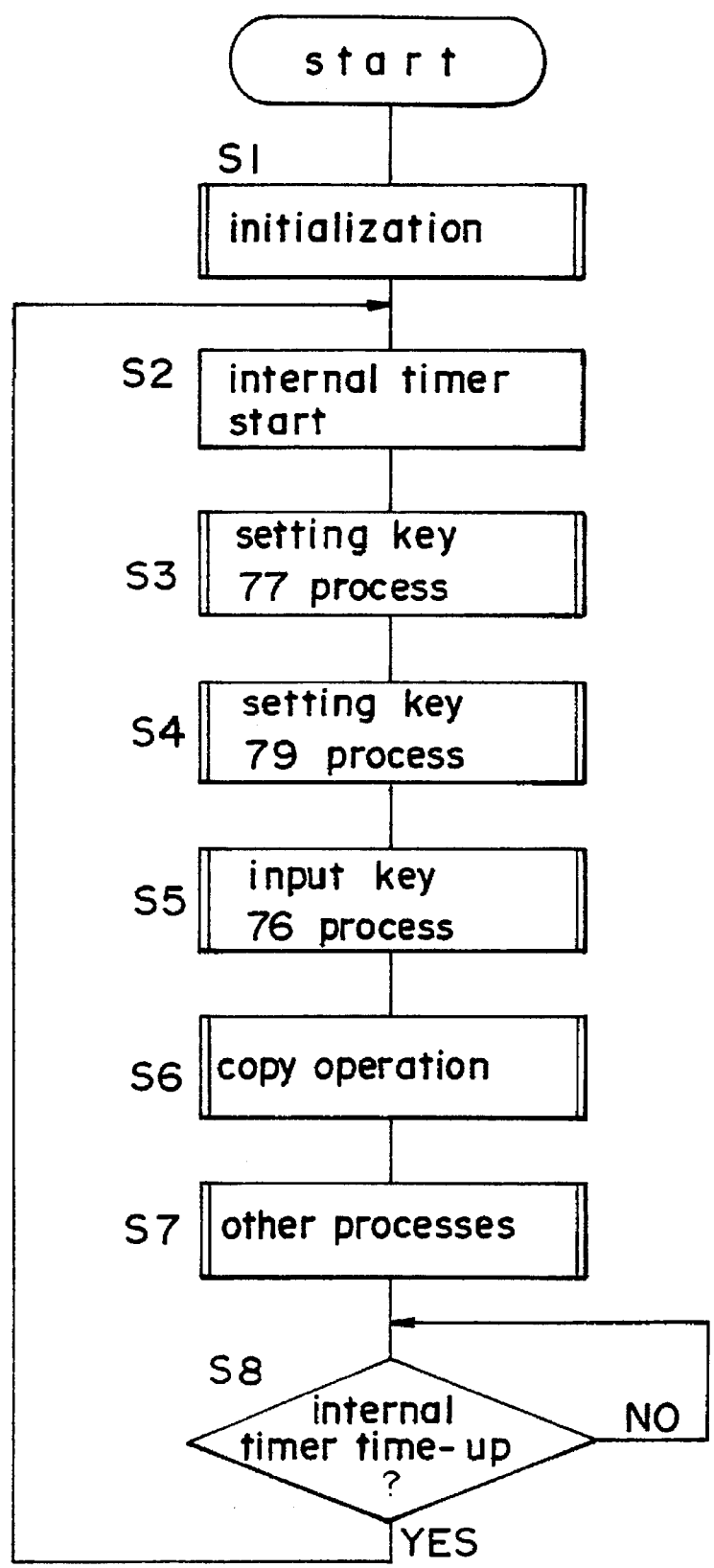
FIG. 8 is a flow chart showing the main routine executed by the control CPU.

FIG. 8 shows the main routine of first CPU100.

When first CPU100 is reset and the program starts, in step S1, initialization is executed to clear RAM118 and various types of registers and counters, and set initialization modes for various components. Then, in step S2, an internal timer is started. This internal timer determines the specific time period for a single routine of the main routine, and the timer value is set at [1] beforehand in step S1.

Then, the subroutines of steps S3–S7 are sequentially called and processed as required. The subroutines of steps S3–S7 are described later. In step S8, the completion of the internal timer is awaited, whereupon the routine returns to step S2. Using the unit time for a single routine, various timers count the occurrence of the various subroutines.

Figure 9:
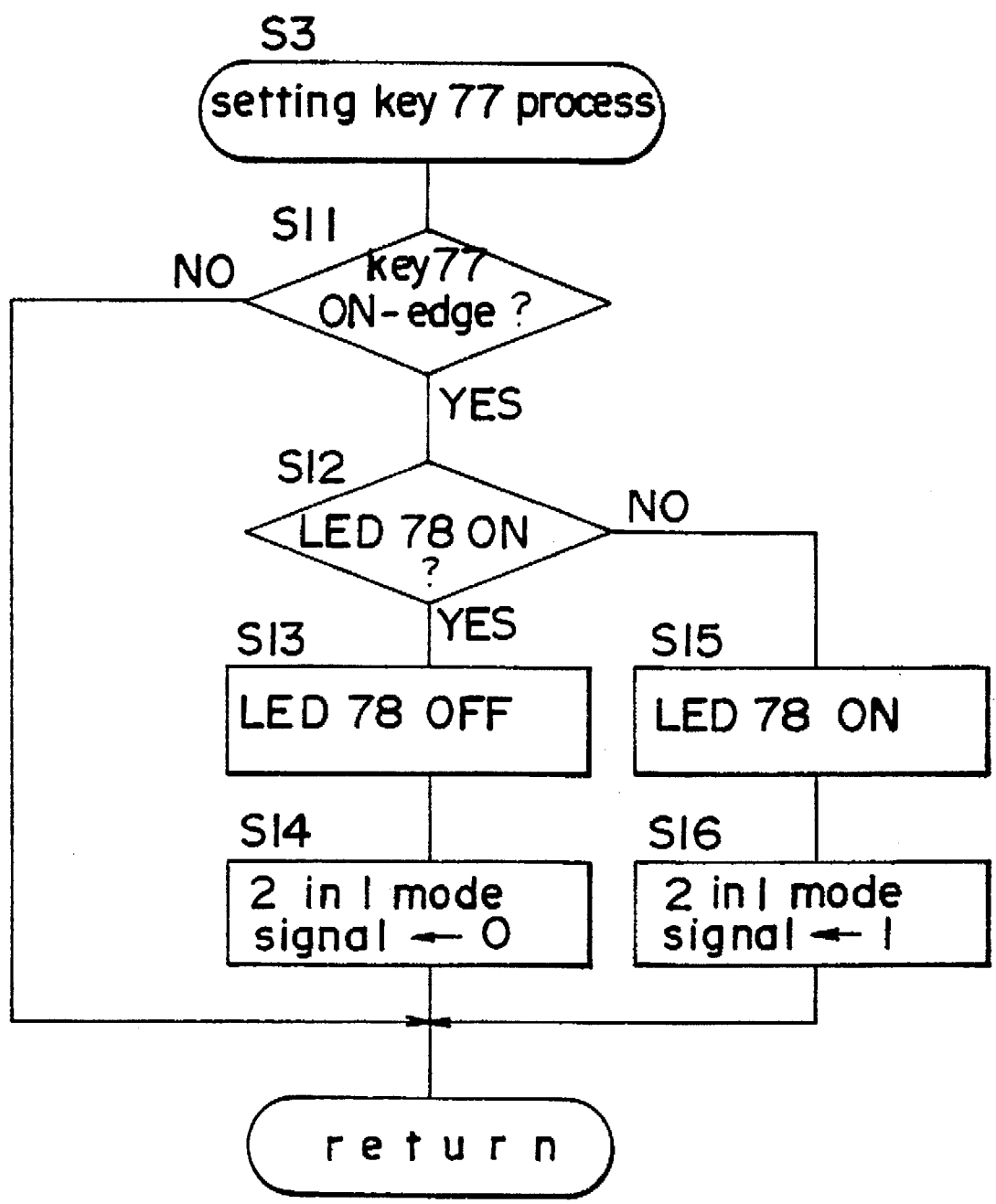
FIG. 9 is a flow chart showing the subroutine for processing input from the two-in-one mode setting key.

FIG. 9 shows a subroutine for processing input from two-in-one mode setting key 77 executed in step S3.

In step S11, a check is made to determine whether or not two-in-one mode setting key 77 is ON-edge. If key 77 is not ON-edge, the routine returns directly to the main routine, whereas if key 77 is ON-edge, a check is made in step S12 to determined whether or not LED 78 is ON. If LED 78 is ON, the LED 78 is turned OFF in step S13. That is, the two-in-one mode is canceled, and the two-in-one signal is reset to [0] in step S14. On the other hand, if LED 78 is OFF (step S12: NO), said LED 78 is turned ON in step S15, thereby setting the two-in-one mode, and the two-in-one mode signal is set at [1] in step S16.

Figure 10:
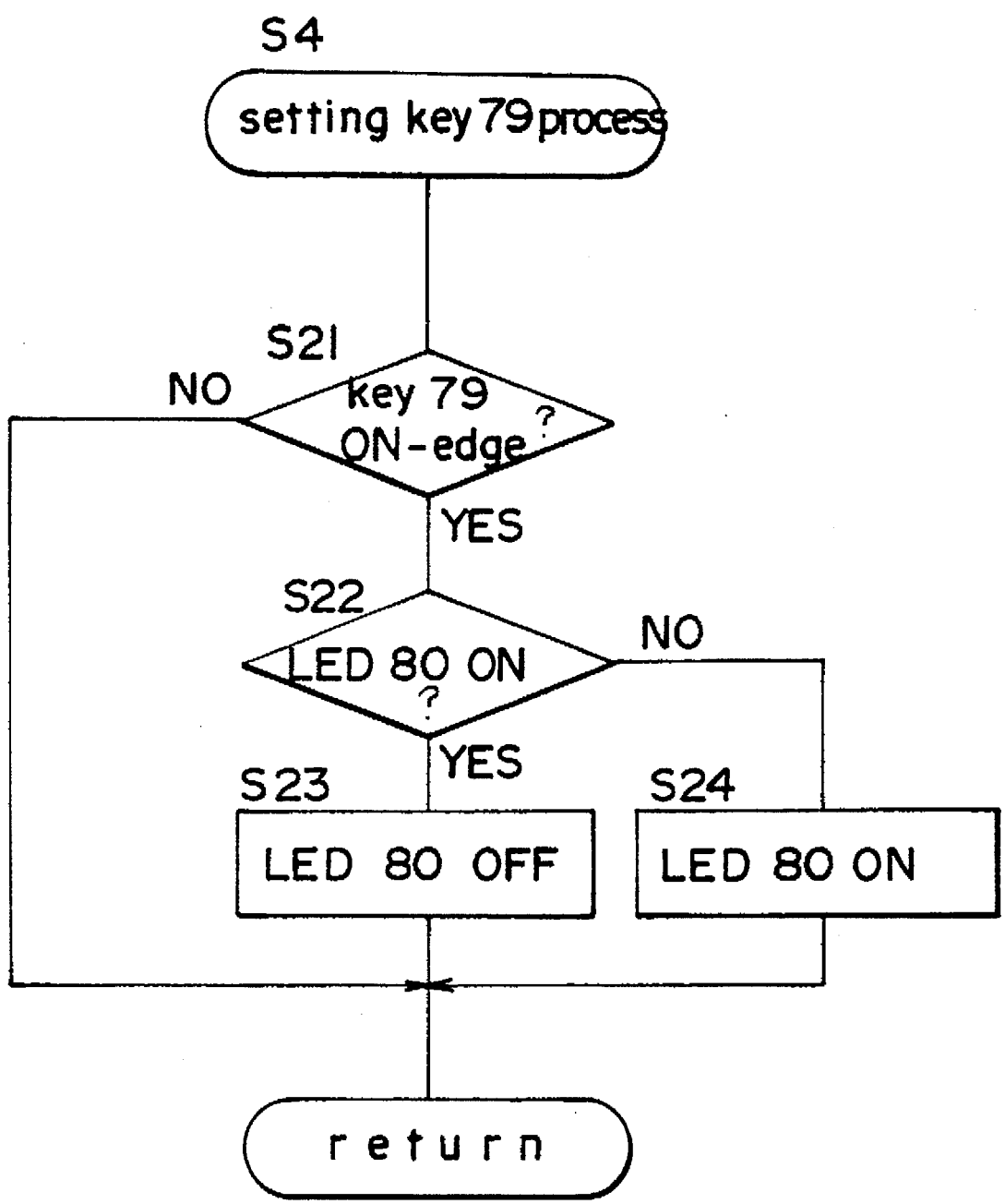
FIG. 10 is a flow chart showing the subroutine for processing input from the cover page/partition page mode setting key.

FIG. 10 shows a subroutine for processing input from cover page/partition page mode setting key 79 executed in step S4.

In step S21, a check is made to determine whether or not cover page/partition page mode setting key 79 is ON-edge. If key 79 is not ON-edge, the routine returns directly to the main routine. If key 79 is ON-edge, a check is made in step S22 to determine whether or not LED 80 is turned ON. If LED 80 is turned ON, the LED 80 is turned OFF in step S23, and the cover page/partition page mode is canceled. On the other hand, if LED 80 is not ON (step S22: NO), said LED 80 is turned ON in step S24, thereby setting the cover page/partition page mode.

Figure 11:
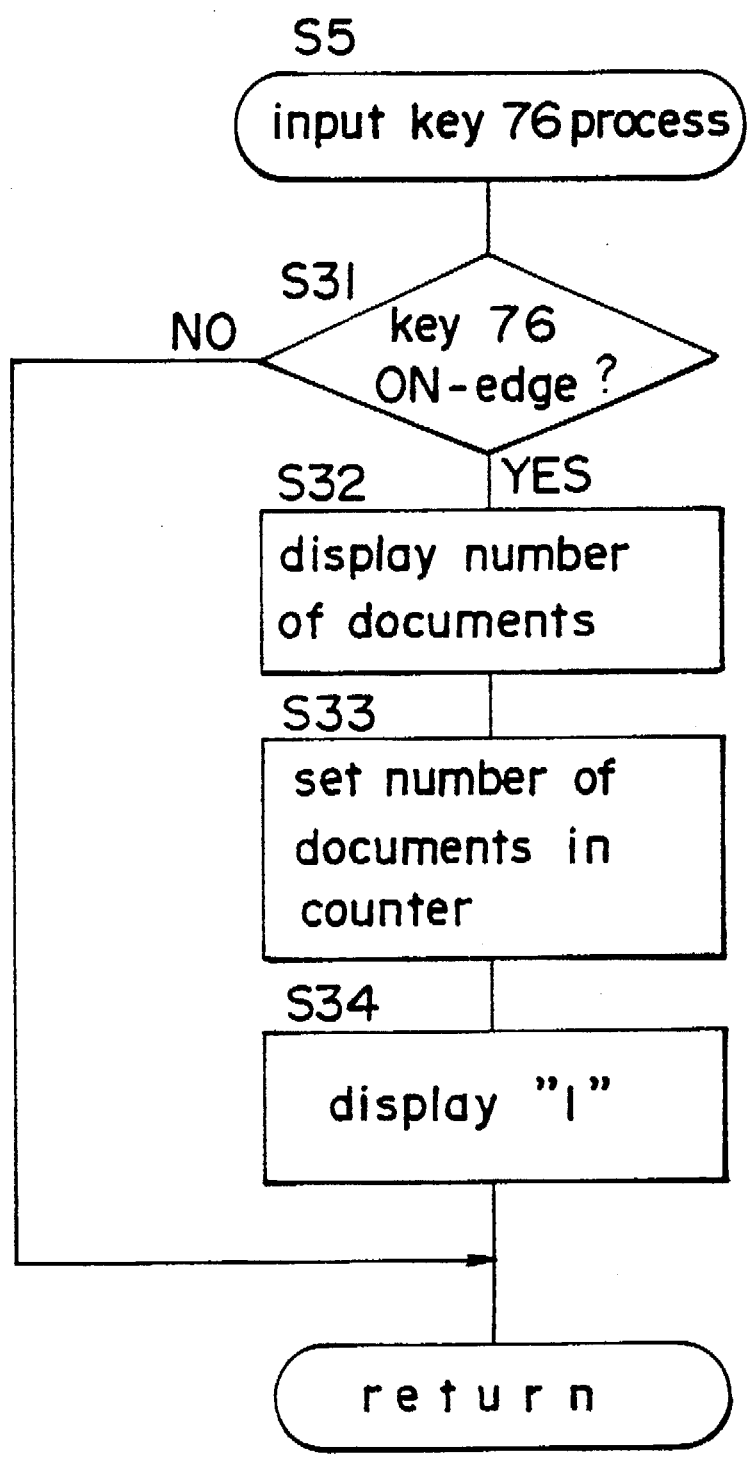
FIG. 11 is a flow chart showing the subroutine for processing input from the document number input key.

FIG. 11 shows a subroutine for processing input from document number input key 76 executed in step S5.

In step S31, a check is made to determine whether or not document number input key 76 is ON-edge. If said key 76 is not ON-edge, the routine returns directly to the main routine. If key 76 is ON-edge, first CPU100 fetches the display number displayed in fluorescent display 73 as the number of documents in step S32. The display number displayed in fluorescent display 73 is a numerical value input by an operator using the ten-key pad 72. In step S33, the number of documents is set in the remaining document counter built-in first CPU100. In step S34, the display number of fluorescent display 73 is set at [1].

Figure 12:
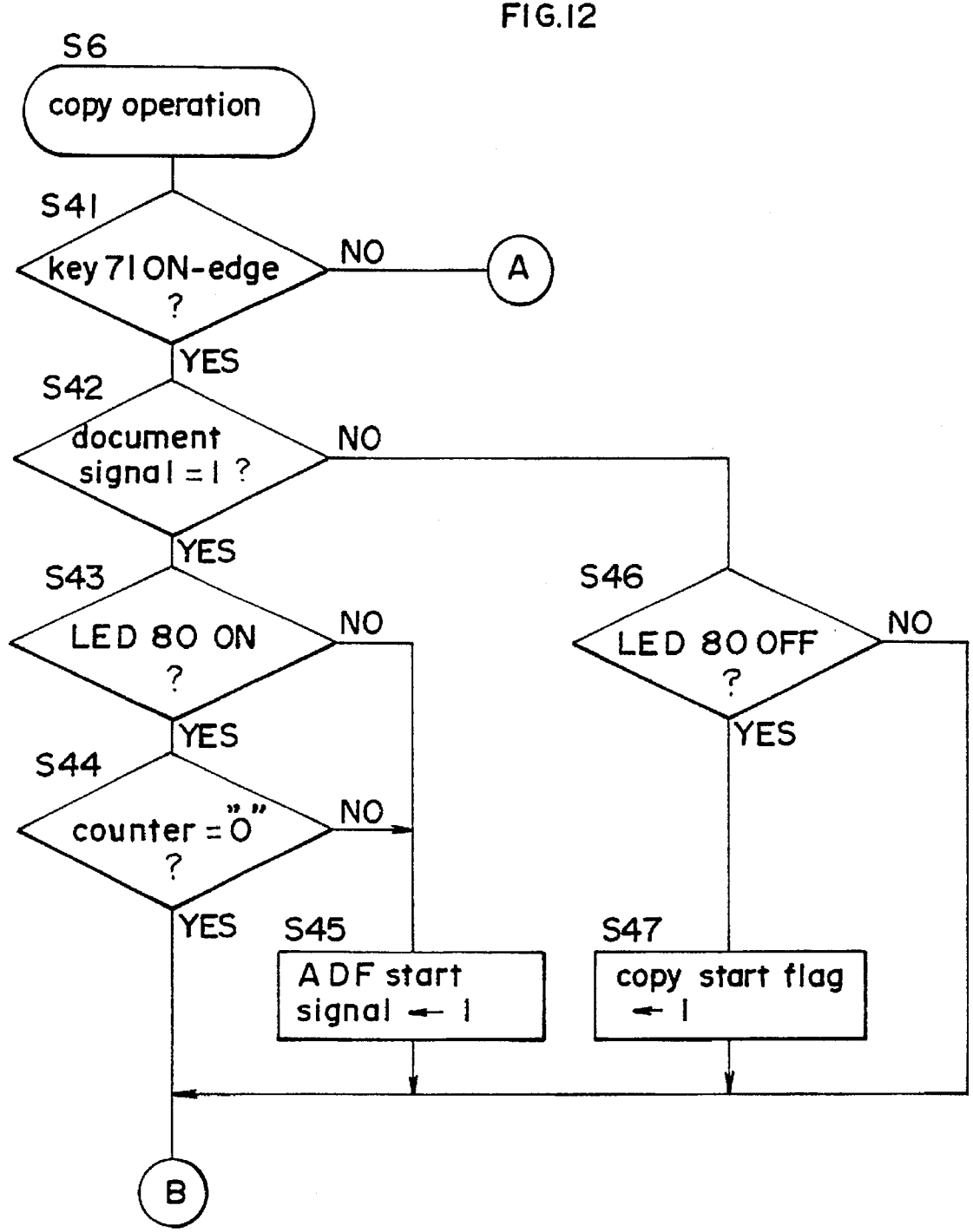
FIG. 12 is a flow chart showing the copy operation subroutine.
Figure 13:
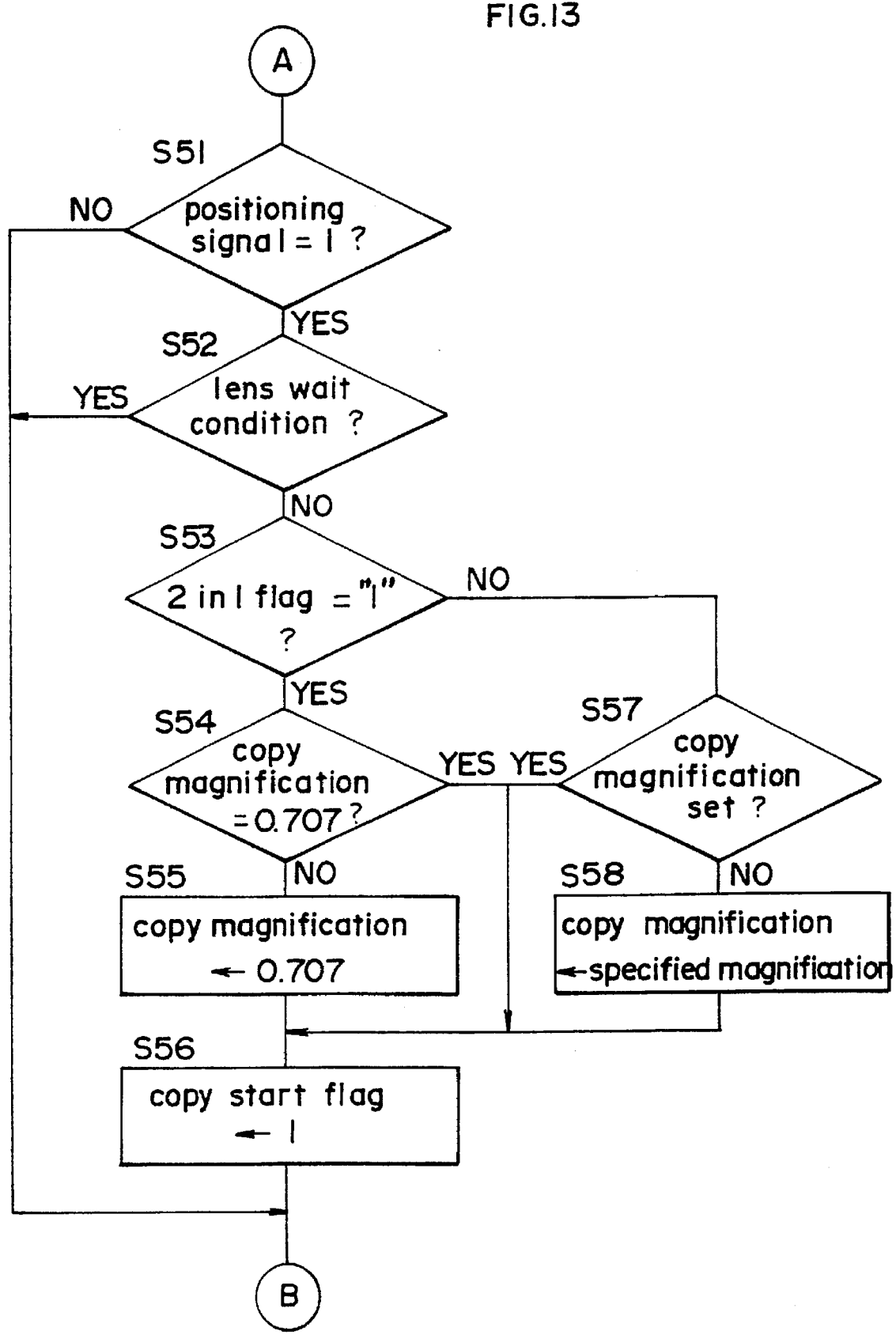
FIG. 13 is a flow chart continuing FIG. 12 showing the copy operation subroutine.
Figure 14:
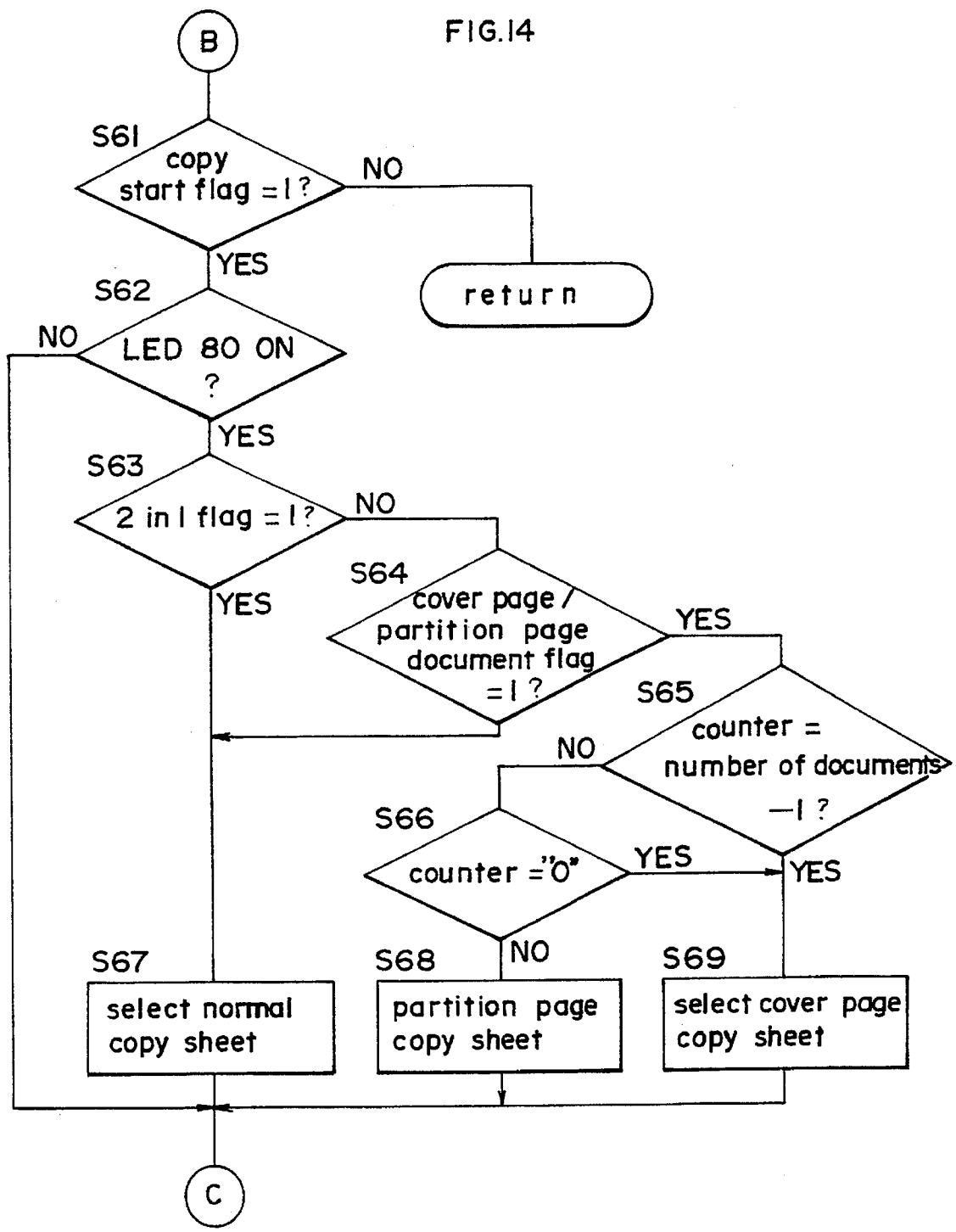
FIG. 14 is a flow chart continuing FIG. 13 showing the copy operation subroutine.

FIGS. 12–16 show the copy operation subroutines executed in step S6. In these subroutines, the various steps shown in FIGS. 12, 13, and 14 are preparation processes executed prior to starting the copy operations. The copy operation is accomplished by the various process steps shown in FIGS. 15 and 16.

In step S41, a check is made to determine whether or not copy start key 71 is ON-edge. If the copy start key is ON-edge, a check is made in step S42 to determine whether or not the document signal is set at [1]. The document signal is set at [1] based on the detection signal of sensor SE1 when a document is placed in tray 52 of ADF 50, and is reset at [0] when a document is not present. The document signal is transmitted from second CPU120 to first CPU100. If the document signal is set at [1] when start key 71 is ON-edge (step S41: YES), it means a start copy operation instruction has been entered by an operator using ADF 50. In step S43, a check is made to determine whether or not the cover page/partition page mode has been selected via the ON/OFF state of LED 80. If said mode is selected, in step S44, it is verified that the remaining document number counter Value is [0] (step S44: NO), and the ADF start signal is set at [1] in step S45. If the cover page/partition page mode is not selected (step S43: NO), the ADF start signal is set at [1] in step S45. That is, in the present embodiment, when the two-in-one mode is selected, the copy process cannot be executed without setting the ADF start signal to [1] to start the operation of ADF 50 insofar as a document number has not been entered. In the present embodiment, the counting of the number of documents is used to control the identification of (back) cover page documents and partition page documents. The (back) cover page documents and partition page documents can be identified by checking the presence/absence of a remaining document of tray 52 of ADF 50. However, when a final document is checked one by one based on signals from sensor SE1, the aperture selection timing is delayed, and results in a reduction in copying speed. Entering the number of documents in the counter beforehand prevents the aforesaid reduction in copying speed.

If the document signal is reset to [0] when the start key 71 is ON-edge (step S41: YES; step S42: NO), it means a copy operation start instruction has been entered by an operator manually placing a document on platen 29 without using ADF 50. In step S46, a check is made to verify that the two-in-one mode is not selected via the ON/OFF state of LED 80, and in step S47, the copy start flag is set at [1].

If the start key 71 is not ON-edge in step S41 (when the routine returns to step S41 again after once determining the ON-edge state), checks are made to verify that the positioning signal is set at [1] in step S51 and a lens wait condition is not active in step S52, whereupon the routine advances to step S53. The positioning signal is set at [1] when a document is placed at a predetermined position on platen 29 via ADF 50 (refer to FIG. 21, step S169), and is transmitted to first CPU100. An active lens wait condition means image forming lens 25 is moving during a change in copy magnification.

In step S53, a check is made to determine whether or not the two-in-one flag is set at [1]. The two-in-one flag is set at [1] when a horizontal A4 document (common document) is fed to platen 29 by ADF 50 (refer to step S138, FIG. 19), and is transmitted to first CPU100. Accordingly, if the two-in-one flag is set at [1], a check is made in step S54 to determine whether or not the copy magnification is set at 0.707. If the reply to the query is YES, the copy start flag is set at [1] in step S56. If the reply to the query is NO, the copy magnification is set at 0.707 in step S55, and thereafter the copy start flag is set at [1] in step S56.

On the other hand, if the two-in-one flag is reset to [0] (step S53: NO), a check is made in step S57 to determine whether or not the copy magnification has been set by an operator. If the reply to the query is YES, the copy start flag is set at [1] in step S56. If the reply to the query is NO, the copy magnification is set at a specified magnification in step S58, and thereafter the copy start flag is set at [1] in step S56. When a copy operation is executed by combining the two-in-one mode and cover page/partition page mode, this step S58 is normally used to set the copy magnification at a specified magnification of equal magnification (×1.000) and occurs when ADF 50 is feeding cover page documents, back cover page document, and partition page documents.

When the previously described processing is completed, a check is made in step S61 to determine whether or not the copy start flag is set at [1]. If the start flag is set at [0], this subroutine immediately ends. If the start flag is set at [1], a check is made to determine whether or not the two-in-one mode is selected in step S62 via the ON/OFF state of LED 80. If the two-in-one mode is selected, a check is made in step S63 to determine whether or not the two-in-one flag is set at [1]. If the flag is set at [1], the supply aperture accommodating normal copy sheets (vertical A4 size) is selected as the supply aperture in step S67 to be supplied for a common document (refer to step S138, FIG. 19). If the two-in-one flag is reset to [0], a check is made in step S64 to determine whether or not the cover page/partition page document flag is set at [1]. The cover page/partition page document flag is set at [1] to indicate a cover page/partition page document when the document fed by ADF 50 is not detected by sensor SE3 (refer to step S135, FIG. 19), and is transmitted to first CPU100. Accordingly, when the cover page/partition page document flag is reset to [0], the supply aperture accommodating normal copy sheets is selected as the supply aperture in step S67 because the document is a common document. If the cover page/partition page document flag is set at [1], a check is made in step S65 to determine whether or not the remaining document counter has subtracted [1] from the number of documents set initially. If the reply to the query is YES, the fed document is a cover page document, and the supply aperture accommodating cover page copy sheets is selected as the supply aperture in step S69. If the reply to the query of step S65 is NO, a check is made in step S66 to determine whether or not the value of the remaining document counter is [0]. If the value is not [0], the fed document is an intermediate partition page document, and the supply aperture accommodating the partition page copy sheets is selected as the supply aperture in step S68. If the value of the remaining document counter is [0], the supply aperture accommodating cover page copy sheets is selected in step S69 because the fed document is a back cover page document.

Figure 15:
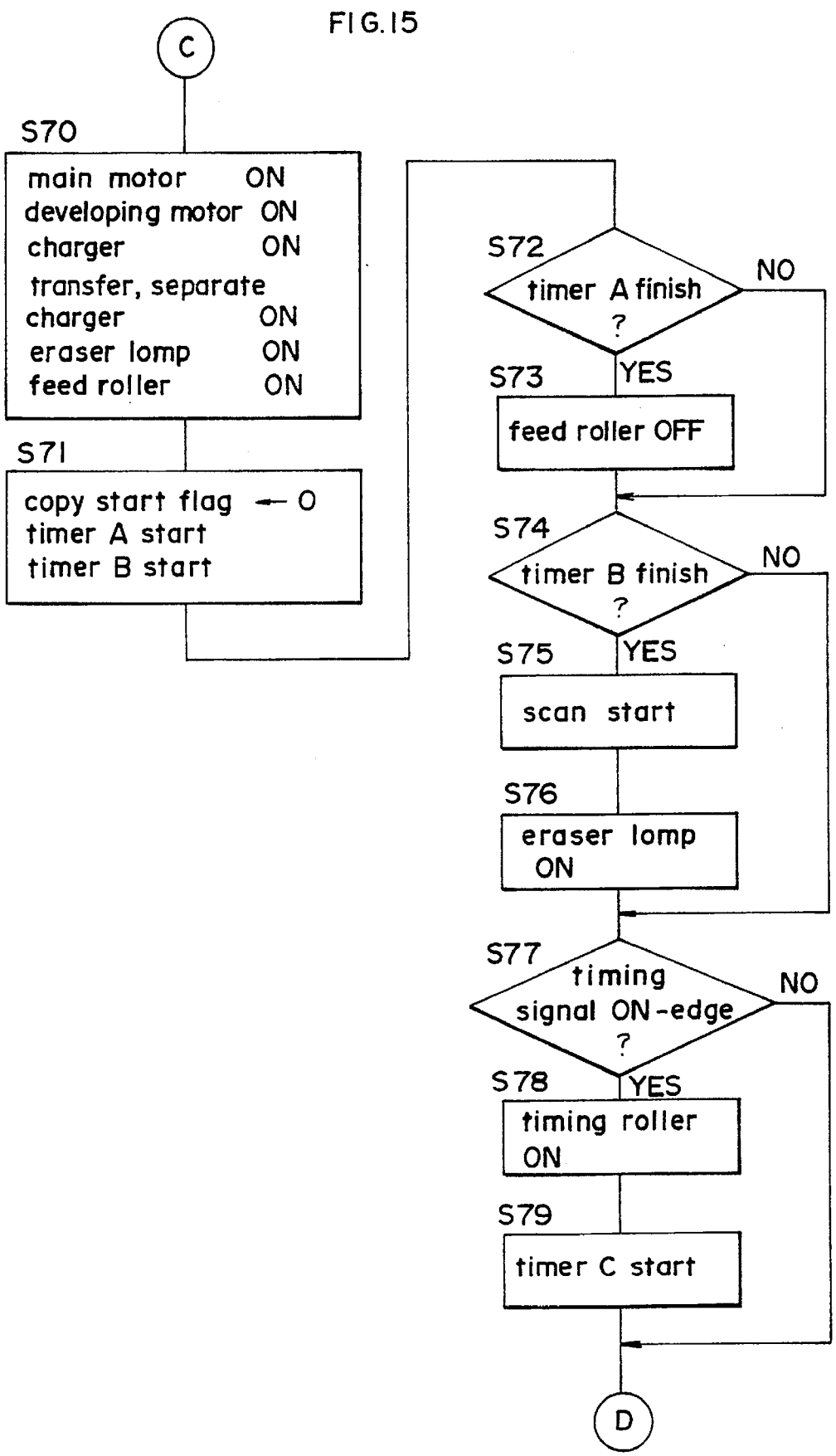
FIG. 15 is a flow chart continuing FIG. 14 showing the copy operation subroutine.

The copy operation processes of step S70–S91 are described hereinafter with reference to FIGS. 15 and 16.

In step S70, main motor M1 is switched ON, developing motor M2 is switched ON, chargers 4, 7, and 8 are turned ON, image interval eraser lamp 5 is turned ON, and the feed roller 32, 34, or 12 of the selected supply aperture among apertures 31, 33, 11 is turned ON. In step S71, the copy start flag is reset to [0], and timers A and B are started. Timer A counts the time required to supply paper. When it is determined in step S72 that timer A is finished, the feed roller is turned OFF in step S73. Timer B counts the timing for starting a scan by optical unit 20. When it is determined that timer B is finished in step S74, scanning by optical unit 20 starts in step S75, and image interval eraser lamp 5 is turned OFF in step S76. The document image is then exposed on the surface of photosensitive drum 2.

A check is made in step S77 to determine whether or not the timing signal is ON-edge. The timing signal synchronizes the copy sheet with the image formed on photosensitive drum 2, and is turned ON with a predetermined timing after optical unit 20 starts scanning and switch SW2 is turned ON. When the timing signal is ON-edge, timing roller 13 is turned ON in step S78, and timer C is started in step S79. Timer C counts the time of continuous scanning by optical unit 20. When timer C is finished in step S81, the return flag is set at [1] in step S82, and charger 4 and timing roller 13 are turned OFF in step S83.

In step S84, the setting of the return flag at [1] is verified, and a check is made in step S85 to determine whether or not copying is finished. Specifically, a check is made to determine whether or not scanning is completed for the set number of copies. If not completed, the copy start flag is set at [1] in step S89, and the return flag is reset to [0]. If scanning has been completed for the set number of copies, a check is made in step S86 to determine whether or not optical unit 20 has returned to the home position via the ON/OFF state of switch SW1. If optical unit 20 has returned to the home position, in step S87, developing motor M2 is turned OFF, chargers 7 and 8 are turned OFF, and in step S88 timer D is started, whereupon the return flag is reset to [0]. Timer D counts the completion timing for the copy operation. When timer D completion is verified, main motor M1 is turned OFF in step S91.

Figure 17:
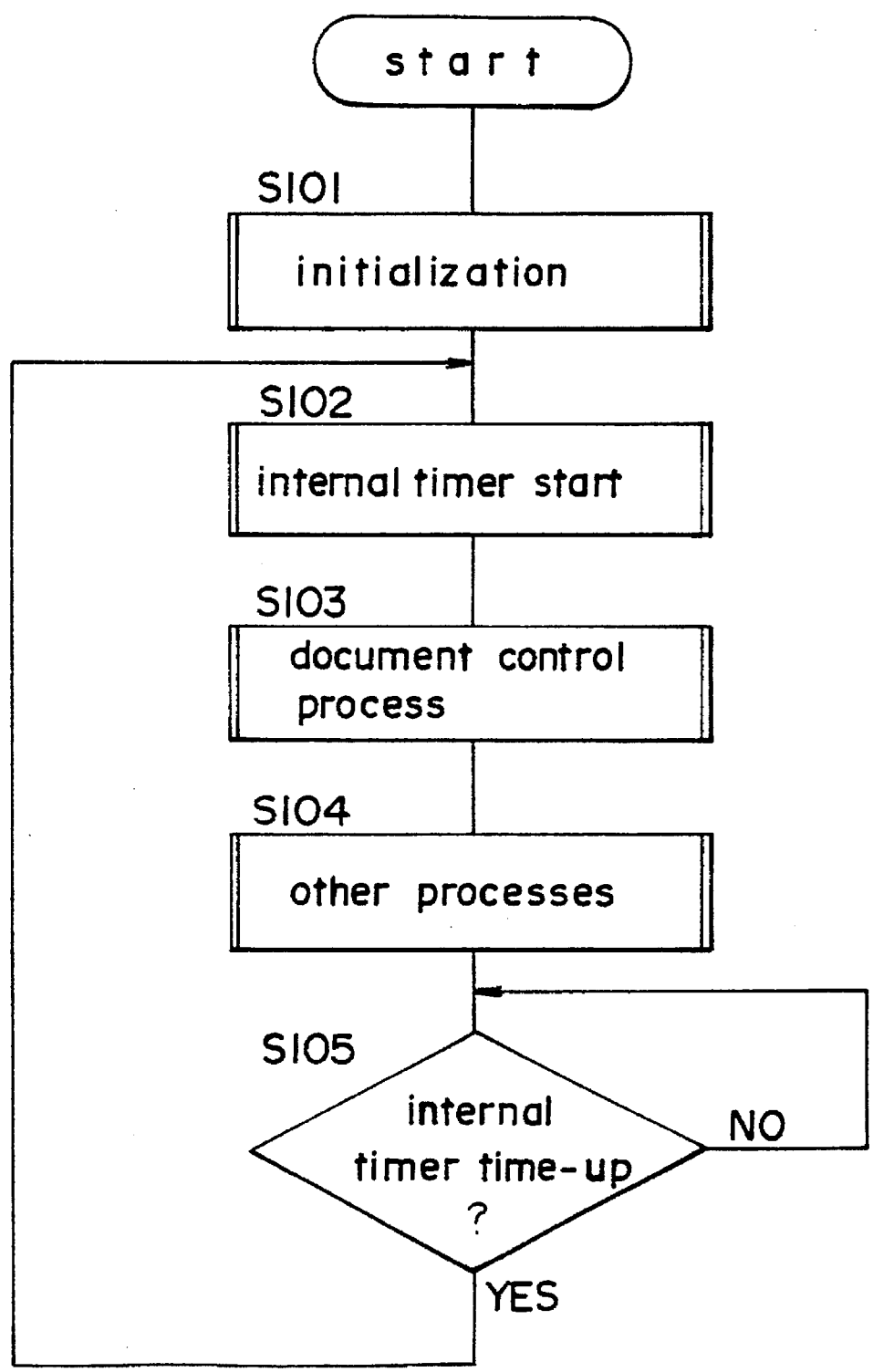
FIG. 17 is a flow chart showing the main routine of the ADF control CPU.

FIG. 17 shows the main routine executed by second CPU120.

When second CPU 120 is reset and the program starts, in step S101, initialization is executed to clear the RAM and various registers, and set the initialization modes of various components. In step S102, an internal timer is started. The internal timer determines the time required for one routine of the main routine. The timer value is set beforehand in step S101.

The subroutines of steps S103 and S104 are called and required processes are executed. The subroutine of step S103 is described below. The completion of the internal timer is awaited in step S105, whereupon the routine returns to step S102. Using the unit time for a single routine, various timers count the occurrence of the various subroutines.

Figure 18:
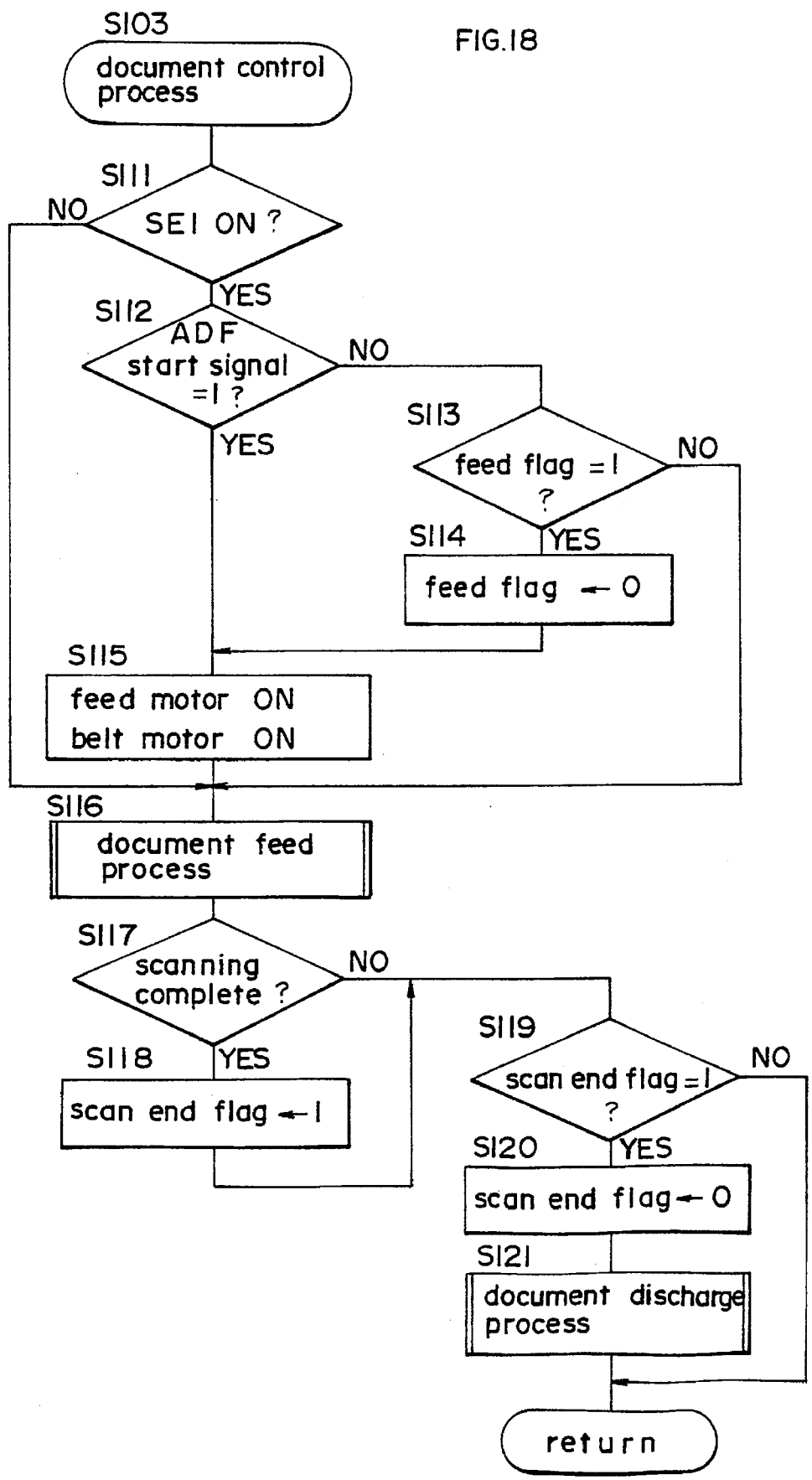
FIG. 18 is a flow chart showing the document control subroutine.

FIG. 18 shows a subroutine for controlling documents executed in step S103.

In step S111, a check is made to determine whether or not a document is set on tray 52 via the ON/OFF state of sensor SE1. If a document is present, a check is made in step S112 to determined whether or not the ADF start signal is set at [1]. If the start signal is set at [1] (refer to step S45, FIG. 12), in step S115 feed motor M5 and transport belt motor M6 are turned ON. Thus, the first document is fed from tray 52. Even when the ADF start signal is reset to [0], when it is determined that the feed flag is set at [1] in step S113, the feed flag is reset to [0] in step S114, and document feeding starts in step S115. The feed flag is used to feed second and subsequent documents (refer to step S172, FIG. 22).

In step S116, a document is transported to a predetermined position on platen 29, and in step S117 a check is made to determine whether or not scanning by optical unit 20 is completed for the specified number of copies. If the reply to the query is YES, the scan end flag is set at [1] in step S118. In step S119, the setting of the scan end flag at [1] is verified, and said flag is reset to [0] in step S120, whereupon the document is discharged from platen 29 in step S121.

Figure 19:
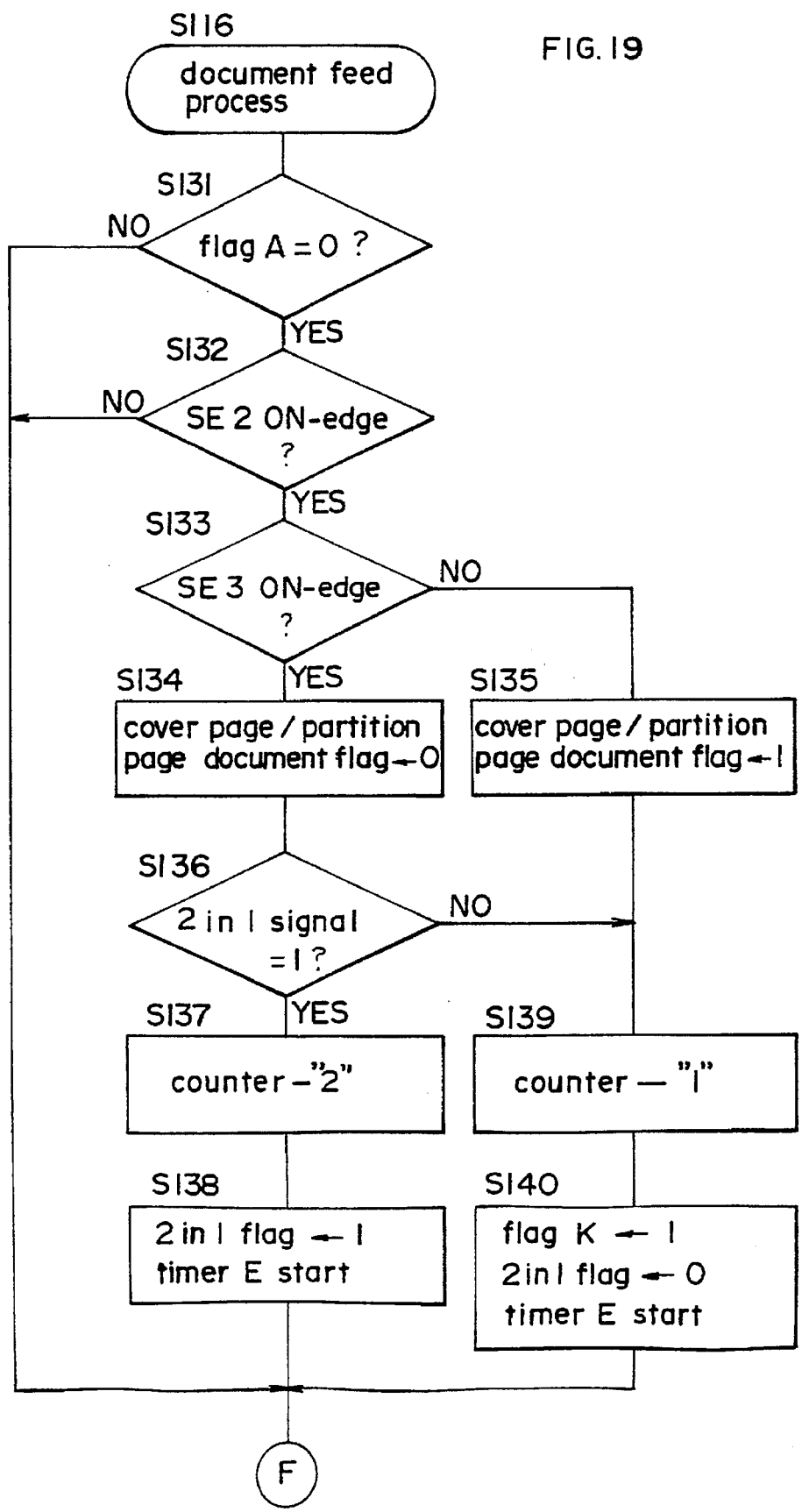
FIG. 19 is a flow chart showing the document feeding subroutine.
Figure 20:
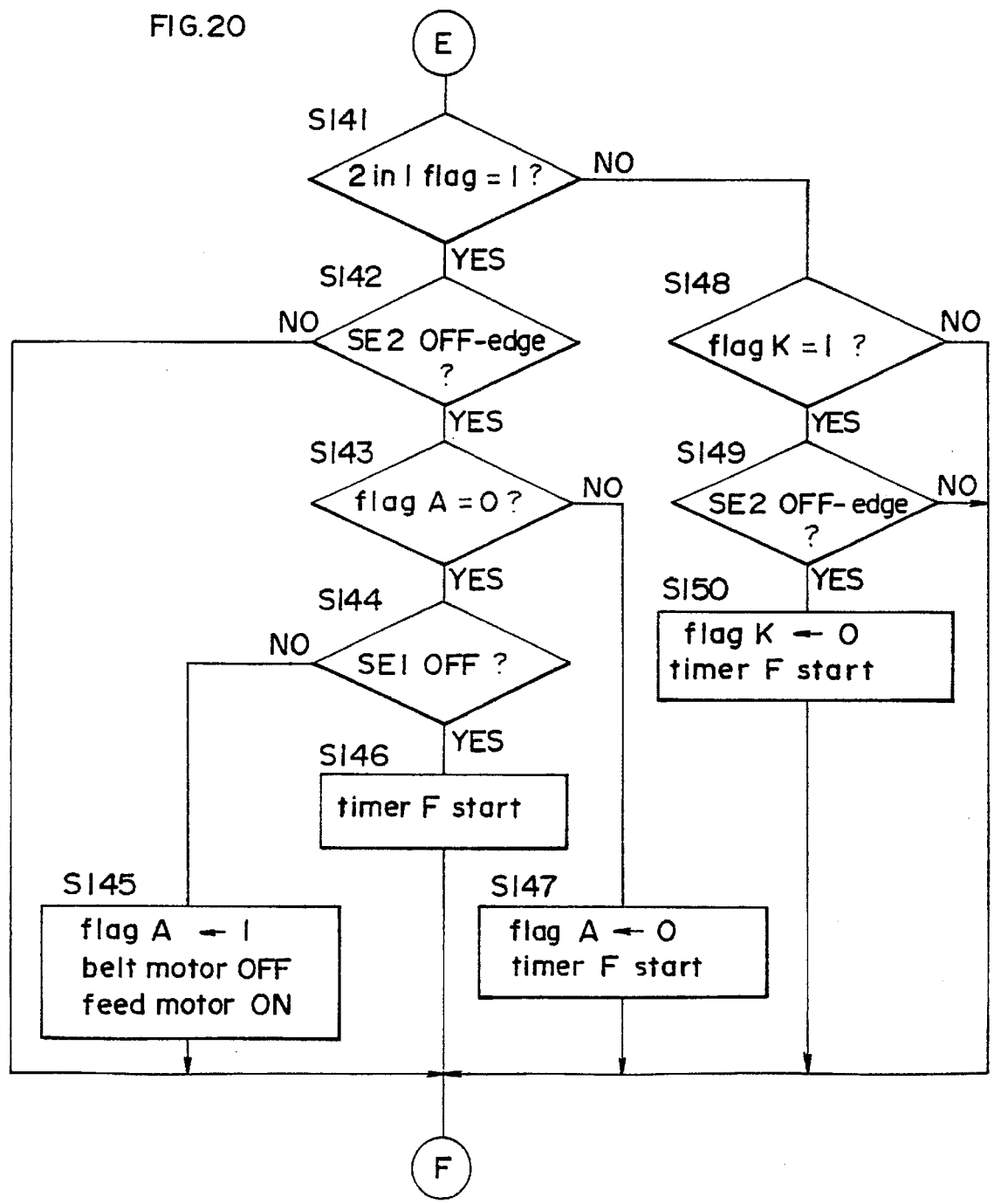
FIG. 20 is a flow chart continuing FIG. 19 showing the document feeding subroutine.
Figure 21:
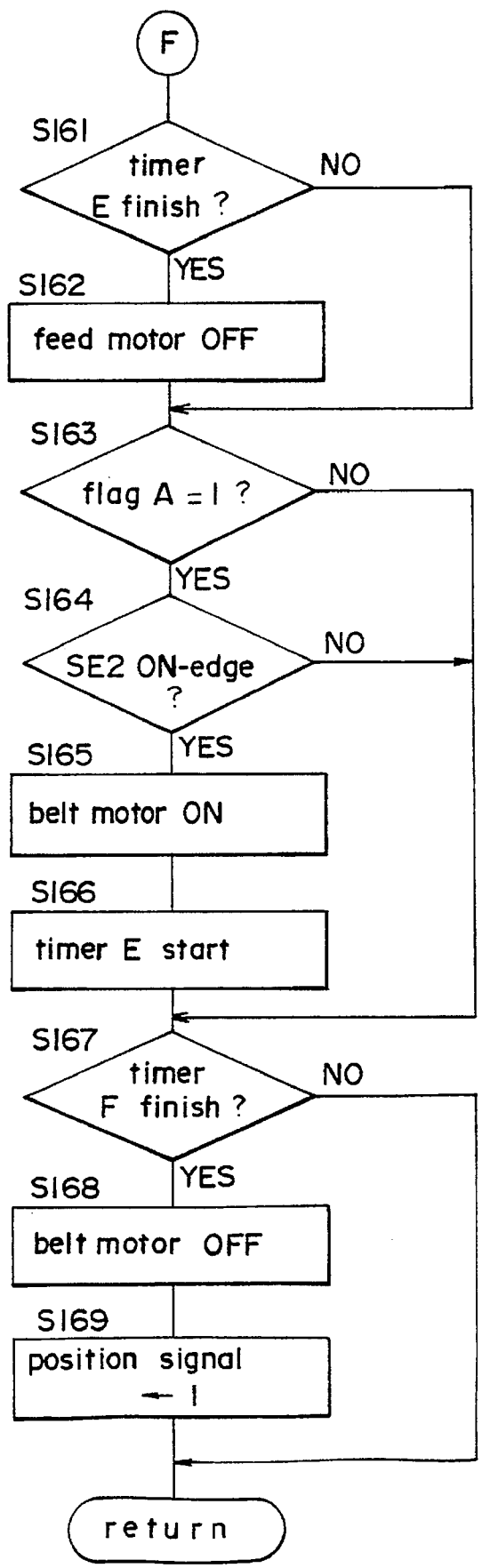
FIG. 21 is a flow chart continuing FIG. 20 showing the document feeding subroutine.

FIGS. 19, 20, and 21 show the document feed subroutine executed in step S116.

In step S131, a check is made to determine whether or not flag A is set at [0]. When flag A is set at [0], it indicates documents fed subsequently are odd number pages (flag A set to [0] at initialization). Flag A is set at [1] when even number pages are fed (refer to step S145, FIG. 20). If flag A is reset to [0], the ON-edge state of sensor SE2 is verified in step S132, i.e., sensor SE2 detects the leading edge of a document fed from tray 52, and the ON edge state of sensor SE3 is checked in step S133. If sensor SE3 is ON-edge, the fed document is a horizontal A4 size document (a common document if in the two-in-one mode), such that the cover page/partition page document flag is reset to [0] in step S134. In step S136, a check is made to determine whether or not the two-in-one mode is selected based on the two-in-one signal. If the two-in-one mode is selected (step S136: YES), in step S137 the remaining document counter value is decreased by [2], in step S138 the two-in-one flag is set at [1], and timer E is started. Timer E counts the time of continuous actuation of feed motor M5. If the two-in-one mode is not selected (step S136: NO), the remaining document counter value is decreased by [1] in step S139, flag K is set at [1] in step S140, the two-in-one flag is reset to [0], and timer E is started.

On the other hand, if sensor SE3 is not ON (step S133: NO), the fed document is a vertical A4 size document ((back) cover page or partition page in the two-in-one mode), such that the cover page/partition page document flag is set at [1] in step S135. Then, the previously described steps S139, and S140 are executed.

In step S141, a check is made to determine whether or not the two-in-one flag is set at [1]. If the flag is set at [1], the OFF-edge state of sensor SE2 is verified in step S142, i.e., the trailing edge of the document is detected by sensor SE2, and a check is made in step S143 to determine whether or not flag A is set at [0]. If flag A has been reset to [0], the document fed at this time is an odd number document, and a check is made to determine whether or not there is a remaining document via the ON/OFF state of sensor SE1 in step S144. If a remaining document is present (step S144: NO), flag A is set at [1] in step S145 to feed said next document, transport belt motor M6 is turned OFF, and feed motor M5 is turned ON in step S145. Of no document remains, (step S144: YES), timer F is started in step S146.

Timer F counts the time for transporting the trailing edge of a document from the detection point of sensor SE2 to the standard exposure start position (end surface of platen 29). If flag A is set at [1] (step S143: NO), the document fed at this time is an even number page, such that flag A is reset to [0] in step S147, and timer F is started.

On the other hand, If two-in-one flag is reset to [0] (step S141: NO; when feeding a single page document), the setting of flag K at [1] is verified in step S148, and a check is made in step S149 to determine whether or not sensor SE2 is OFF-edge. If sensor SE2 is OFF-edge, i.e., if the trailing edge of the document is detected by sensor SE2, flag K is reset to [0] in step S150, and timer F is started.

In step S161, the completion of timer E is verified, and feed motor M5 is turned OFF in step S162. A check is made in step S163 to determine whether or not flag A is set at [1]. If flag A is set at [1], i.e., if an even number page document is fed (refer to step S145 of FIG. 20), the ON-edge state of sensor SE2 is verified in step S164, transport belt motor M6 is turned ON in step S165, and timer E is started in step S166.

When the completion of timer F is verified in step S167, transport belt motor M6 is turned OFF in step S168, and the position signal is set at [1] in step S169. The position signal indicates a document is placed at the standard exposure start position on platen 29.

Figure 22:
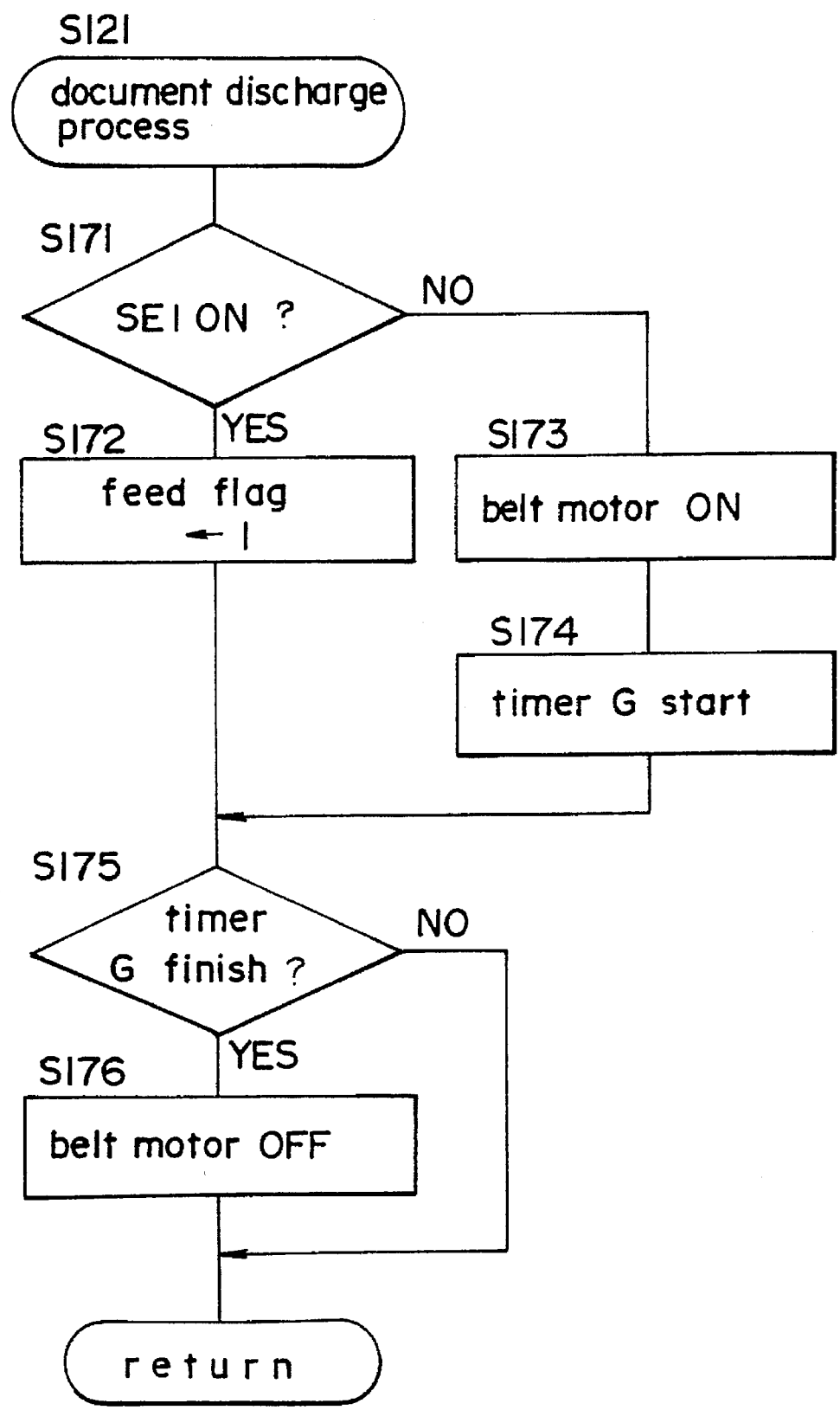
FIG. 22 is a flow chart showing the document discharge subroutine.

FIG. 22 shows the document discharge subroutine executed in the previously mentioned step S121. In step S171, the presence or absence of a document on tray 52 is determined by the ON/OFF state of sensor SE1. If a document is present, the feed flag is set at [1] in step S172. If a document is not present, in step S173 the transport belt motor M6 is turned ON, and timer G is started in step S174. Timer G counts the time from when the document travels from tray 52 to discharge tray 58. When the completion of timer G is verified in step S175, the transport belt motor M6 is turned OFF in step S176.

When documents remain in tray 52, document discharge (step S171: YES) is accomplished via the rotation of transport belt motor M6 to advance the document onto platen 29.

Second Embodiment

Figure 23:
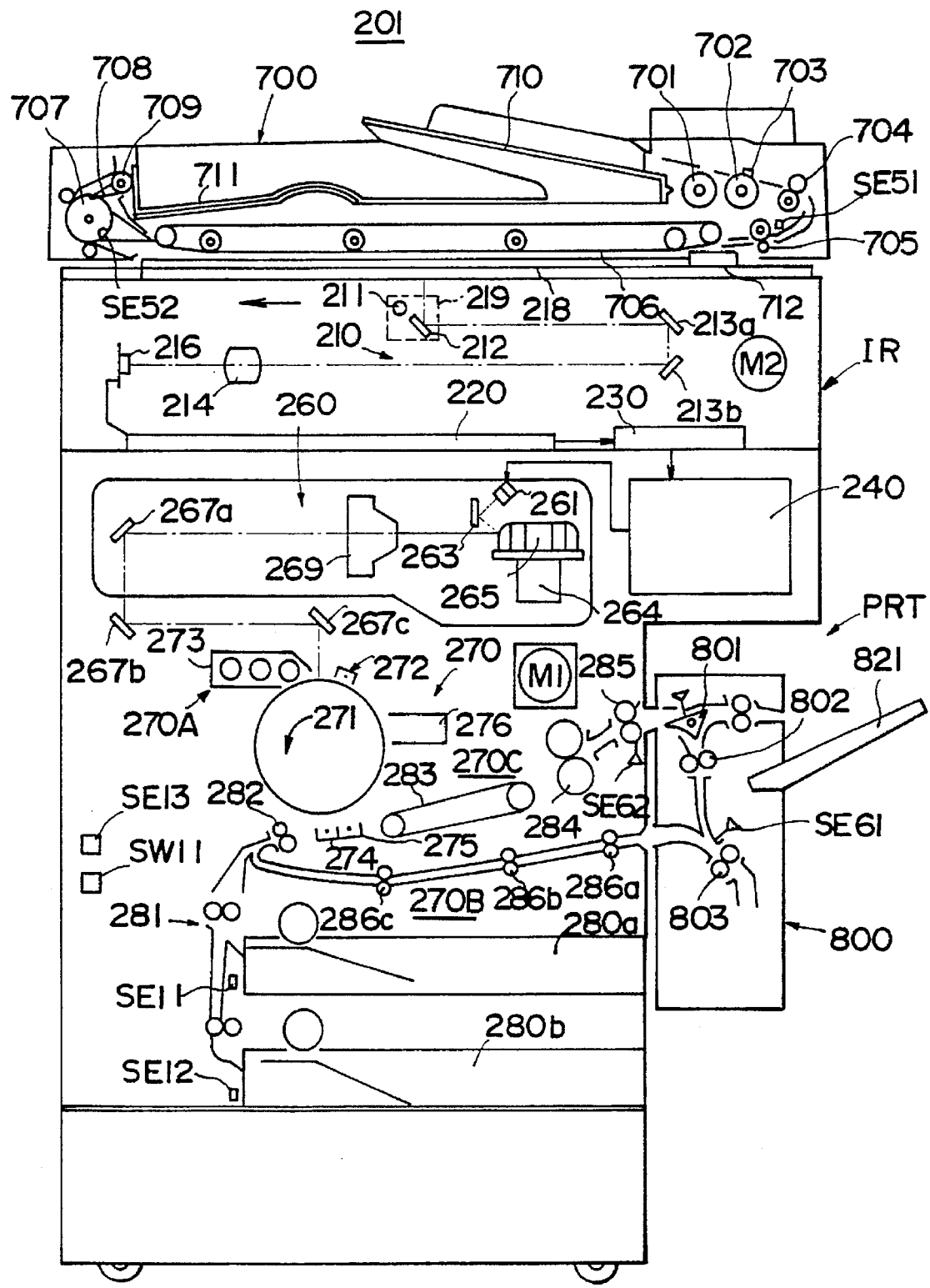
FIG. 23 is a front section view showing the general construction of another digital coping apparatus of the present invention.

FIG. 23 is a frontal section view showing the general construction of a second embodiment of the present invention. Referring to FIG. 23, a copying apparatus 201 comprises a scanning unit 210 for converting a read document to image signals, an image signal process section 220 for processing image signals transmitted from the scanning unit 210, a memory unit 230 switchably outputting image data transmitted from image signal process section 220 directly to a printing device or storing said image data in memory, print process section 240 for driving semiconductor laser 261 based on image data input from memory unit 230, optical unit 260 for directing a laser beam emitted from semiconductor laser 261 to an exposure position on the surface of photosensitive drum 271, image forming unit 270 for developing an electrostatic latent image formed via optical exposure and transfer and fix said developed image on a transfer sheet so as to form a completed image, operation panel OP provided on the top of the apparatus body, document transport section 700 for transporting an original document and inverting said document front-to-back as necessary, refeeding section 800 for supplying a copy sheet again to a transfer position.

Image reader IR comprises scanning unit 210 and image signal process section 220, and printer PRT comprises print process section 240, optical unit 260, and image forming unit 270.

Scanning unit 210 comprises exposure lamp 211 incorporated with scanner 219 so as to be movable beneath document platen 218, first mirror 212, second and third mirrors 213a and 213b, condensing lens 214, line sensor 216 using a charge-coupled device (CCD) array or the like, and scanner motor M2.

Image signal process section 220 processes image signals transmitted from line sensor 216, and outputs image data to memory unit 230. Memory unit 230 is described fully later.

Print process section 240 transmits the received image data to semiconductor laser 261. Optical unit 260 comprises semiconductor laser 261, polygonal mirror 265 for deflecting said laser beam, principal mirror 269, and reflecting mirrors 267a, 267b, 267c.

Image forming unit 270 comprises developing/transfer unit 270A, transport section 270B, and fixing unit 270C. Developing/transfer unit 270A comprises photosensitive drum 271 driven in a counterclockwise direction in the drawing, and around which are sequentially arranged in the direction of rotation from the upstream side: charger 272, developing device 273, transfer charger 274, separation charger 275, and cleaning section 276.

A two-component developer comprising a black color toner and a carrier is accommodated in developing device 273.

Transport section 270B comprises cassettes 280a and 280b which accommodating copy sheets, size detection sensor SE11 and SE12 for detecting the size of the copy sheets, paper guide 281, timing roller 282, transport belt 283, and transport rollers 286a–286c for transporting copy sheets introduced from refeeding section 800.

Fixing unit 270C comprises fixing rollers 284 for transporting a copy sheet while gripping said copy sheet therebetween, discharge roller 285, and discharge sensor SE62 for detecting the discharge of a copy sheet.

Document transport section 700 transports an original document disposed on the top of document feed tray 710 automatically onto document platen 218, and after said original document is read by scanner 219, discharges said original document to document discharge section 711.

Document transport section 700 comprises feed roller 701, roller 702, roller pad 703, intermediate roller 704, registration roller 705, transport belt 706, inverting roller 707, switching member 708, discharge roller 709, feed tray 710, discharge tray 711, document scale 712, feed sensor SE51, and discharge sensor SE52.

The operation of document transport section 700 is different depending on the document reading mode. Document reading modes include a scan mode for reading a document via a scanning operation by scanner 219, and continuous reading mode for reading a document during the transport of said document with scanner 219 in a stationary state.

During document reading, one or more original documents are placed on feed tray 710 with the surface to be read facing upward. When operation starts, the lowermost document of the stacked documents is sequentially fed via feed roller 701, and further advanced by rollers 702 and 703. Then, the document passes intermediate roller 704, inclination of the document is corrected by registration roller 705, and the document is transported onto the document platen 218. Transport roller 706 slightly reverse rotates and stops directly after the trailing edge of the document has passed the left edge of document scale 712.

Thus, the right edge of the document (trailing edge) abuts the edge of document scale 712, such that the document is properly positioned on document platen 218. At this time, the leading edge of the next document arrives at registration roller 705 so as to reduce the time required to transport the next document.

In the aforesaid state, scanner 219 begins scanning and reads the front surface (bottom surface) of the document. When reading of the document is completed, said document is transported leftward by transport belt 706, completes a U-turn via inverting roller 707, passes above switching member 708, and is discharged onto discharge tray 711 by discharge roller 709. At this time, the read surface (front surface) of the document is discharged in a face upward state.

Figure 24:
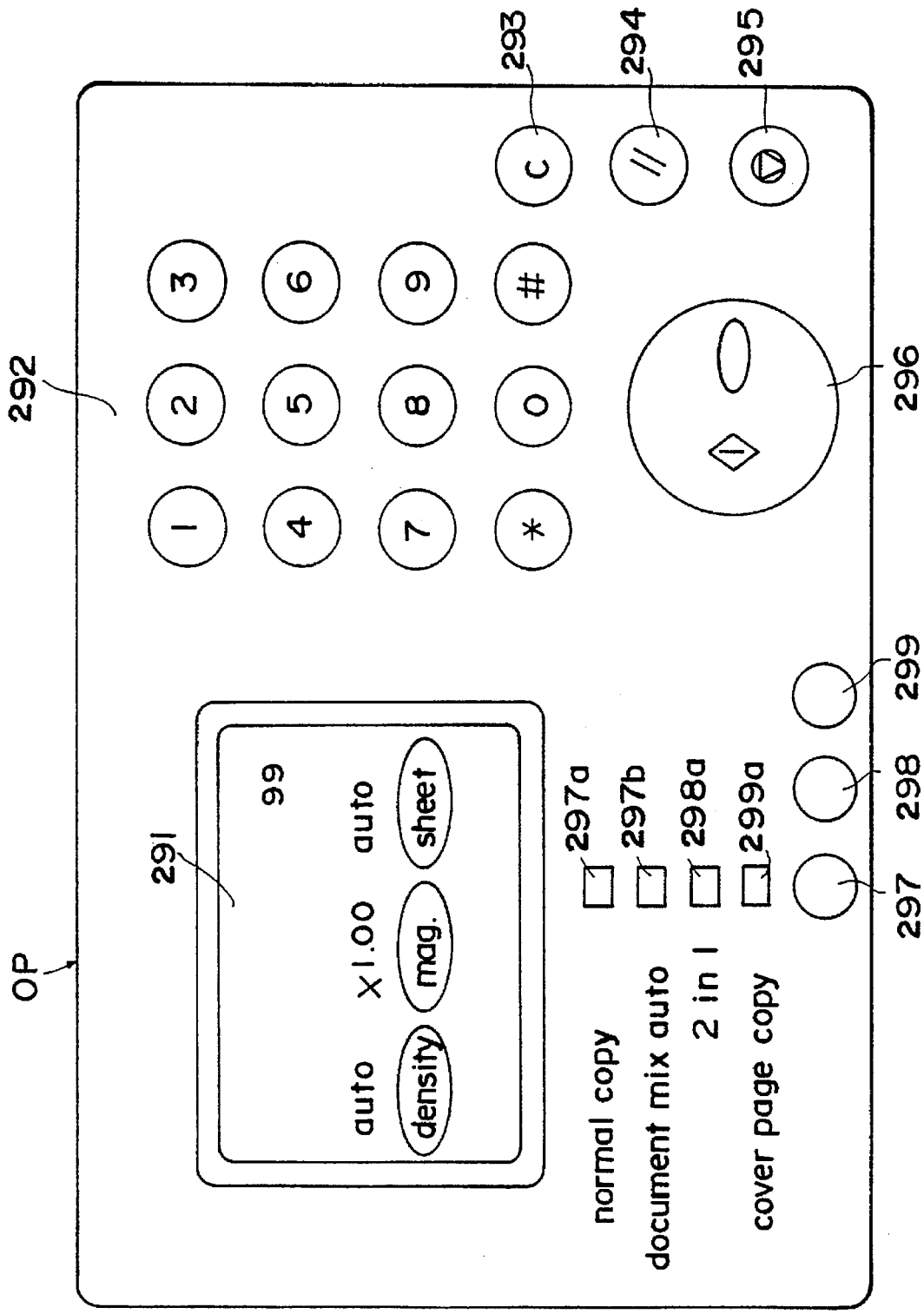
FIG. 24 is a front view of the operation panel of the apparatus of FIG. 23.

FIG. 24 shows a front view of operation panel OP. Operation panel OP is provided with liquid crystal touch panel 291, ten-key pad 292 for entering numerical values for the number of copies, copy magnification and the like, clear key 293 for returning an entered numerical value to a standard value [1], panel reset key 294 for returning various set values and the like in copying apparatus 201 to standard values, stop key 295 for stopping a copy operation, start key 296 for starting a copy operation, mode setting key 297 for setting the normal copy mode or document mixed auto mode, two-in-one mode setting key 298, and cover mode setting key 299. Also provided on operation panel OP are mode displays 297a, 297b, 298a, 299a which display the copy modes corresponding to the aforesaid mode setting keys.

Liquid crystal touch panel 291 displays various types of conditions of the copying apparatus 201 such as jam alert, service call alert, paper empty alert and the like, various operation modes of the copying apparatus 201 such as exposure level, magnification, copy paper and the like, as well as various other information, and also accepts input for selecting an operation mode.

Figure 25:
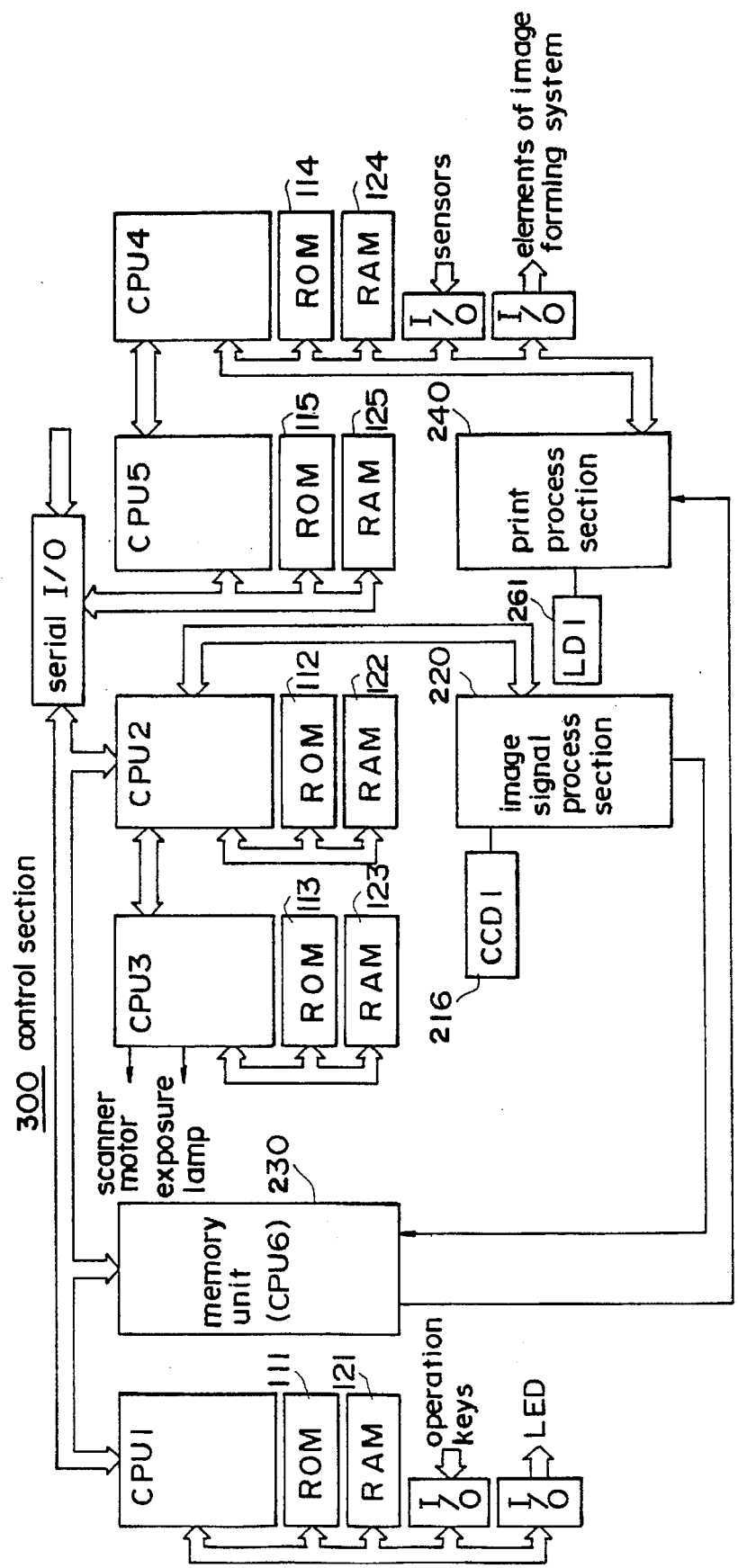
FIG. 25 is a block diagram showing the construction of the control section of the copying apparatus of FIG. 23.
Figure 26:
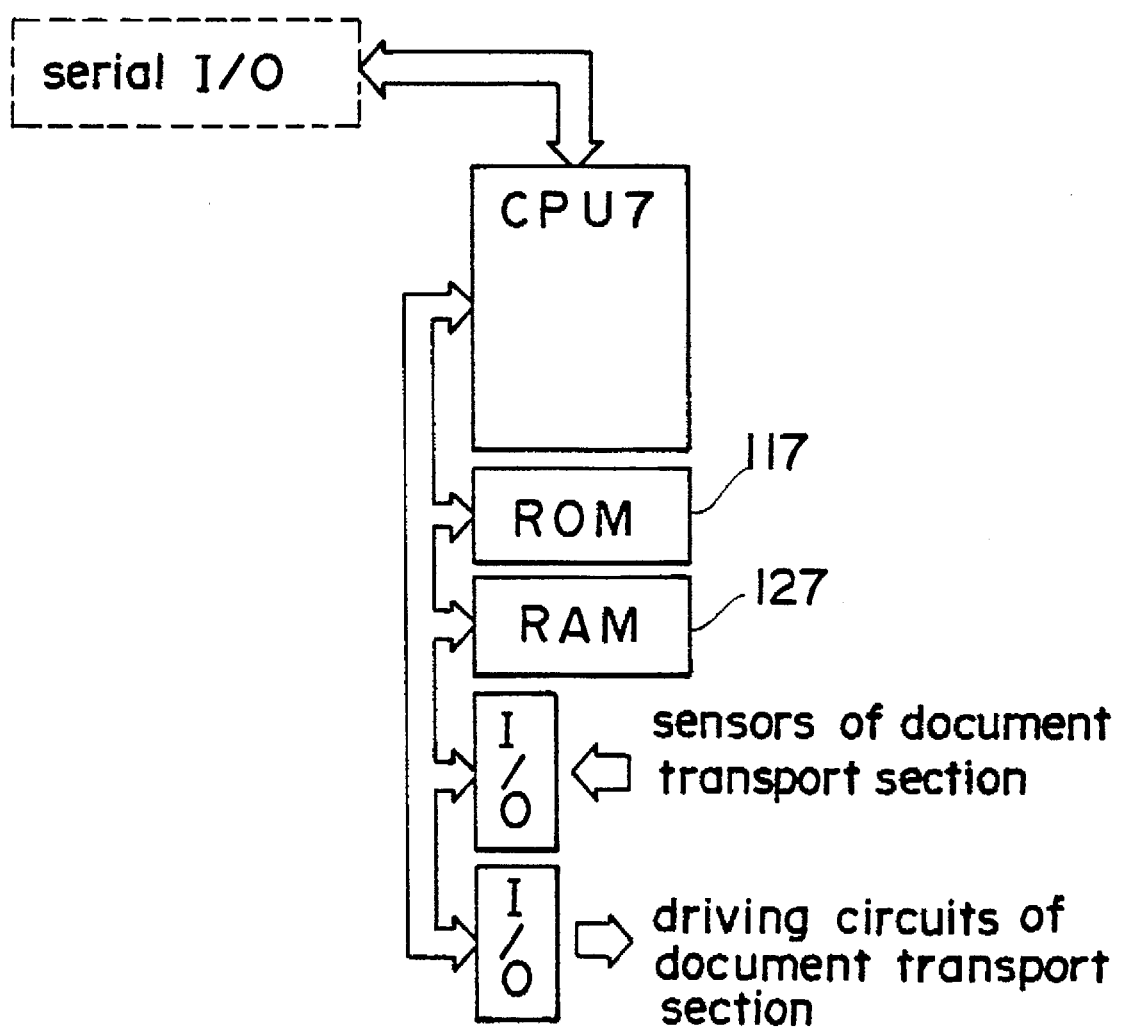
FIG. 26 is a block diagram showing the construction of the control section of the copying apparatus of FIG. 23.
Figure 27:
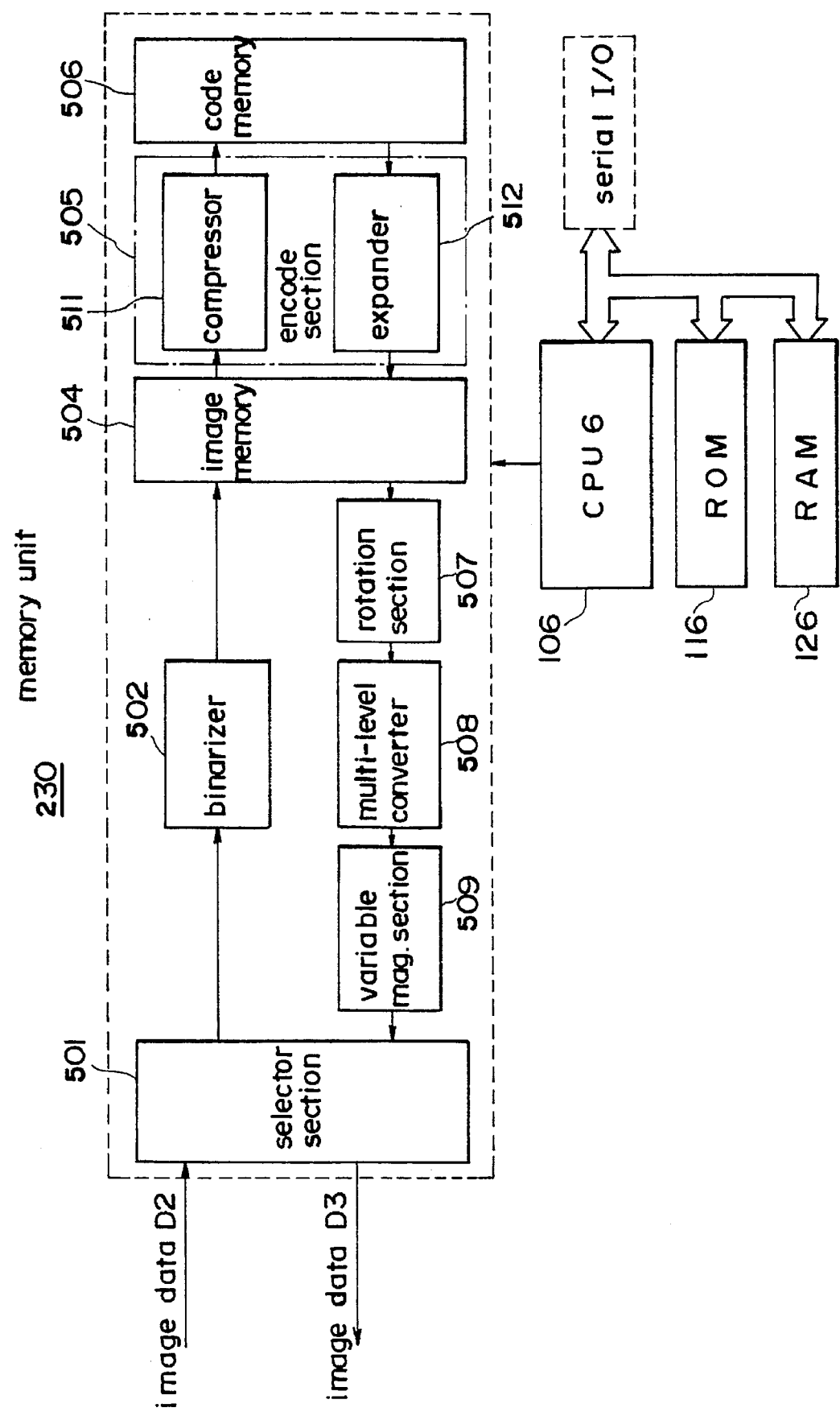
FIG. 27 is a block diagram of the memory unit of the copy apparatus of FIG. 23.

The control section 300 is described hereinafter. FIGS. 25–27 are block diagrams showing the construction of control section 300 of the copying apparatus 201. Control section 300 comprises a core of seven individual central processing units CPU1–CPU7. The respective CPU1–CPU7 are provided with read only memories ROM111–ROM117 for storing programs, and random access memories RAM121–RAM127 for program execution work areas. CPU6 is provided within memory unit 230 (refer to FIG. 27). CPU1 controls for displays and signal input from the various operation keys of operation panel OP. CPU2 controls the various parts of image signal process section 220; and CPU3 controls the actuation of scanning unit 210. CPU4 controls print process section 240, optical unit 260, and image forming unit 70. CPU5 executes processes for operation mode setting and general timing adjustments for control section 300.

CPU6 temporarily stores read image data in memory (image memory 504), reads said stored image data for output to print process section 240 by controlling memory unit 30. Thus, image reader IR and printer PRT are independently controlled, thereby improving the copy speed. This operation is described more fully later. CPU7 controls document transport section 700. Serial communications are accomplished among said CPU1–CPU7 via interrupts, so as to transmit commands, reports, and other data.

Image data processing executed by the various processing sections is described hereinafter. Image signal process section 220 comprises analog-to-digital (A/D) converter, shading correction section, variable magnification section, and image quality correction section.

Image signals transmitted from line sensor 216 are quantified as 8-bit image data via image processing section 220, and after various processing is executed, are output as image data D2.

Memory unit 230 is described hereinafter. FIG. 27 is a block diagram of memory unit 230.

Memory unit 230 comprises selector section 501, binarizer 502 for generating binary data based on parameter settings input from CPU6, multiport image memory 504 provided with a capacity of two A4 size pages at 400 dots per inch (dpi), encode section 505 provided with compressor 511 and expander 512 which are independently operational, code memory 506 having multiple ports, rotation section 507, variable magnification section 509, multi-level converter 508 for generating multi-level data based on parameter settings input from CPU6, and CPU6 for general control of the aforesaid sections.

When image data D2 are written to image memory 504, encode section 505 reads out and compresses said image data as generated code data which are written to code memory 506. Code data written to code memory 506 is read out and expanded via commands from CPU so as to generate image data which are written to image memory 504.

When one page of image data are generated via expansion and written to image memory 504, said data are read out and rotated as necessary in rotation section 507, multi-level image data are generated in multi-level converter 508, image data are enlarged and reduced in variable magnification section 509, and said data are output as image data D3. Compressor 511 and expander 312 are capable of mutually independent parallel operation, and data transmission between compressor 511 and expander 512 and code memory 506 is accomplished by direct memory access (DMA) transfer.

Code memory 506 is managed by document management tables stored in RAM126. These data management tables are described in detail later.

The operation modes of memory unit 230 include direct mode, memory mode, and direct/memory (mixed) mode. Memory mode has two operations: a memory mode write operation and memory mode read operation. The direct/memory (mixed) mode is a mode which is a mixture of both the direct mode and memory mode.

In the direct mode, image data D2 transmitted from image signal process section 220 are output as image data D3 directly to print process section 240.

In the memory mode, image data D2 are binarized, and thereafter subjected to predetermined processing in image memory 504, and read from image memory 504 for output to print process section 240 as image data D3 as necessary. In the memory mode, image data D2 are output to binarizer 502, and after binarization are written to image memory 504, then compressed and written to code memory 506.

During the memory mode read operation (data output from memory to the printer), expanded image data are read from image memory 504 and output as image data D3.

In the direct/memory (mix) mode, image data D2 are output directly to print process section 240 as image data D3, and at the same time image data D2 pass through binarizer 502 and are written in image memory 504. This memory unit 230 operation mode is automatically selected in accordance with the copy mode. For example, in a normal copy mode, the direct mode is selected; and in the document mix auto mode, the memory mode is selected.

The general operation sequences of the copying apparatus in the various operation modes is described hereinafter relative to requests/commands (Q), reports (A), and data flow among CPU1–CPU6. In the drawings discussed below, nonessential commands and reports have been omitted. A user need not personally change the operation mode setting for each mode used inasmuch as the operation modes are automatically set in accordance with the copy mode as previously described.

Figure 28:
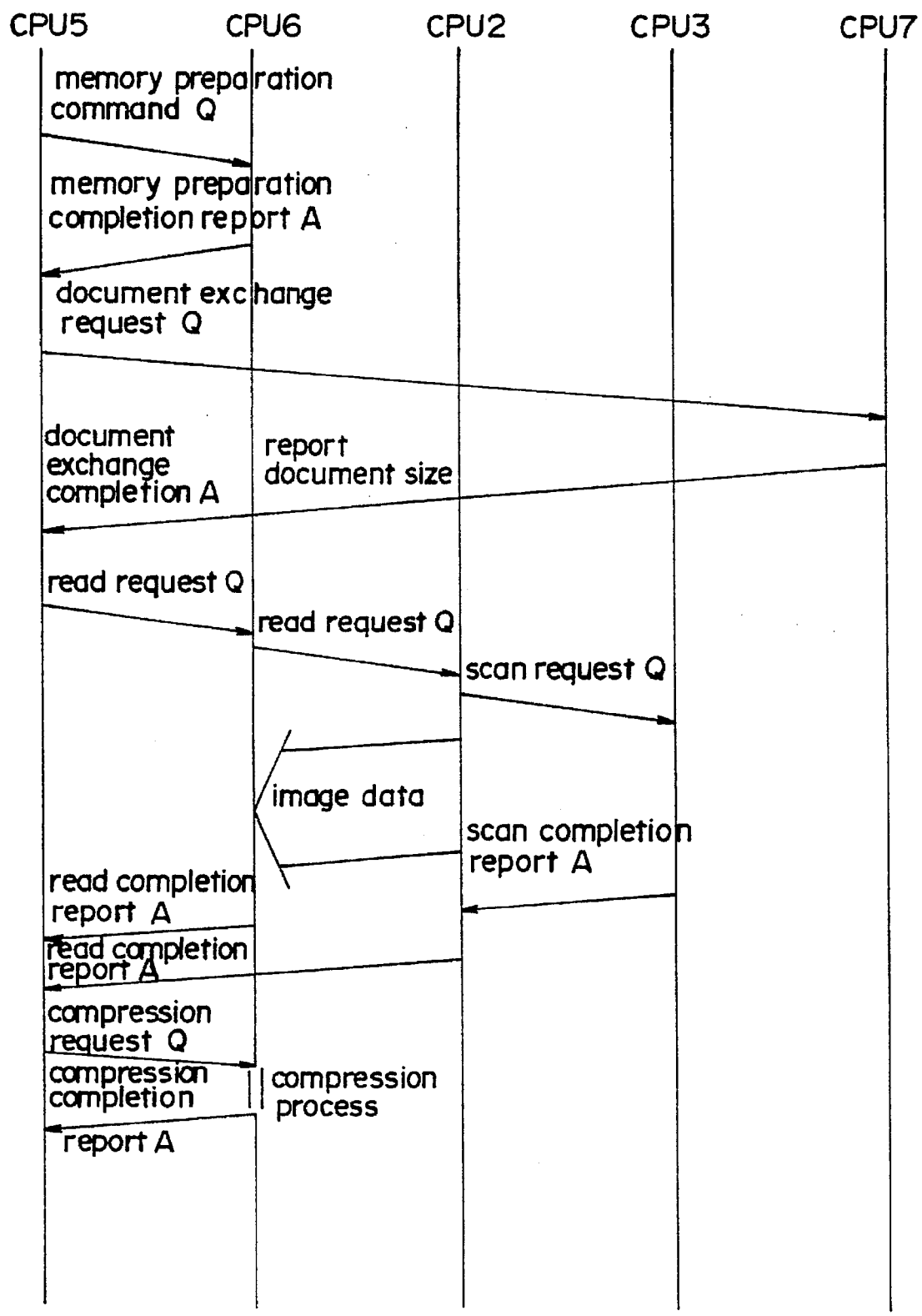
FIG. 28 is an illustration showing the sequence of the memory mode write operation of the copying apparatus of FIG. 23.

FIG. 28 is an illustration showing operation sequence of the memory mode write operation. As previously described, in the memory mode write operation, image data are transferred from image reader IR to image memory 504.

First, a memory preparation command Q is output to CPU6 from CPU5 which manages the entire sequence. When the memory preparation request Q is received, CPU6 executes hardware settings for setting the connection state of selector section 501 for the transfer of image data D2 from image signal process section 220 to image memory 504, setting binarization process mode (e.g., binarization threshold values and threshold values for the error distribution method and background elimination method), and setting the start address and XY ranges of the area to be written in image memory 504. When these settings are completed, a memory preparation completion report A is output from CPU6 to CPU5.

Then, a document exchange request Q is output from CPU5 to CPU7. When the document exchange request is received, CPU7 feeds a single sheet of an original document onto document platen 218, and detects the size of said document. When the document size is detected and document positioning is completed, a document exchange completion report A and document size parameters are output from CPU7 to CPU5. CPU5 creates a document management table based on the detected document size, as shown in FIG. 31.

In the digital copying apparatus of the present invention, an automatic document feeder (ADF) comprising document transport section 700 feeds from the final page of a document, such that the first fed page of a document is page N and is a number identical to the total number of pages of said document. Information appended to the document management table is described later via flow charts.

When the aforesaid settings are set and preparation has been completed, the various completion reports are received by CPU5 which outputs a read request Q to CPU6 and CPU2. A scan request Q is output from CPU2 to CPU3, whereupon scanning starts.

When a scan reaches a document image region, the read data (image data D2) are output to memory unit 230 in accordance with the image processing mode set by CPU2.

When scanning is completed, read completion reports A are respectively output from CPU2 and CPU6 to CPU5. Thereafter, a compression request Q is output from CPU5 to CPU6, and when said request is received, CPU6 sets and activates the read address and XY ranges from image memory 504, write address to code memory 506, and compressor 511 mode (e.g., modified Huffman (ME) method). Thus, a compression process is executed, and code data are stored in code memory 506. When the compression process is completed, a compression completion report A is output from CPU6 to CPU5.

Figure 29:
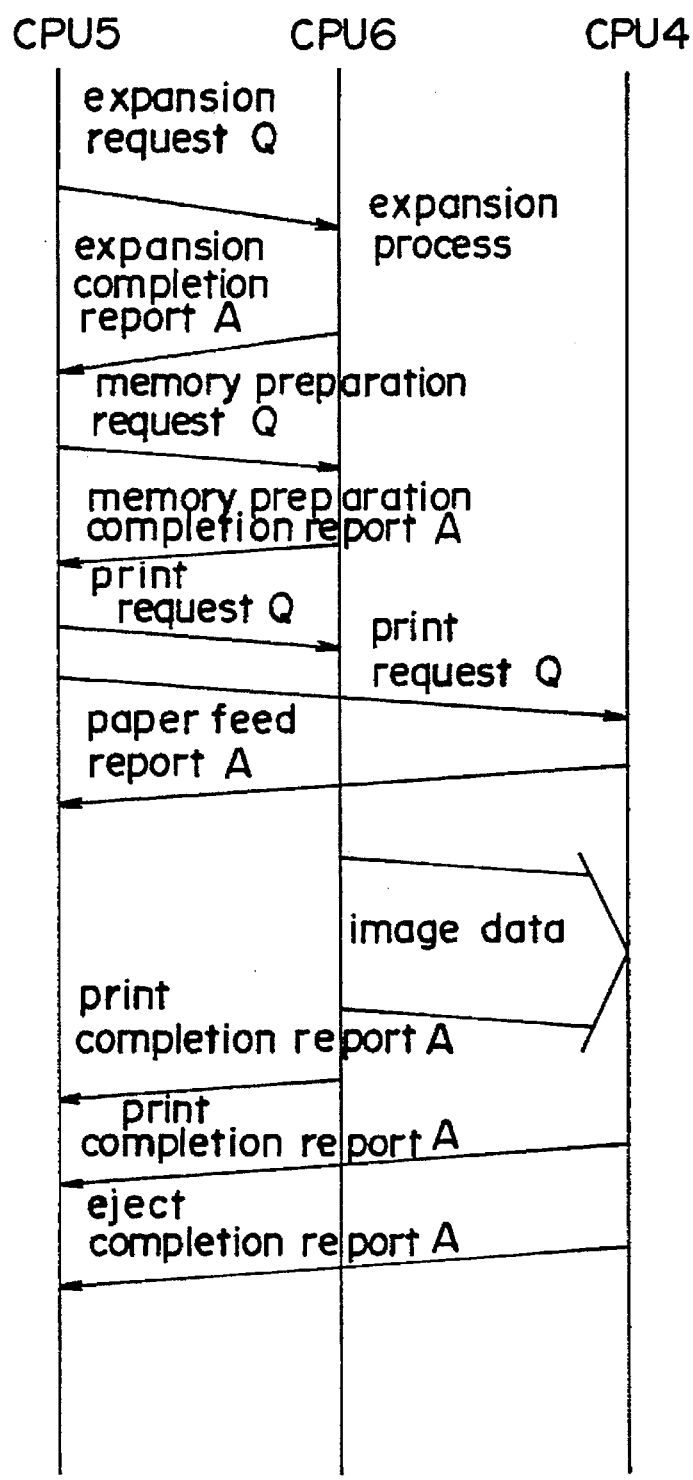
FIG. 29 is an illustration showing the sequence of the memory mode read operation of the copying apparatus of FIG. 23.

FIG. 29 is an illustration showing the memory mode read operation sequence. As previously described, in the memory mode read operation, image data are read out from image memory 504, and output to printer PRT for printing on copy sheets.

First, an expansion request Q is output from CPU5 to CPU6. When the aforesaid request is received, CPU6 sets and activates the readout address from code memory 506, data amount, write address to image memory 504, XY ranges, and expander 512 mode (e.g., MH mode). Thus, the expansion process is executed, and image data are written to image memory 504.

When the expansion process is completed, an expansion completion report A is output from CPU6 to CPU5. A memory preparation request Q is output from CPU5 to CPU6 to request readout of image data from image memory 504. When this request is received, CPU6 executes hardware settings for setting the connection state of selector section 501 for the transfer of image data D3 from image memory 504 to print process section 240, setting the rotation process and variable magnification process, and setting start address and XY ranges for the readout region of image memory 504.

When the aforesaid settings are set and preparation has been completed, a memory preparation completion report A is output from CPU6 to CPU5. When this report is received, print requests Q are output from CPU5 to CPU4 and CPU6, and a paper feed report A indicating the copy sheet transport status is output from CPU4 to CPU5. Thereafter, image data D3 are readout from image memory 504 and transmitted to printer PRT to accomplish printing.

When printing is completed, a print completion report A and eject completion report A are output from CPU6 and CPU4, respectively, to CPU5. When these reports are received, CPU5 outputs a memory clear request Q to CPU6 in relation to the operation mode.

The document mix auto mode is described in detail hereinafter. FIG. 30 shows a specific example executing the two-in-one mode in the document mix auto mode. Referring to FIG. 30, consider copying A4, B5, A5, and A6 size original documents consecutively on A4 size copy sheets in the two-in-one mode.

At this time, each original document is to be printed at A5 size which is one half the A4 size, such that the first page is subjected to A4A5 (×0.707) variable magnification processing, the second page is subjected to B5BA4 (×0.813) variable magnification processing, and these pages are copied onto a single copy sheet. The third page is not subjected to variable magnification processing, and the fourth page is subjected to A6A5 (×1.410) variable magnification processing, and these pages are copied onto a single copy sheet. Appended information for document size and variable magnification processing is stored in the document management table shown in FIG. 31.

Copy editing is realized without awareness of the original document sizes by executing the variable magnification process in accordance with the size of each document page by executing the previously described processes even when the original document comprises pages of different sizes. Although, in the present embodiment, a method is illustrated wherein original document images are copied by variable magnification within a size one half the copy sheet, it is possible to change the print region for each document. Thus, by this means it is possible to edit copy without variable magnification of the original document image. Therefore, in the duplex copy mode, copy editing can be realized without awareness of the sizes of the original documents.

Although the foregoing example combines a two-in-one mode with a document mix auto mode, the concept of the present invention could also be used to combine a duplex copying mode with a document mix auto mode. In such a combined mode, and with reference to FIG. 30, page 1 would be copied onto a first side of the first copy sheet at equal magnification, and page 2 would be copied onto a back side of the first copy sheet with B5A4 enlargement. Page 3 would be copied onto a first side of a second copy sheet at an A5A4 enlargement, and page 4 would be copied onto a back side of the second coy sheet at an A5A4 enlargement.

The operation of copying apparatus 201 is described hereinafter with reference to the flow charts mentioned below. The following description pertains sequentially to the main routines executed by CPU1–CPU7, and thereafter the subroutines executed by said main routines.

Figure 32:
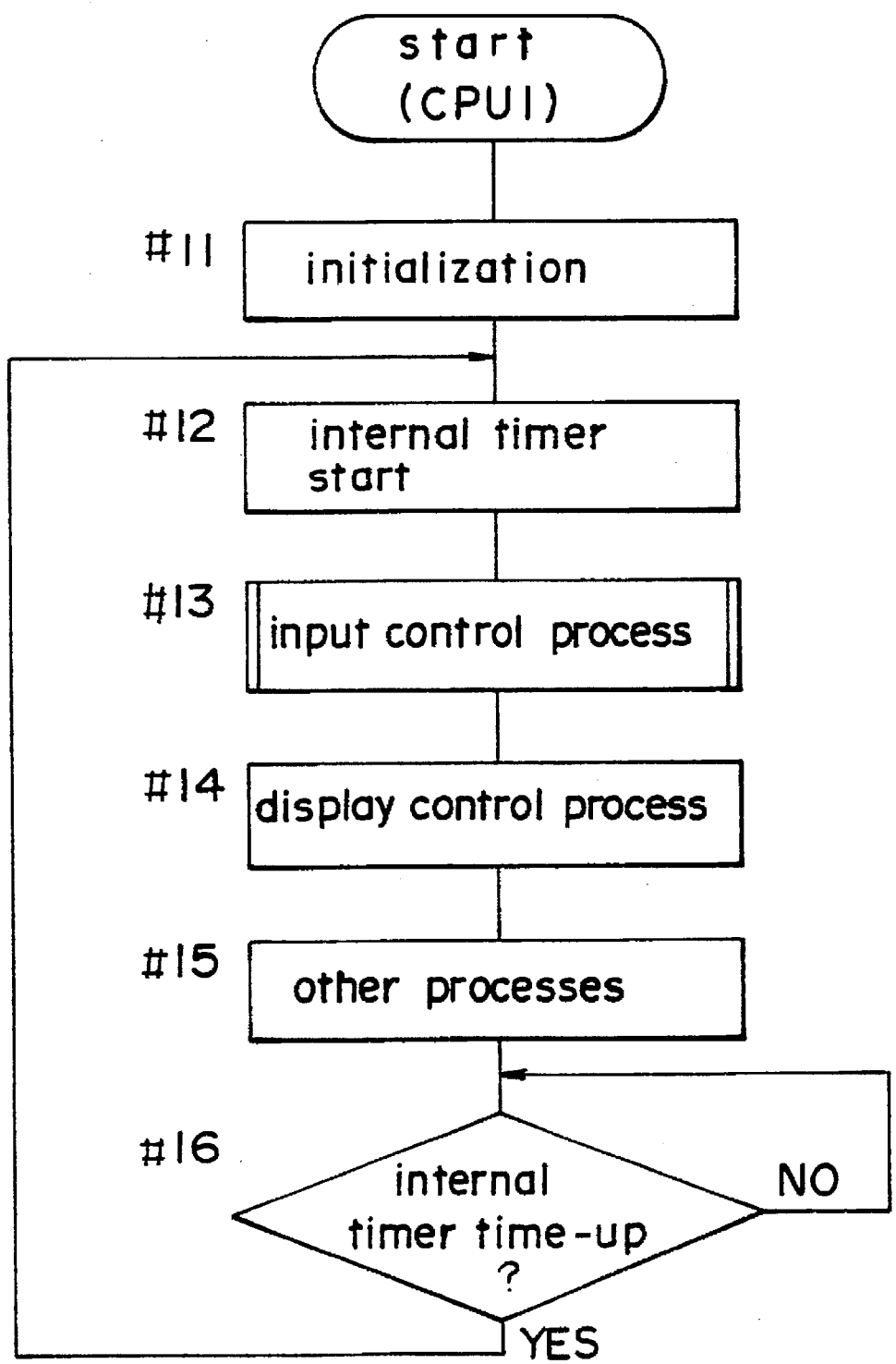
FIG. 32 is a flow chart of the main routine executed by CPU1 of the copying apparatus of FIG. 23.

FIG. 32 is a flow chart of the main routine executed by CPU1. After initialization (step #11; hereinafter "step" is omitted), an internal timer is started to standardize the time for the routine (#12, #16), input control process and display control process are executed for operation panel OP (#13, #14), and other processes are executed in step #15. Communication with other CPU2–CPU7 is accomplished by an interrupt process.

Figure 33:
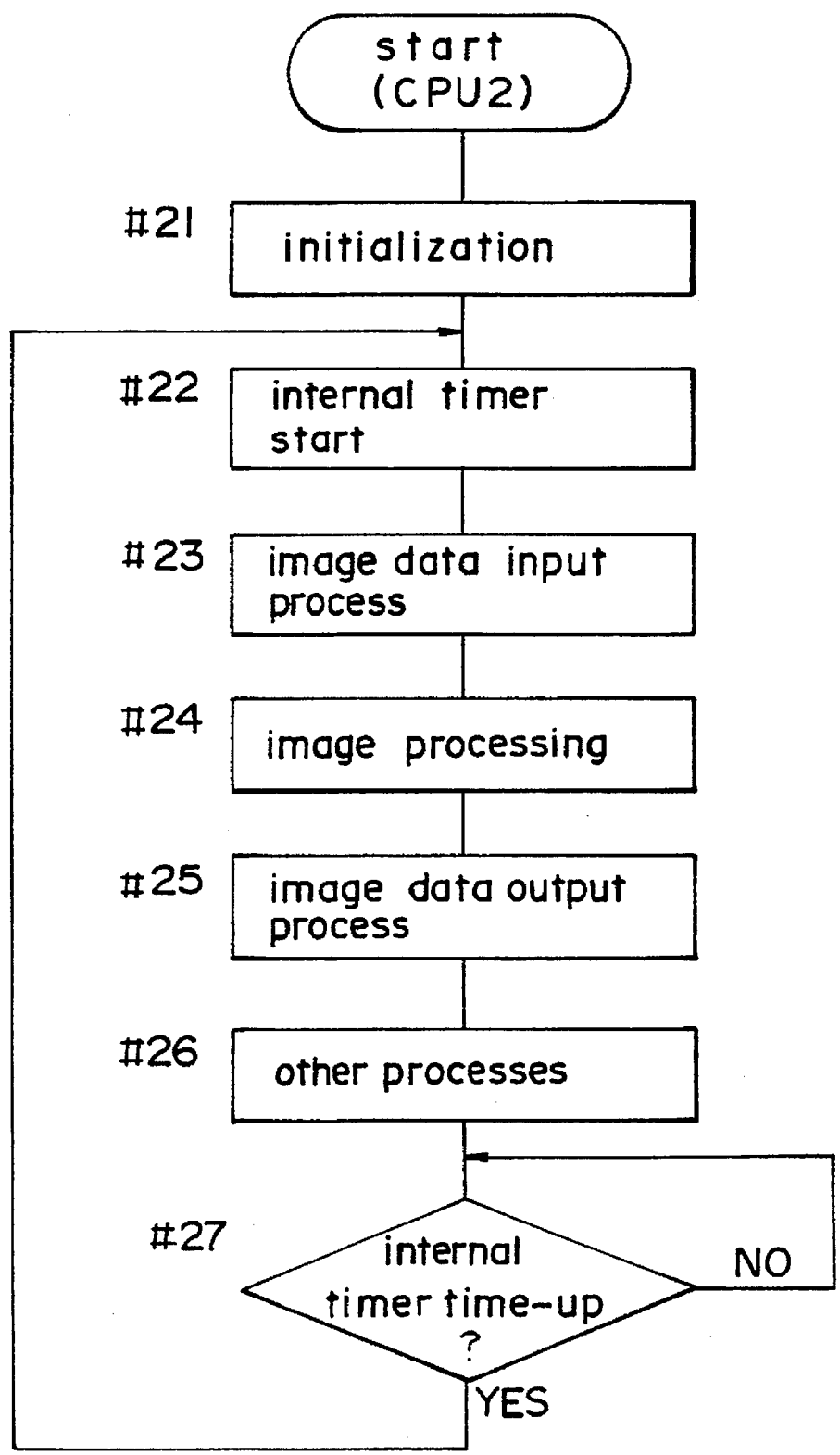
FIG. 33 is a flow chart of the main routine executed by CPU2 of the copying apparatus of FIG. 23.

FIG. 33 is a flow chart showing the main routine executed by CPU2. After the image data input process is executed (#23), image processing, image data output process, and other processes are executed (#24–#26).

Figure 34A:
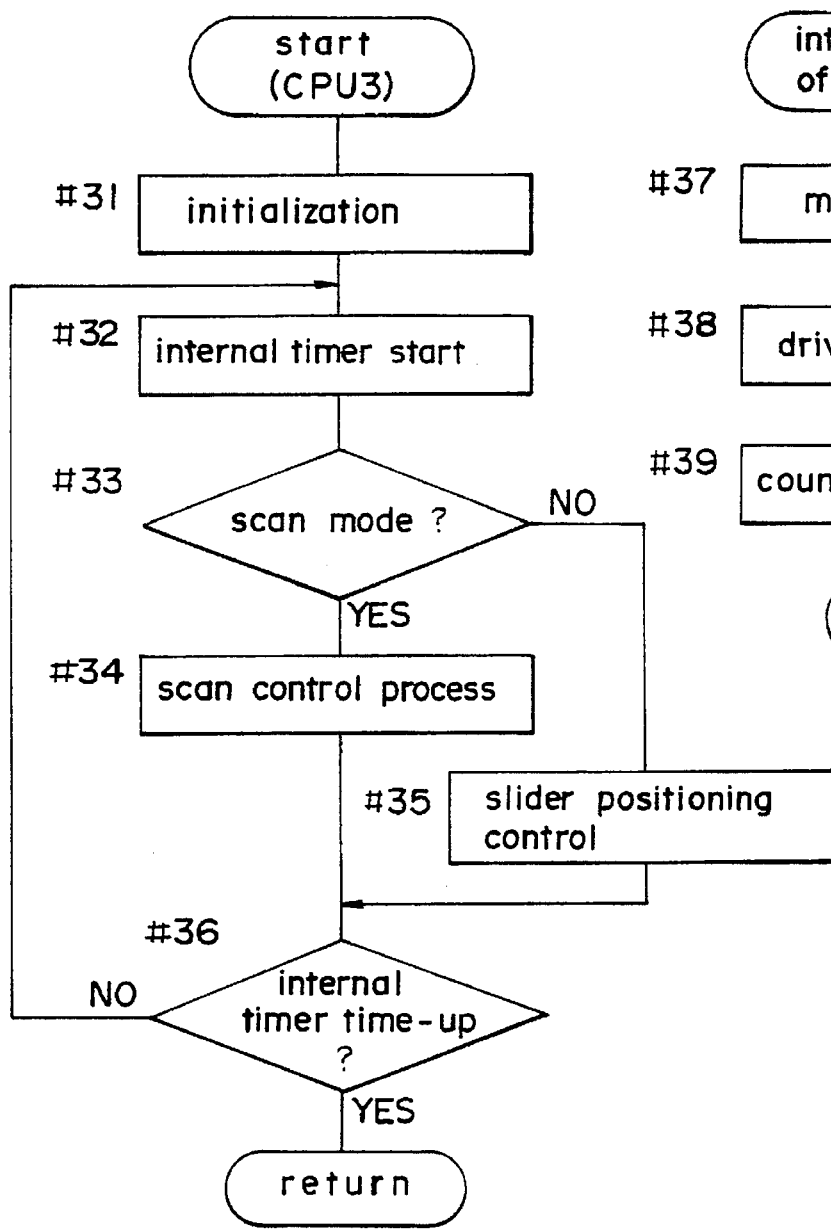
FIG. 34 is a flow chart of the main routine executed by CPU3 of the copying apparatus of FIG. 23.
Figure 34B:
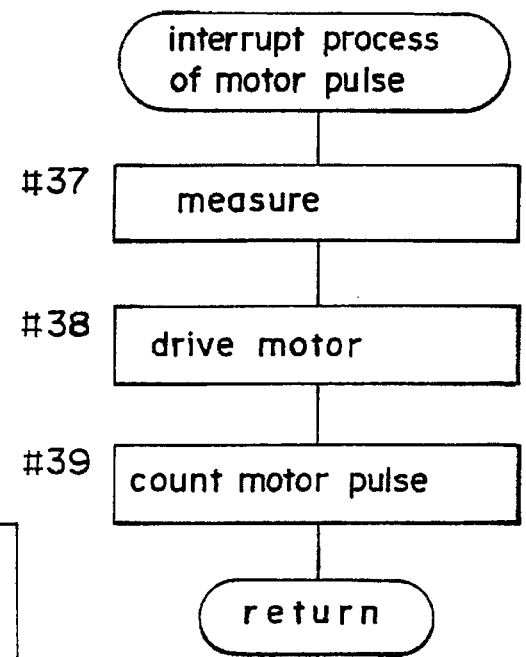

FIG. 34A is a flow chart showing the main routine executed by CPU3; FIG. 34B is a flow chart showing the motor pulse interrupt executed by the interrupt process whenever a motor pulse is generated in synchronization with the rotation of scan motor M2. Referring to FIG. 34A, CPU3 controls scanning unit 210. When the scan mode is set (#33: YES), the scan control process is executed to scan by scanner 19 (#34), and when the continuous mode is set (#34: NO), the slider positioning control is executed (#35).

Referring to FIG. 34B, when the interrupt process is activated by a motor pulse generated synchronously with the rotation of scan motor M2, the time of said motor pulse interrupt interval is measured (#37), the motor power is switched ON/OFF (#38), and the motor pulse count is accomplished (#39).

Figure 35:
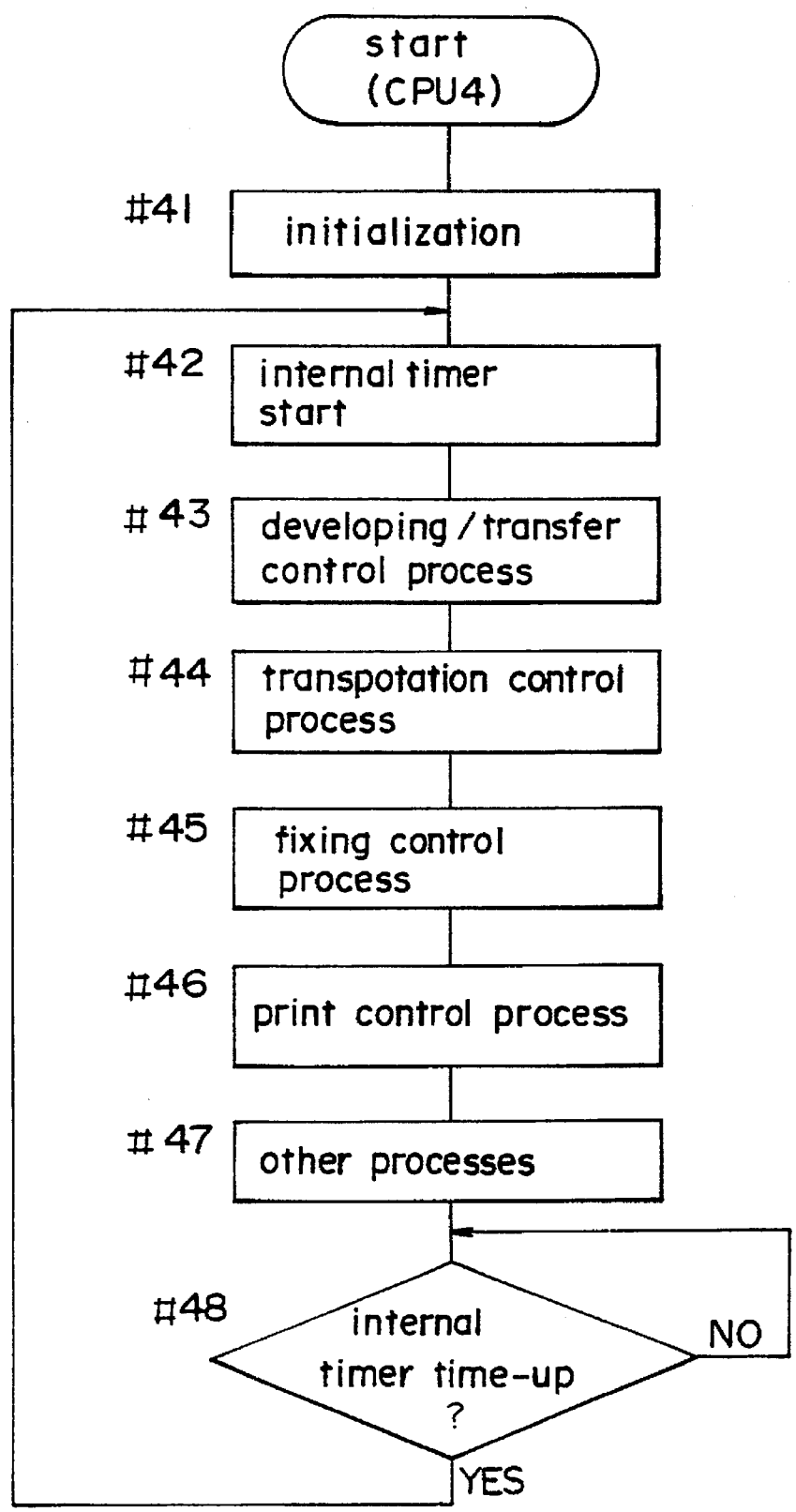
FIG. 35 is a flow chart of the main routine executed by CPU4 of the copying apparatus of FIG. 23.

FIG. 35 is a flow chart showing the main routine executed by CPU4. CPU4 controls the printer PRT. Developing/transfer unit 270A is controlled (#43), transport unit 270B is controlled (#44); fixing unit 70C is controlled (#45), print process section 240 is controlled (#46), and other processes are executed (#47).

Figure 36:
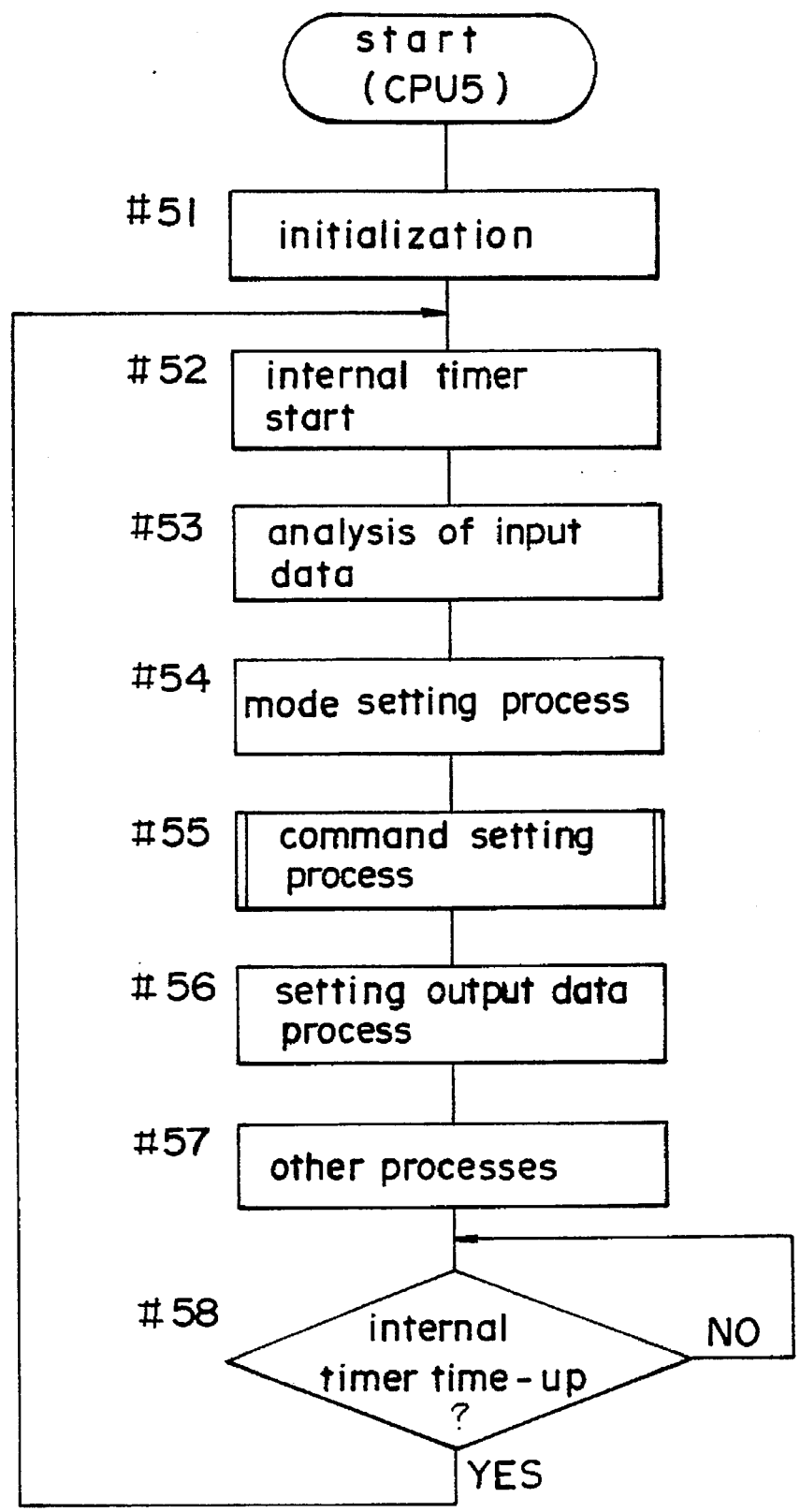
FIG. 36 is a flow chart of the main routine executed by CPU5 of the copying apparatus of FIG. 23.

FIG. 36 is a flow chart showing the main routine executed by CPU5. CPU5 sets the operating modes and issues commands to activate and stop the other CPUs, and controls the general operation of copying apparatus 201. After data are input via communication accomplished via interrupt, the contents of said data are analyzed (#53), and a mode setting process is executed (#54) when the operation mode is charged in accordance with said data content. Memory write and read controls are executed in accordance with the copy mode via commands set in #55. The aforesaid data are set in the output area for output via communications (#56).

Figure 37:
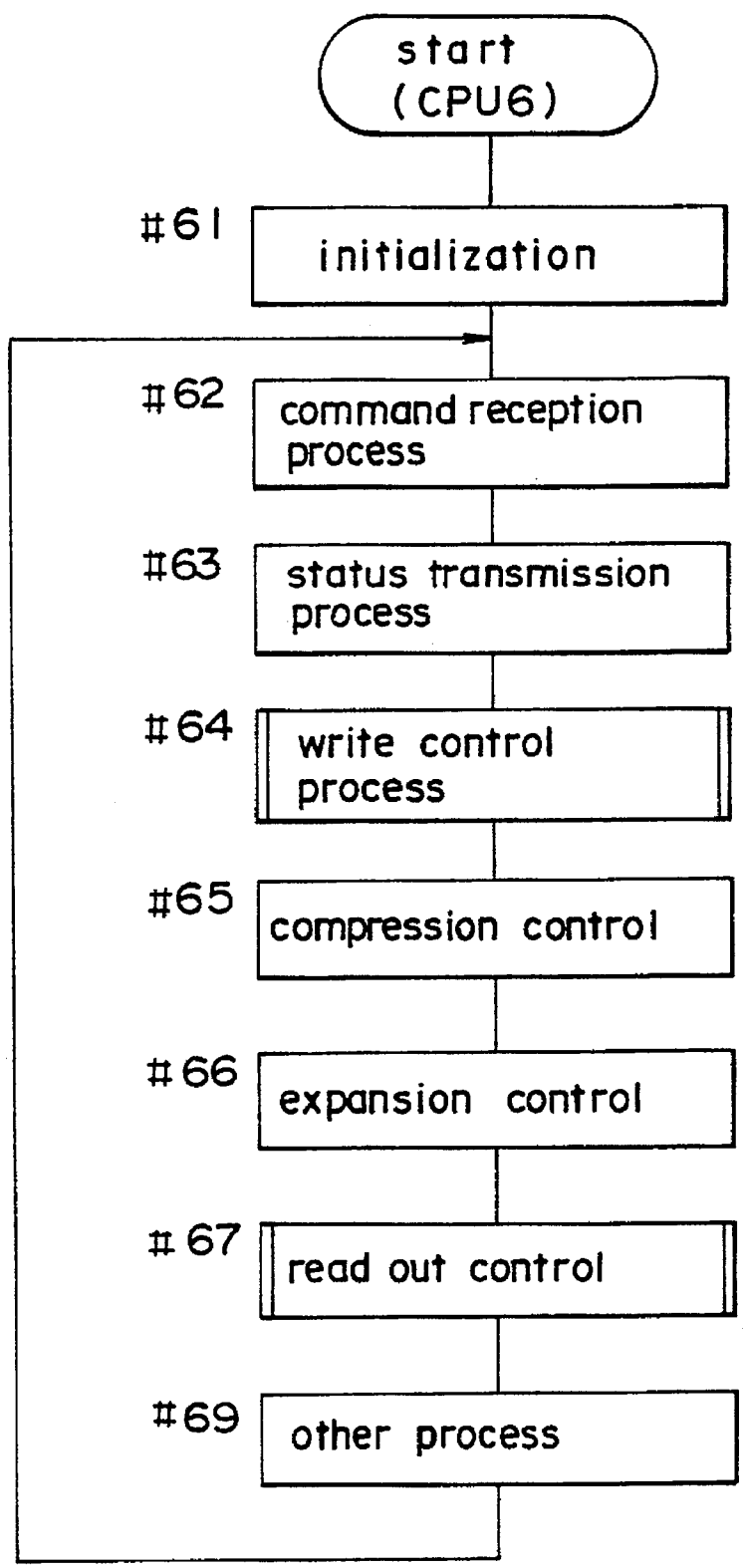
FIG. 37 is a flow chart of the main routine executed by CPU6 of the copying apparatus of FIG. 23.
Figure 38:
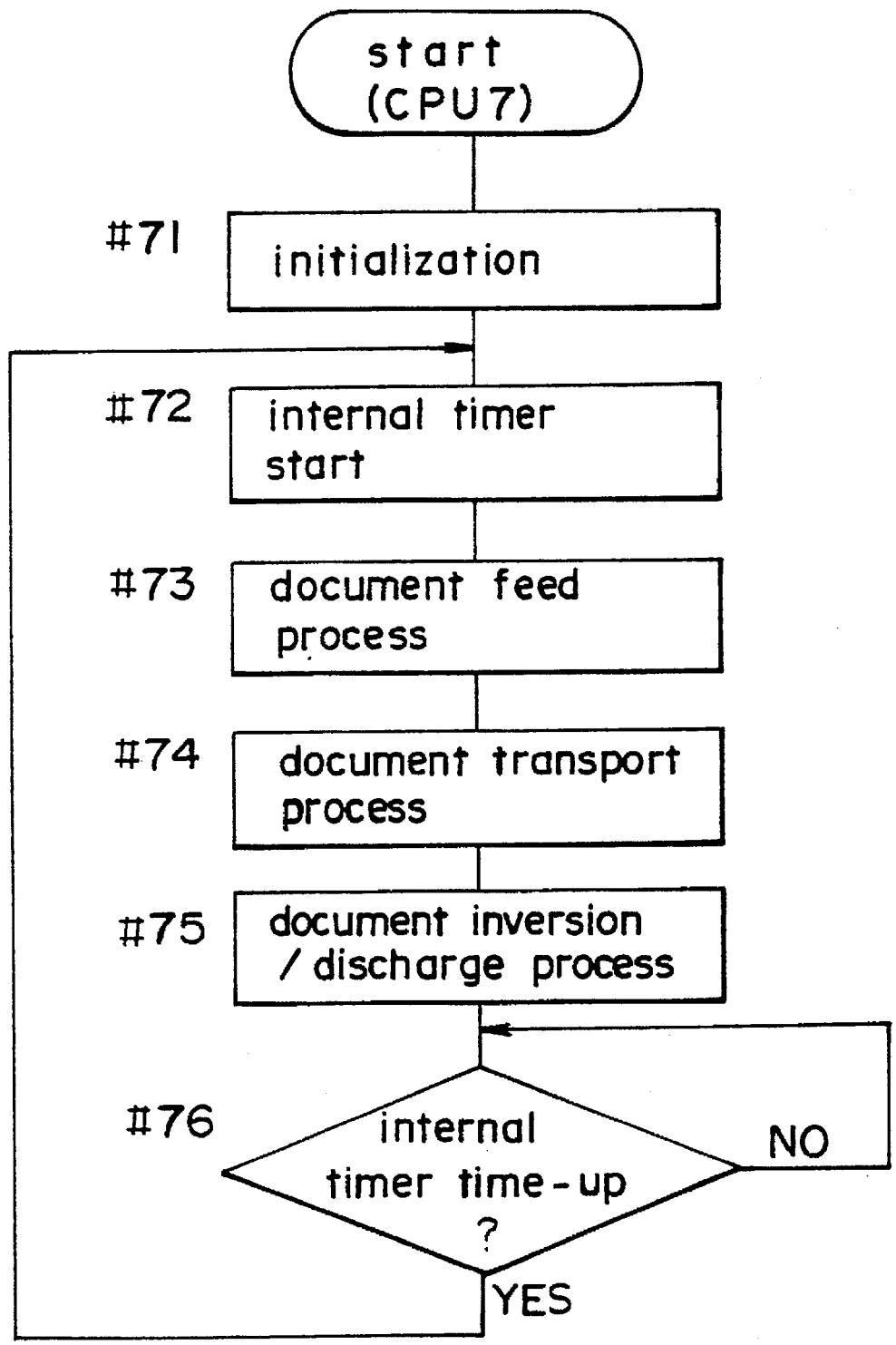
FIG. 38 is a flow chart of the main routine executed by CPU7 of the copying apparatus of FIG. 23.

FIG. 37 is a flow chart showing the main routine executed by CPU6. CPU6 controls memory unit 230. A command reception process for commands received from other CPUs is executed (#62), status transmission process is executed (#63), write control process for writing to image memory 504 is executed (#64), compression control is executed (#65), expansion control is executed (#66), and readout control for reading from image memory 504 is executed (#67).

Figure 16:
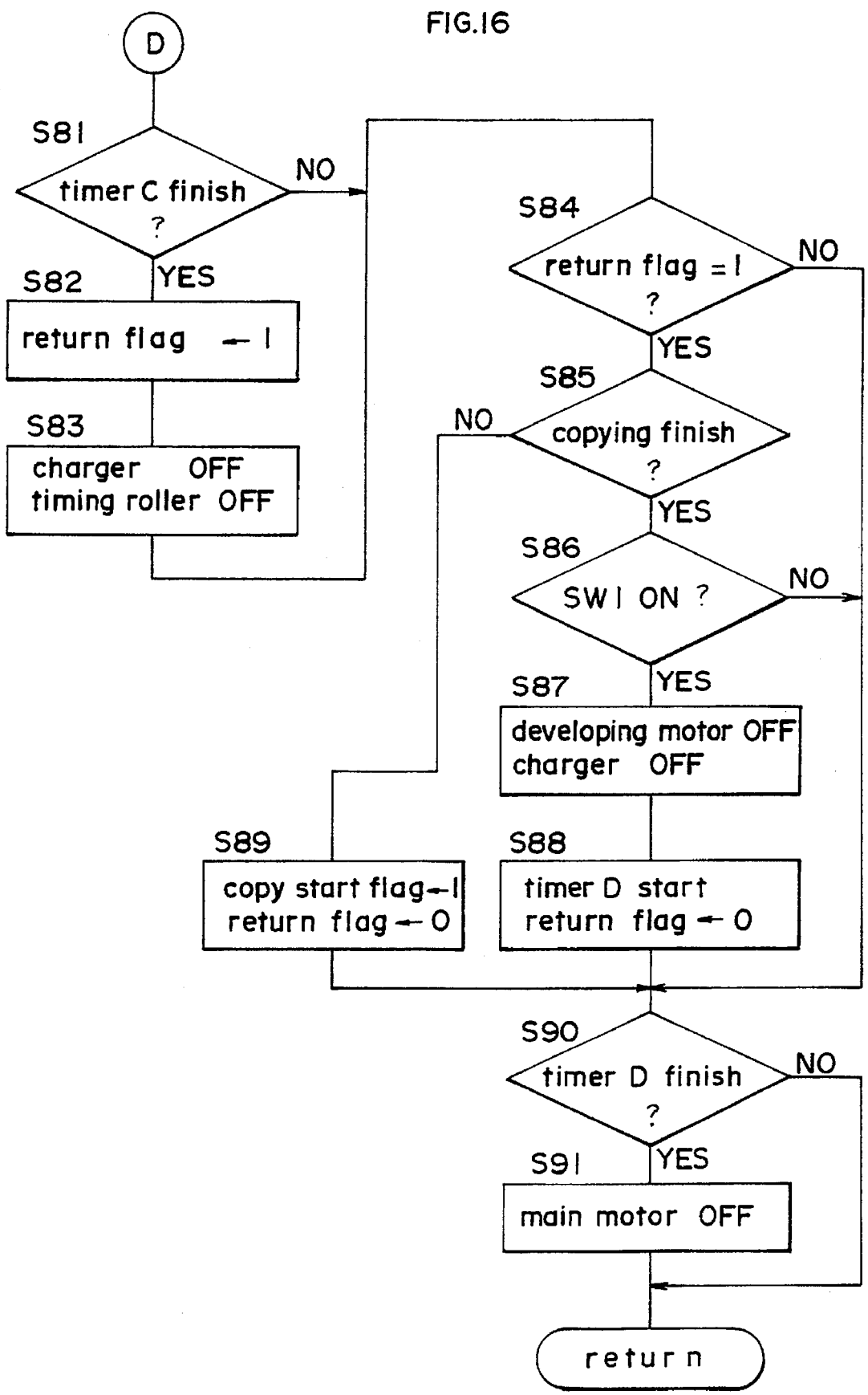
FIG. 16 is a flow chart continuing FIG. 15 showing the copy operation subroutine.

FIG. 16 is a flow chart showing the main routine of CPU7. CPU7 controls document transport section 700. The document feed process is executed (#73) to correct any inclination of a fed document and control its transport to transport belt 706. The document transport process is executed (#74) to control positioning of a document at a predetermined reading position via transport belt 706, and transport said document to inverting roller 707. The document inversion/discharge process is executed (#75) to control the discharge of a document directly from inverting roller 707 or refeeding said document therefrom to transport belt 706.

Figure 39:
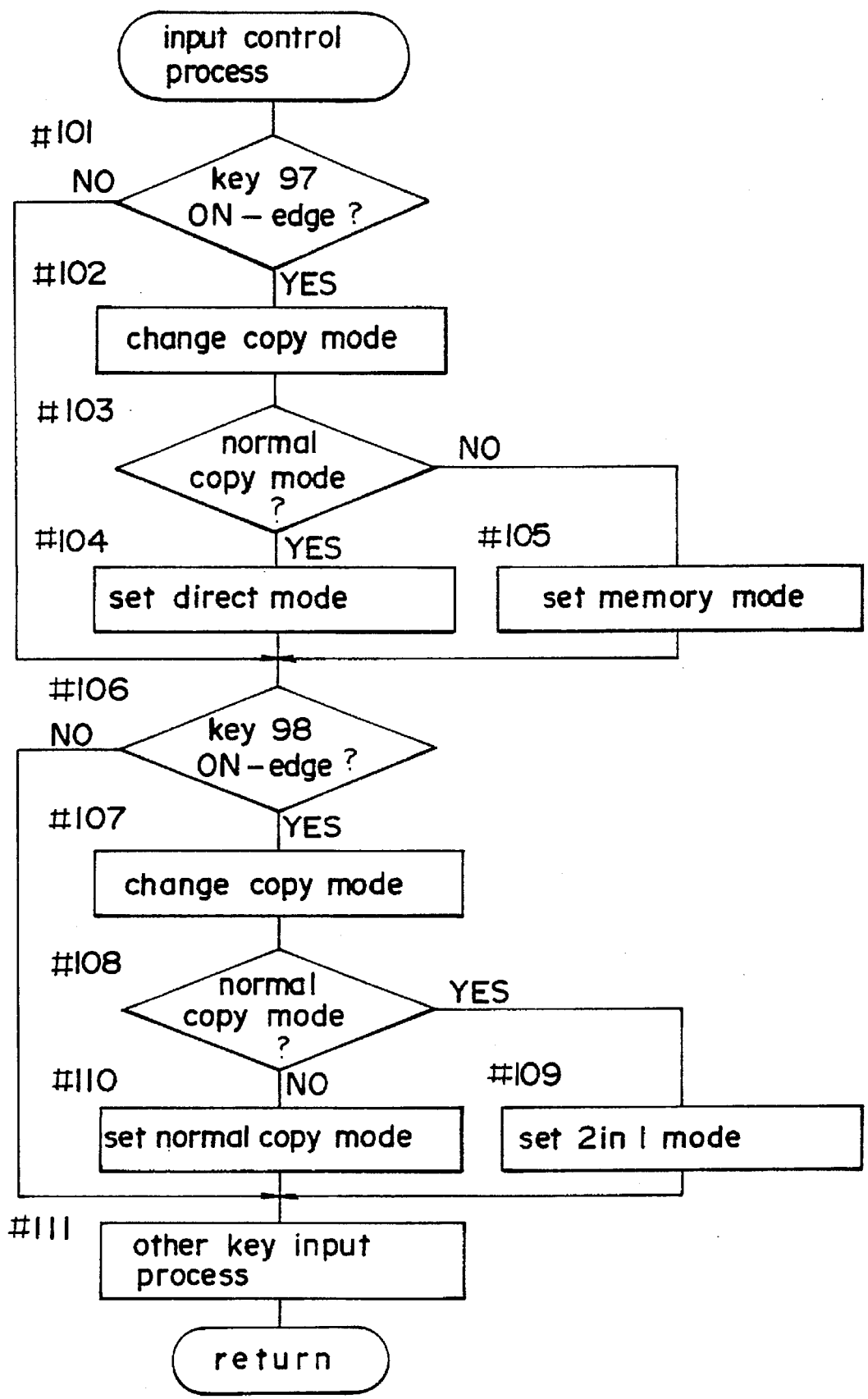
FIG. 39 is a flow chart of the input control subroutine of the copying apparatus of FIG. 23.

FIG. 39 is a flow chart showing a subroutine of the input control process of step #13 of FIG. 32. Each time a change of state from OFF to ON of the mode setting key 297 (ON-edge state) is detected (#101: YES), mode display 297a or 297b is lighted, said mode displays 297a and 297b corresponding to alternate selection of the respective copy modes [normal copy mode], [document mix auto mode]. When the normal copy mode is selected (#103: YES), the direct mode is set (#104). When the document mix auto mode is selected, the memory mode is set (#105). Then, a check is made to detect whether or not the two-in-one setting key 298 is ON-edge (#106). If key 298 is ON-edge, the copy mode is switched in step #107. At this time, when the normal copy mode is set in step #108, the two-in-one mode is set, and display LED (light emitting diode) 298a is lighted in step #109. When the two-in-one mode is set in step #108, the normal mode is set, and display LED 298a is lighted in step #110. Thereafter, the routine advances to step #111, and the key input process is executed for input from the keys other than the mode setting key 297 such as keys of the ten-key pad and the like.

Figure 40:
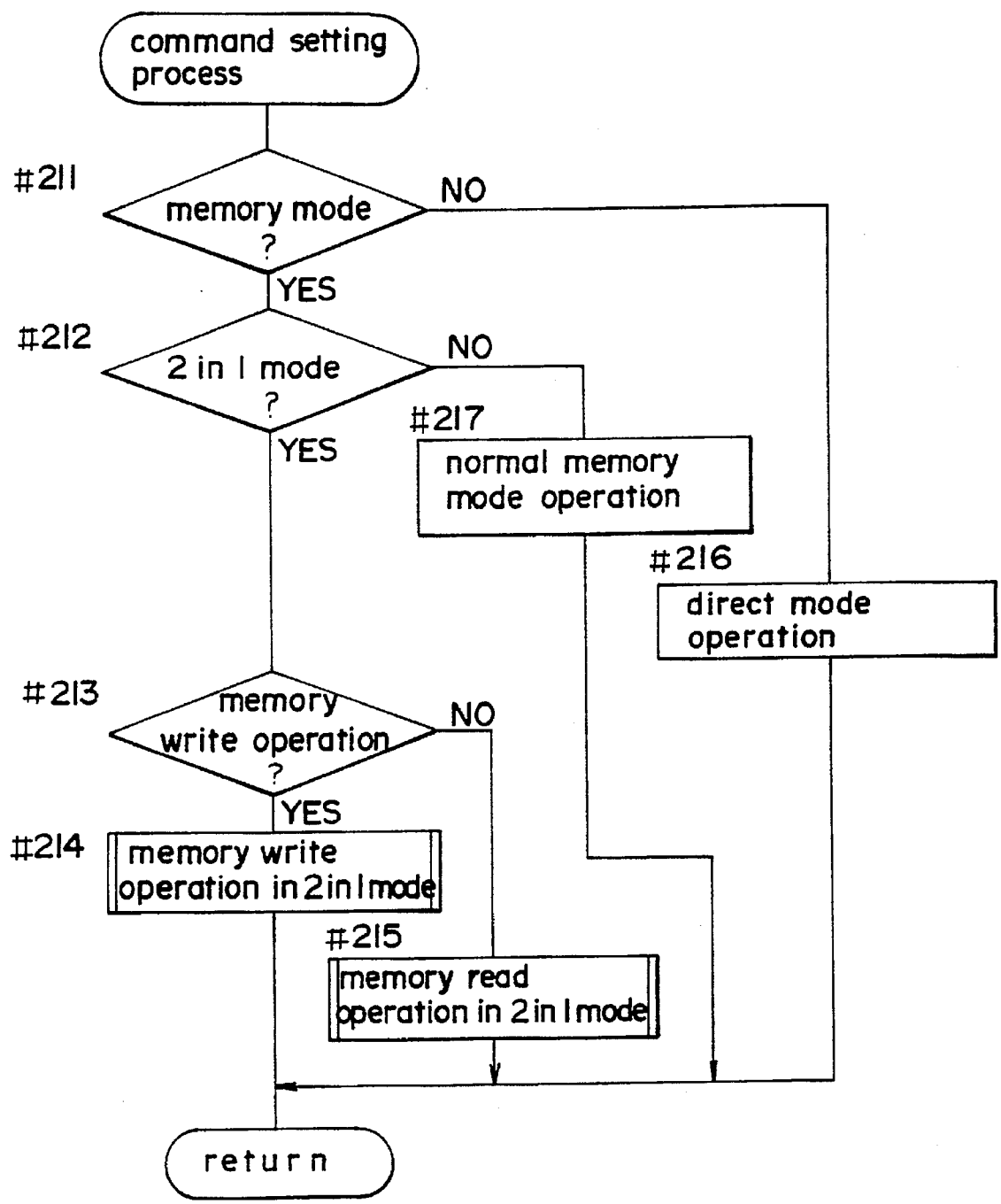
FIG. 40 is a flow chart of the command setting subroutine of the copying apparatus of FIG. 23.

FIG. 40 is a flow chart showing a subroutine of the command setting process of step #55 in FIG. 36. When the memory mode is set, i.e., when the document mix auto mode is determined by the process of steps #103 and #105 of FIG. 39 and the memory mode is set (#105: YES), a check is made to determine whether or not the two-in-one mode is set in step #212. When the two-in-one mode is set (#212: YES), the memory operation of the two-in-one mode is entered in steps #213, #214, #215. That is, all documents are read beforehand, and two-in-one variable magnification is set for each document, such that image data for each two pages are output and printed.

When the two-in-one mode is not set in step #212, normal memory mode operation is entered (#217). That is, each single original document is read, variable magnification is set for a single page, and image data are readout for each single page and printed.

When the direct mode is set (#211: NO), the necessary commands are set for the direct mode (#216).

Figure 41:
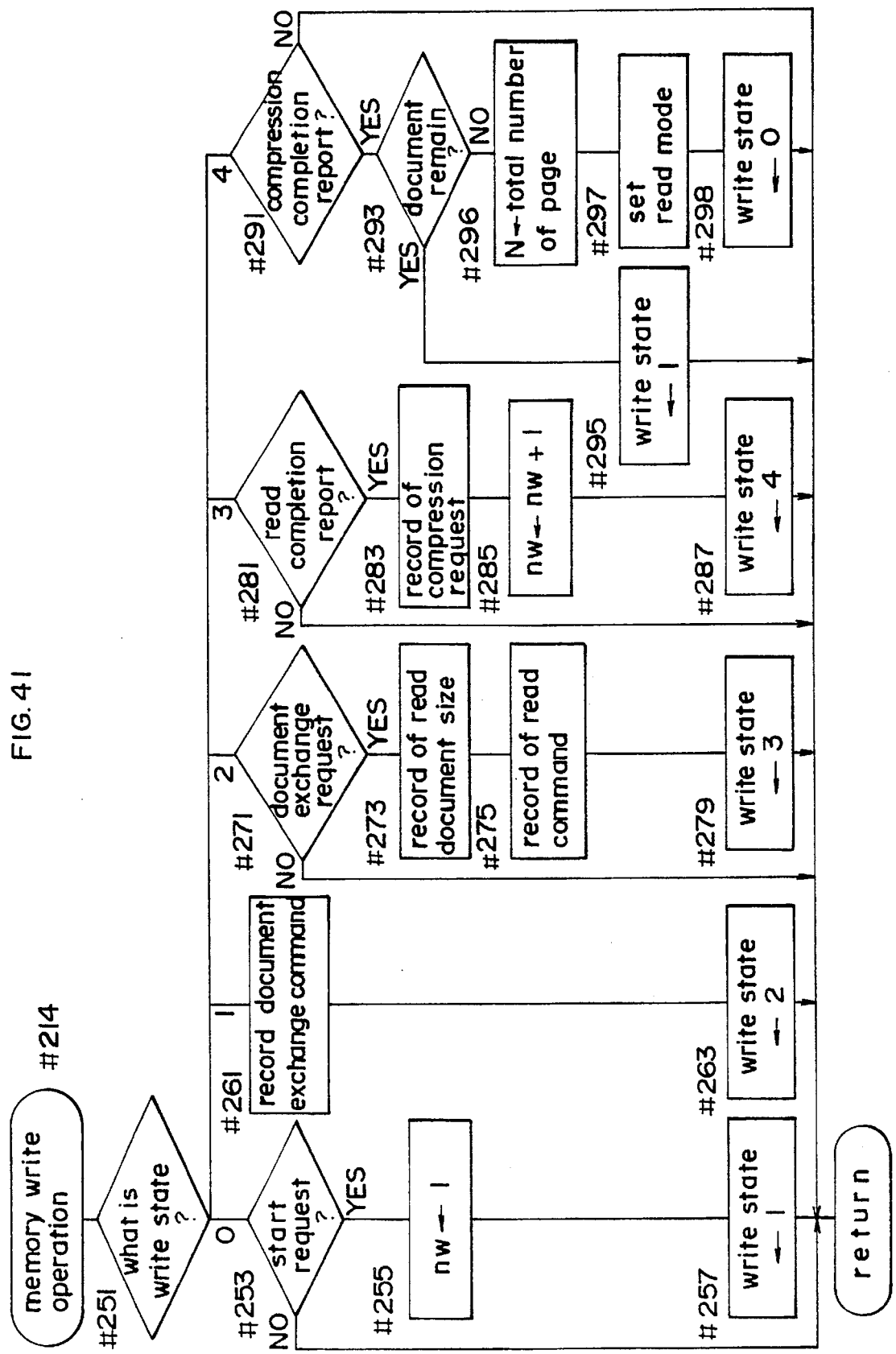
FIG. 41 is a flow chart of the write operation subroutine of the copying apparatus of FIG. 23.

FIG. 41 is a flow chart of the command settings for the memory write operation of the two-in-one mode in the document mix auto mode of (FIG. 40). The flow is divided into branches in accordance with the value of the write state of #251, i.e., #253 (when the value is [0]), #261 (when the value is [1]), #271 (when the value is [2]), #281 (when the value is [3]), and #291 (when the value is [4]). These branches are described below.

(a) Write state=[0]

When a start request is received from CPU1 (#253: YES), the variable number nw expressing number of written pages is initialized (#255). Thereafter, the write state is updated (#257). When a start request is not received (#253: NO), the same process is executed when the subroutine is again called without updating the write state.

(b) Write state=[1]

After document exchange command is recorded in the previously mentioned document exchange request buffer (#261), the write state is updated (#263). The document exchange request buffer is provided within RAM152 which is connected to CPU5; the document exchange request buffer is read in step #56 of FIG. 36, and the data output.

(c) Write state=[2]

When a document exchange completion report is received (#271: YES), the document size received from CPU7 is recorded as a report parameter expressing the page number nw of the document management table (#273). Then, after the read command is recorded in the read request buffer (#275), the write state is updated (#279). The read request buffer has a construction identical to that of the previously mentioned document exchange request buffer.

(d) Write state=3

When a read completion report is received (#281: YES), the variable nw expressing the page number is recorded as a parameter in the compression request buffer (#283), the variable nw is incremented by [1] in preparation for the next write operation (#285), and the write state is updated (#287).

The compression request buffer is read with the parameters of step #56 of FIG. 36, and output to CPU6. Based on the read data, CPU6 generates a document management table for executing the compression process.

(e) Write state=[4]

When a compression completion report is received (#291: YES), the process described below is executed. Based on status information transmitted from CPU7, a determination is made as to whether or not a document remains on document feed tray 710. When document(s) still remain to be fed (#293: YES), the write status is set at [1] (#295), and the previously described process is repeated.

When all documents have been fed (#293: NO), the variable N expressing the total number of written pages is set (#296), the read mode is set (#297), and the write state is reset (#298).

Figure 42:
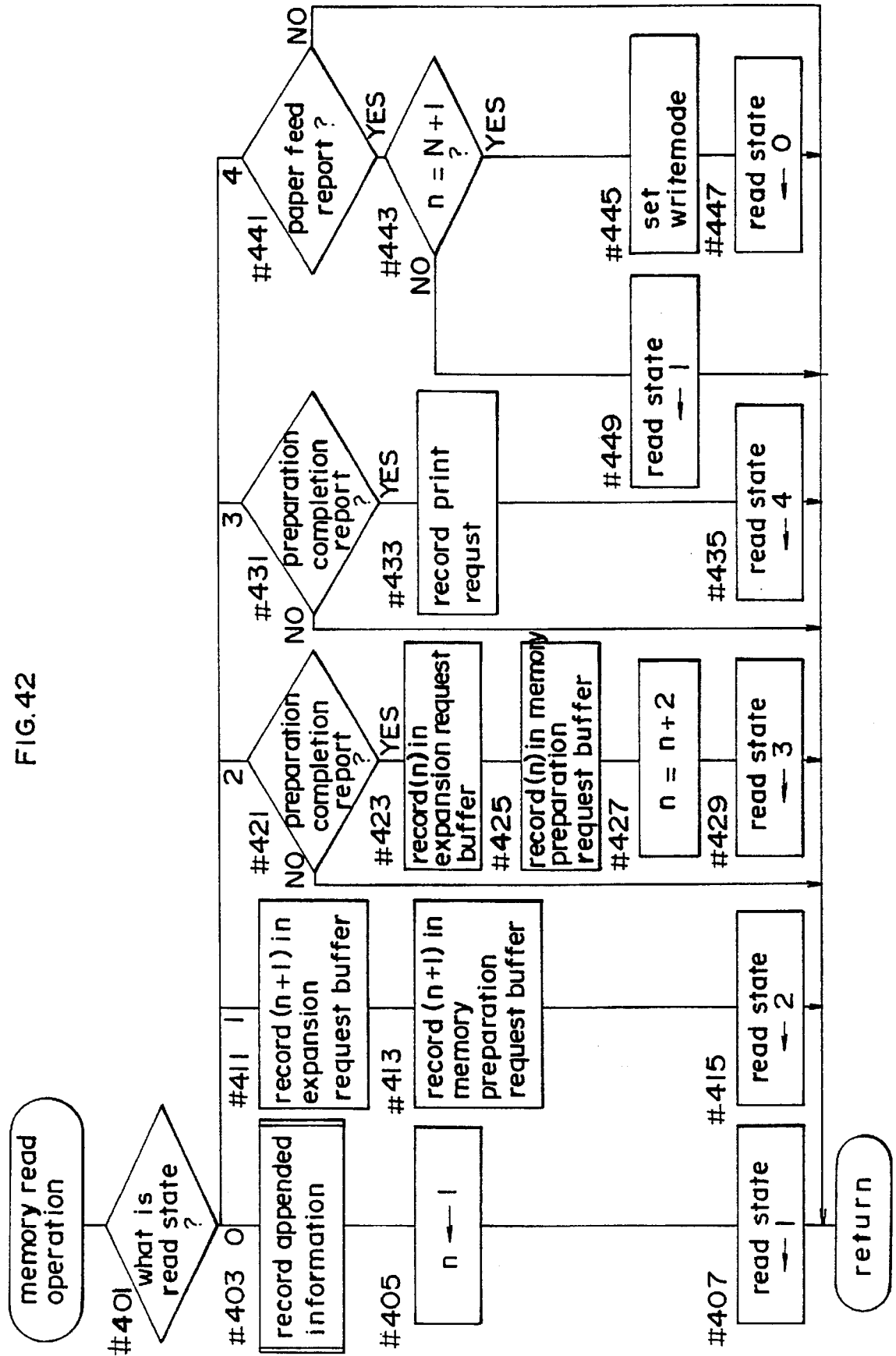
FIG. 42 is a flow chart of the read operation subroutine of the copying apparatus of FIG. 23.

FIG. 42 is a flow chart showing memory read operation subroutine of the command setting subroutine in the two-in-one mode of the document mix auto mode of step #215 of FIG. 40. This subroutine sets the expansion command Q and print command Q so as to determine the output morphology as shown in FIG. 30.

The flow is divided into branches in accordance with the value of the read state of #401, i.e., #403 (when the value is [0]), #411 (when the value is [1]), #421 (when the value is [2]), #431 (when the value is [3]), and #441 (when the value is [4]).

These branches are described below.

(a) Read state=[0]

Information appended to the document management table shown in FIG. 31 is generated by the document size information and copy sheet size for each page recorded in the write operation. At this time, the appended information is prepared based on the copy size information which has been previously transmitted from CPU4. For example, when the vertical length (long edge) of the copy sheet is designated LP, and the vertical length (short edge) of the document is designated LD, the magnification is calculated by (½)×(LP/LD) because the two-in-one mode of the document mix auto mode is set.

Accordingly, in the case of the Nth page of FIG. 30, the copy sheet size is A4 and the document size is A4, such that LP=297 mm and LD=210 mm. Therefore, the value of the appended information is 0.707 because (½)×(LP/LD)= 0.707.

The magnification is calculated as appended information for all read pages as described above. The appended information is used as the magnification when data is readout from image memory 504 when the read state is [1].

Then, variable n expressing the read page is initialized (#405), and the read state is updated (#407).

(b) Read state=[1]

The page number (n+1) is recorded as a parameter in the expansion request buffer (#411), and the appended information magnification for page number (n+1) is recorded as a parameter in the memory preparation request buffer (#413).

Processing identical to that of the write operation command is executed in the aforesaid expansion request buffer and memory preparation request buffer, such that the number of the page to be expanded is known by CPU6 via the expansion request parameter. The magnification of the magnification process is known relative to the expanded data via the parameters of the memory preparation request buffer, and each process is executed. In step #415, the read state is updated.

(c) Read state=[2]

When the memory preparation completion report is received (#421: YES), processing identical to that described in steps #411 and #413 is executed relative to the nth page to prepare to print the document image data of another page (#423, #425). The subsequent read data are set at n=n+2 in step #427, and the read state is updated (#429).

(d) Read state=[3]

When the memory preparation completion report is again received (#431: YES), a print command is stored in the print request buffer (#433), and the read state is updated (#435). The print request buffer is read is read instep #56 (FIG. 36) in the same way as other request buffers, and the data are output.

(e) Read state=[4]

When a paper feed report is received (#441: YES), a check is made to determine whether or not the reading of the previous page is completed in step #443. When reading of the previous page is not yet completed (#443: NO), the read state returns to [1] (#449), and the previously described process is repeated. When the reading of the previous page has been completed (#443: YES), the write mode is set (#445), and the read state is reset (#447).

Figure 43:
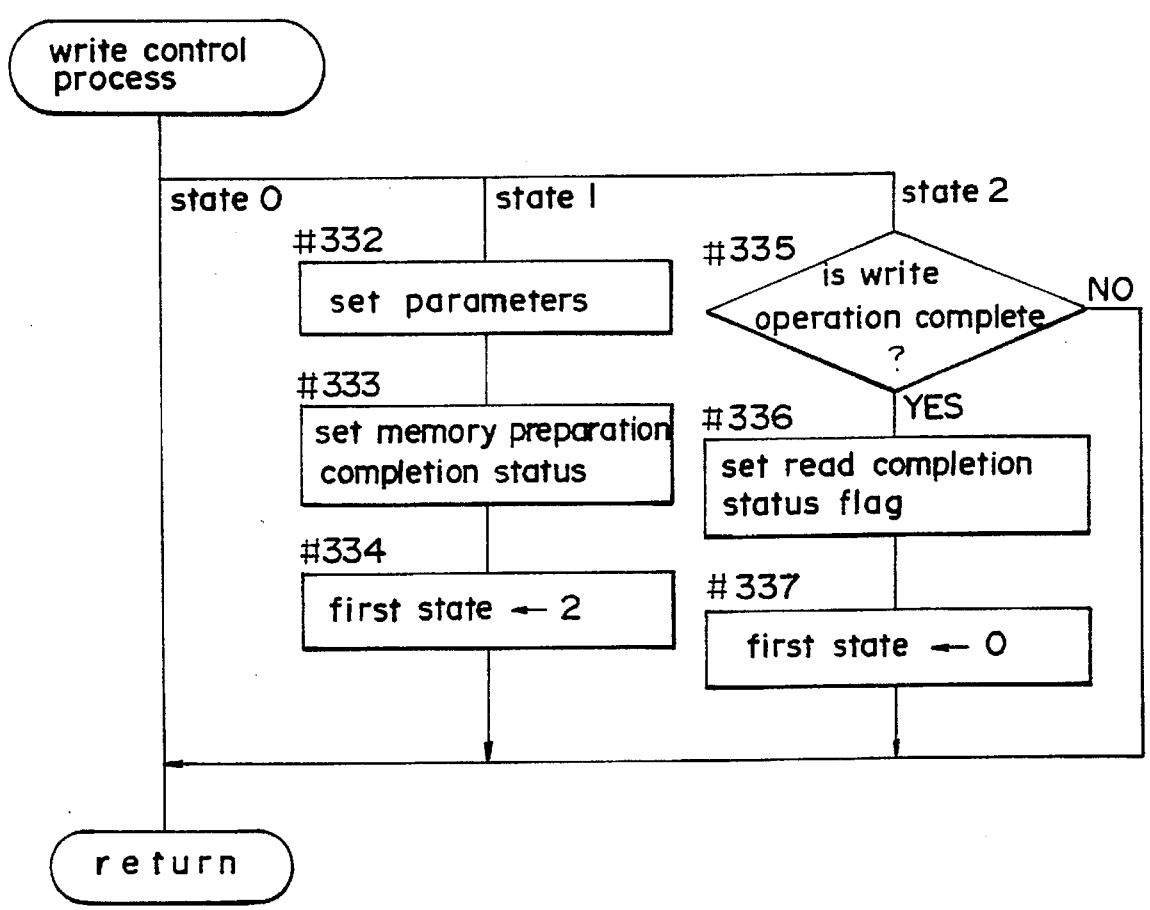
FIG. 43 is a flow chart of the image memory write control subroutine of the copying apparatus of FIG. 23.

FIG. 43 is a flow chart showing the subroutine of the image memory write control of step #64 in FIG. 37. When the read state=[1], a write start address, XY ranges, and image process parameters are set in image memory 504 (#332), the memory preparation completion status is set (#333), and the first state is set at [2] (#334).

When the first state is [2] and writing to image memory 504 is completed (#335: YES), a read completion status flag is set (#336), and the state is set at [0] (#337).

Figure 44:
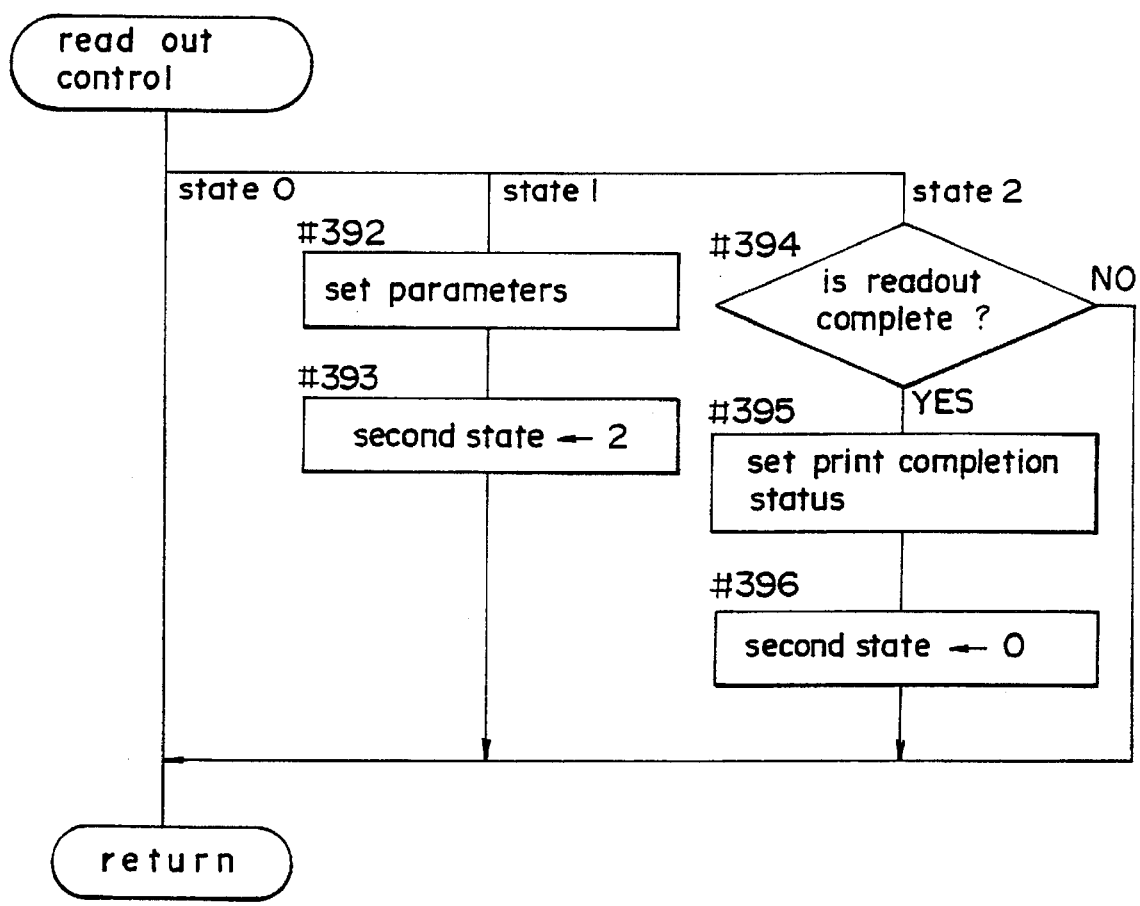
FIG. 44 is a flow chart of the image memory read control subroutine of the copying apparatus of FIG. 23.

FIG. 44 is a flow chart showing subroutine of the image memory readout control of step #67 in FIG. 37. When the second state is [1], a read start address, and data amount and other parameters are set in image memory 504 (#392), and the second state is set at [2] (#393). When the second state is [2] and the readout from image memory 304 is completed (#394: YES), the print completion status is set (#395), and the state is set at [0] (#396).

Figure 45:
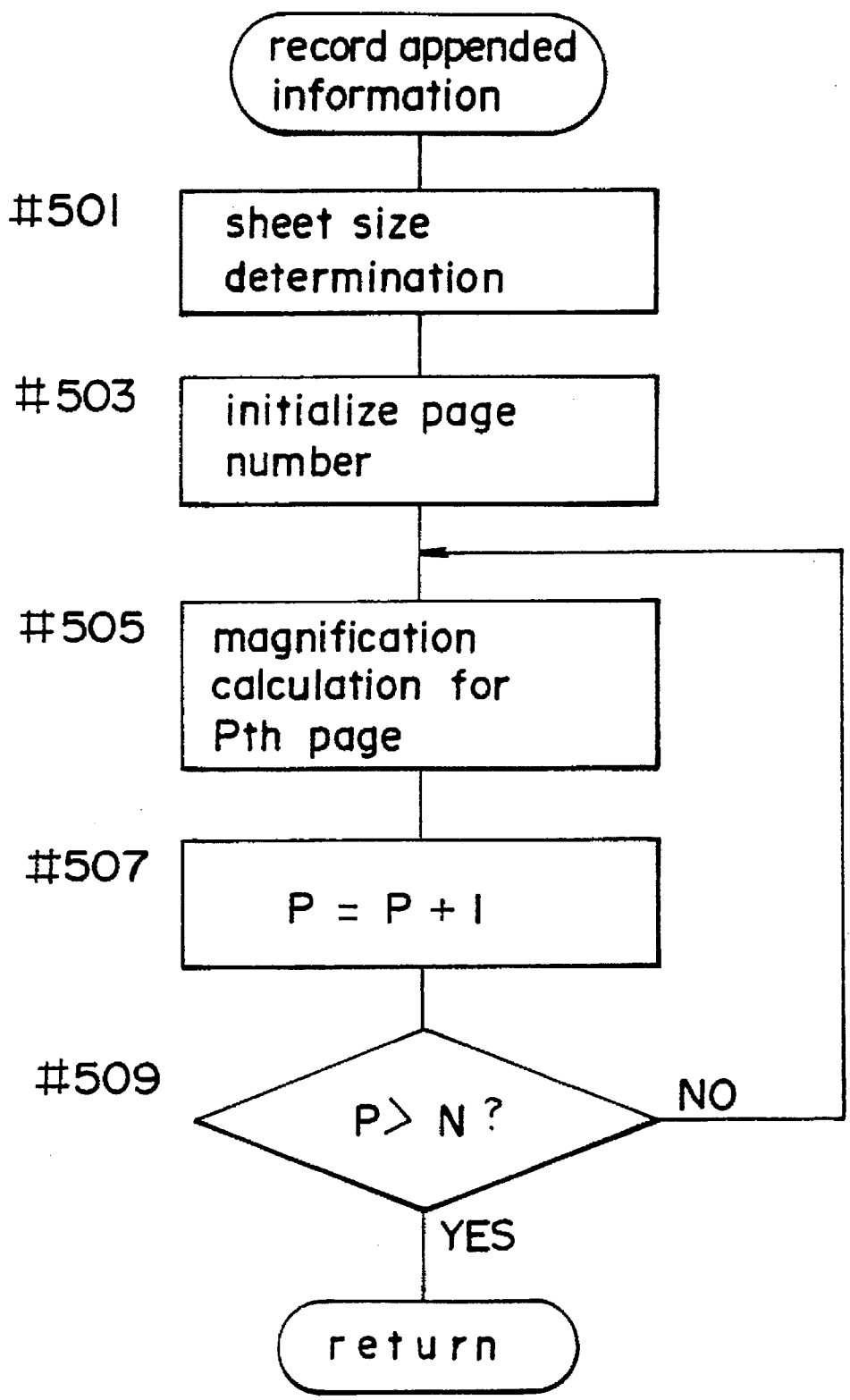
FIG. 45 is a flow chart of the appended information preparation subroutine of the copying apparatus of FIG. 23.

FIG. 45 is a flow chart showing the subroutine of document management table appended information preparation of step #403 in FIG. 42. Referring to FIG. 45, in the appended information preparation subroutine, the copy sheet size necessary for magnification calculations is determined in view of the two-in-one mode (#501). Namely, the copy sheet is divided into two equal parts and the size of the divided copy sheet is determined. The page number P is initialized for appended information preparation (#503). The copy magnification for the Pth page is calculated so that the entire Pth page document can be formed on the divided area on the copy sheet. Then, the page number P is updated (#507), and the process is repeated for all read document pages (#509).

In the previously described embodiment, a plurality of memory chips may be used if the image memory provided in memory unit 230 simultaneously and independently executes read and write operations. In such circumstances, the memory capacity of individual chips may be small.

Furthermore, a single memory chip with area divisions also may be used. Although binary compression is used in the preceding examples, multi-level compression also may be used. In such circumstances, similar effectiveness can be achieved relative to medium contrast images.

The circuit construction of the control section 300 comprising the essential core of memory unit 30 in the previously described embodiment (i.e., contents of processes executed by CPU1–CPU7, process apportionment, software construction, construction of other parts of copying apparatus and the like) may be variously modified insofar as said modifications do not depart from the scope of the present invention.

Third Embodiment

A third embodiment of the present invention is described hereinafter. In the third embodiment, the construction of the digital copying apparatus is substantially similar to that of the second embodiment; points of departure are described below.

The third embodiment uses a two-in-one mode setting key 298 and cover page mode setting key 299 provided on operation panel OP shown in FIG. 24. When the two-in-one mode is set using key 298, two-in-one flag F1 is set. When the two-in-one flag F1 is set, the document image of two surfaces are output in an arrangement on one surface of a copy sheet, as described in the previous embodiment.

When the cover mode is set using key 299, cover page flag F2 is set when cover page flag F2 is set, the first page of the document is copied to a cover sheet and the final page of the document is copied to a back cover page using, for example, copy paper of a different color for the intermediate pages therebetween, e.g., copy sheets of a specific color.

Figure 46:
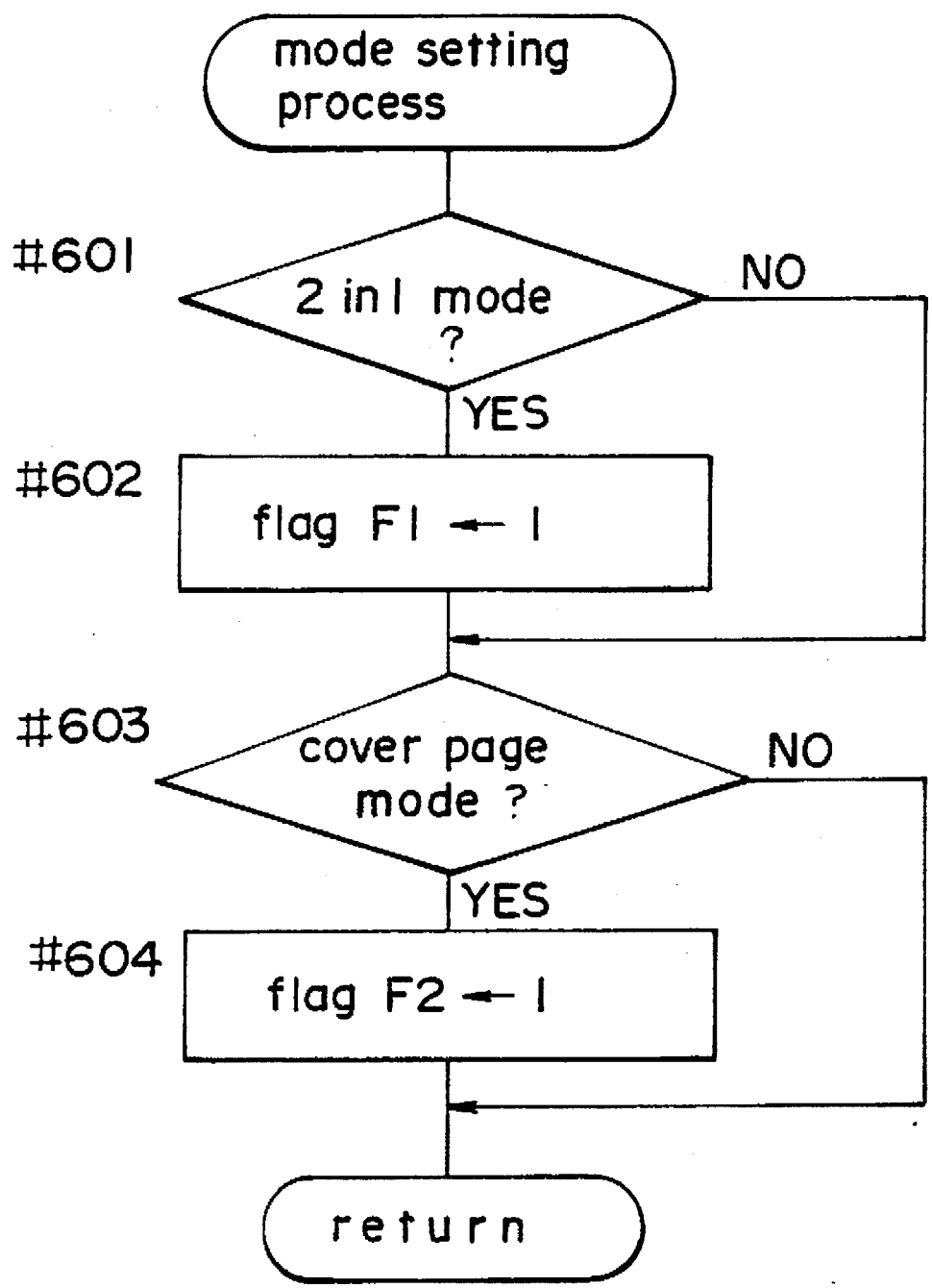
FIG. 46 is a flow chart showing the operation panel mode settings of the copying apparatus of FIG. 23.
Figure 47:
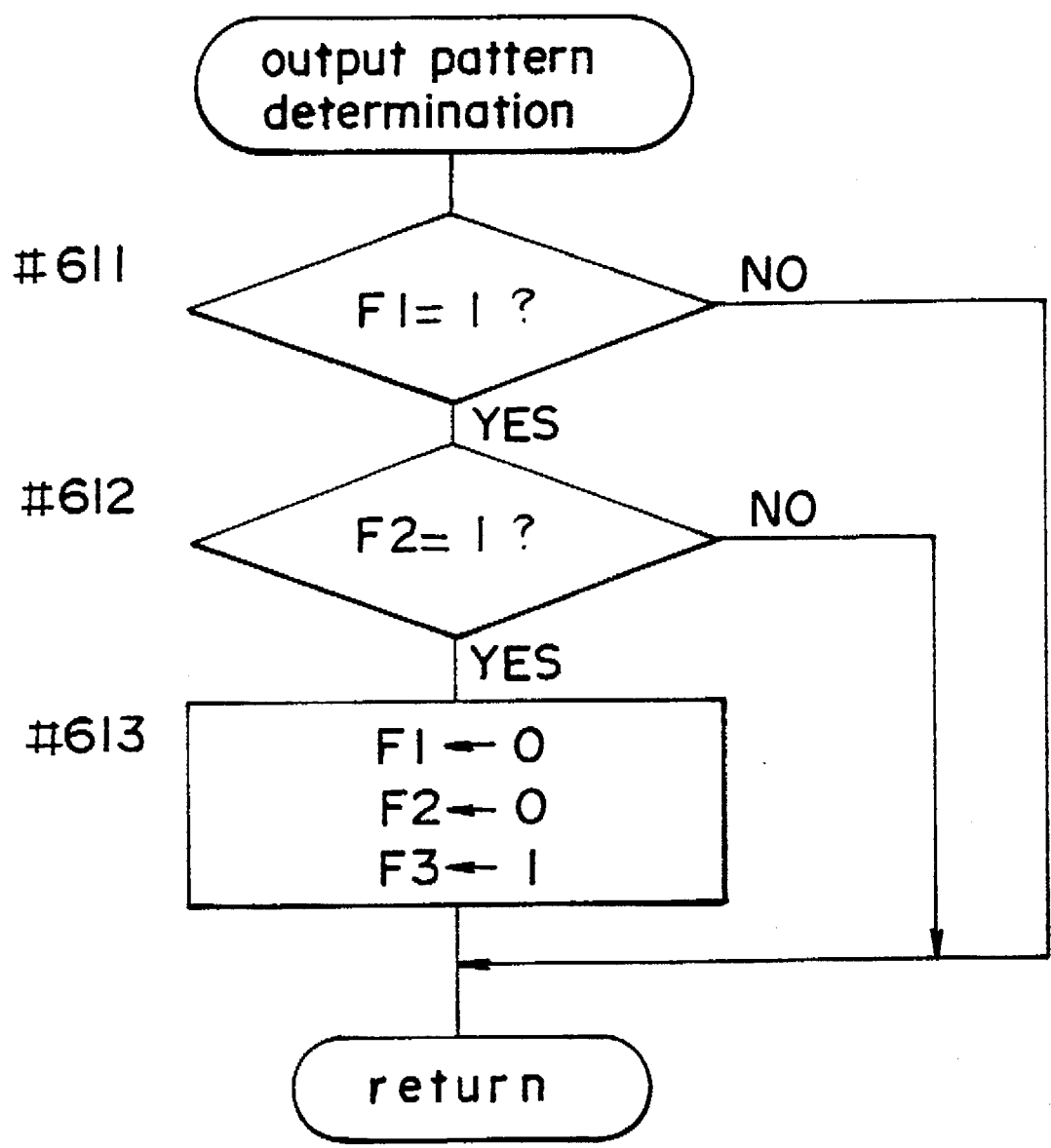
FIG. 47 is a flow chart showing the output pattern determination of the copying apparatus of FIG. 23.

FIG. 46 is a flow chart showing the flag set state of the second embodiment. FIG. 47 is a flow chart showing the output pattern determination. Referring to FIG. 46, when the two-in-one mode is set (#601), flag F1 is set as previously described. When the cover page mode is set (#603), cover page flag F2 is set.

Referring to FIG. 47, when the two-in-one mode and cover page mode are both set, i.e., when flag F1 and flag F2 are both set (#611, #612: YES), said flags F1 and F2 are reset, and the two-in-one/cover page flag F3 is set (#613).

Figure 48:
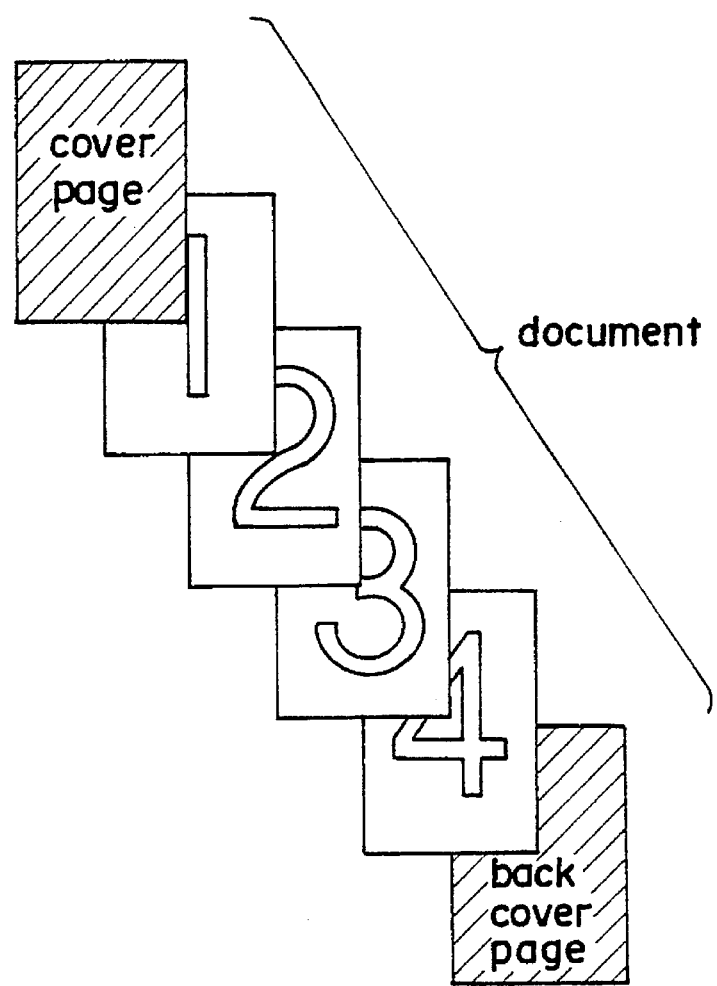
FIG. 48 is an illustration showing the document arrangement of another embodiment of the copying apparatus of FIG. 23.
Figure 49:
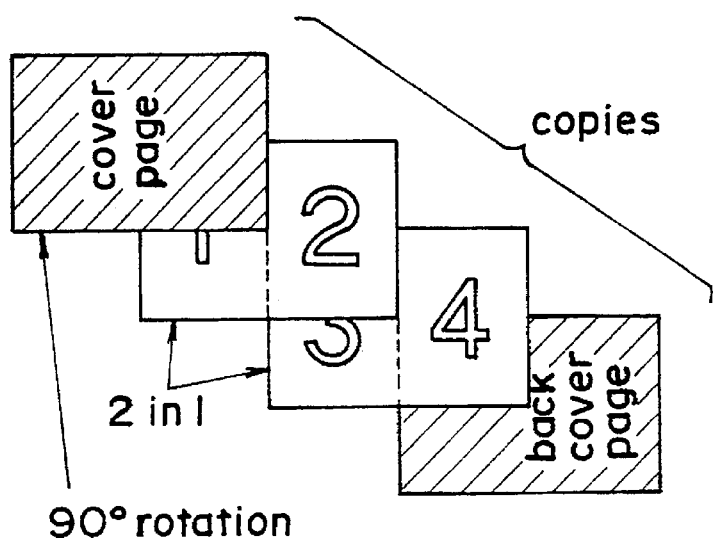
FIG. 49 is an illustration showing an example of the copy sheet output in the embodiment of FIG. 48.

FIGS. 48 and 49 respectively show the original documents and the resulting output copies in the second embodiment of the present invention. Referring to FIGS. 48 and 49, when flag F3 is set indicating that the two-in-one mode and cover page mode are simultaneously selected, the first page of an original document comprising a plurality of pages (six pages in the drawings) is copied to a cover page and the final page of said document is copied to a back cover page, as shown in FIG. 49, wherein a copy sheet of a different color, i.e., a color copy sheet, is used as the cover page. In such a circumstance, although the setting are achieved in the same manner as the two-in-one mode, the cover page and back cover page are handled strictly separately from the intervening pages therebetween (pages 1–4 of the original document), such that two-in-one copying is not executed.

That is, the image of one surface of the original document relating to the cover page and back cover page is copied to one surface of a copy sheet, whereas two-in-one copying is executed for the intervening pages of the original document (pages 2–5 in the drawing). The result, as shown in FIG. 49, is that the cover page and back cover page are output in a state rotated 290 from the state of the original document.

The original documents are all placed at the A4 horizontal position, and copied to a copy sheet in the A4 vertical position. Image magnification, rotation and the like, are identical to that described in the second embodiment.

The operation of the third embodiment is described by way of specific examples hereinafter.

In the third embodiment, the digital copying apparatus 201 is provided with four selectable paper supply portions. Cover page copy sheets are set in the first supply portion in a vertical direction; cover page copy sheets are set in a second supply portion in a horizontal direction; normal copy sheets are set in a third supply portion in a vertical direction; and normal copy sheets are set in a fourth supply portion in a horizontal direction.

If a cover page document flag F4 is provided and the first page and last page of the original document are the cover page and back cover page, the cover page document flag F4 is set, whereas if the first and last pages of the document are not cover and back cover pages, flag F4 is reset. If a horizontal cover page document flag F6 is provided, this flag is set if the original document is a horizontal document, whereas said flag is reset if the document is a vertical document.

Figure 50:
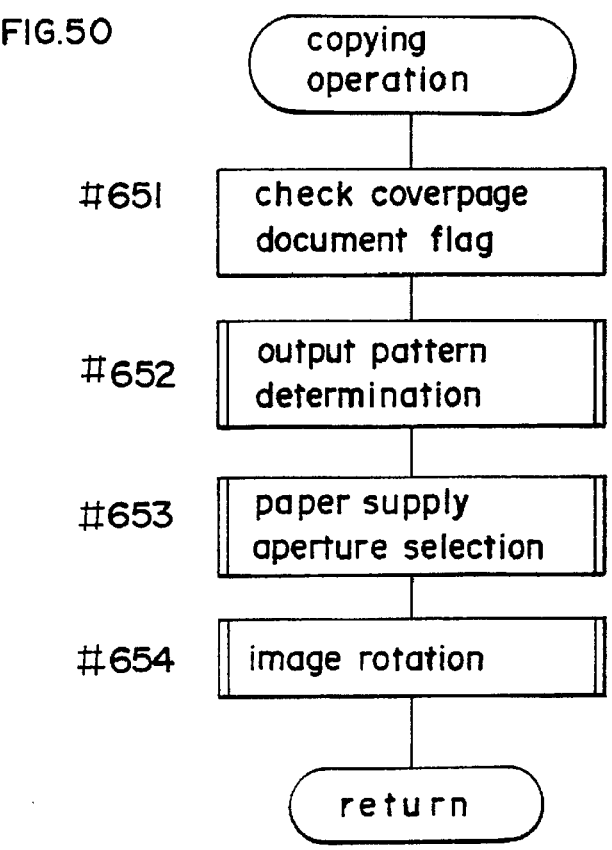
FIG. 50 is a flow chart of the copy operation of the embodiment of FIG. 48.

FIG. 50 is a flow chart showing the copy operation of the third embodiment. Referring to FIG. 50, in the copy operation, the settings of the cover page document flag F4 and vertical cover page flag F6 are verified (#651). Then, the output pattern is determined (#652), paper supply portion selection is executed (#653), and image rotation is executed.

Figure 51:
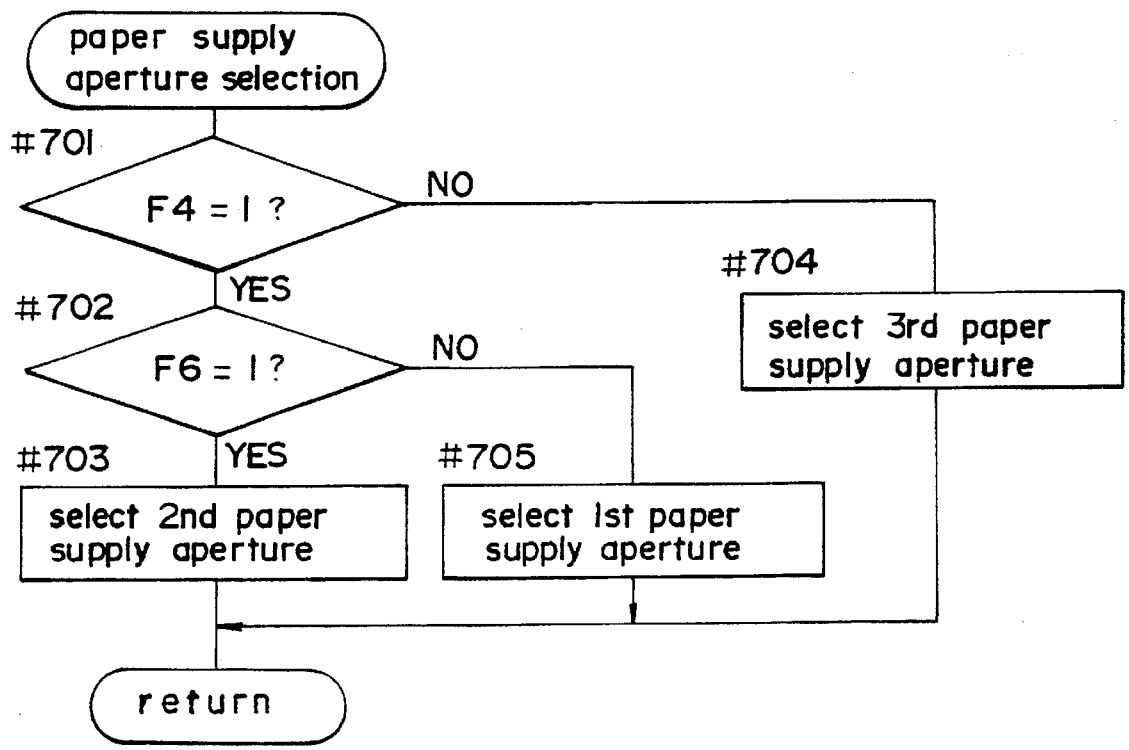
FIG. 51 is a flow chart of a paper supply portion selection.

FIG. 51 is a flow chart showing the paper supply portion selection subroutine. Paper portion selection is described hereinafter with reference to FIG. 51. When the document requiring a cover page is a horizontal document (#701, #702: YES), the second supply portion is selected to select the horizontal cover page copy sheet (#703). If the cover page document is vertical (#701: YES; #702: NO), the first supply portion is selected to select a vertical cover page copy sheet (#705). When the document is not a cover page, (#701: NO), the third supply portion is selected to select vertical normal copy sheets (#704).

Figure 52:
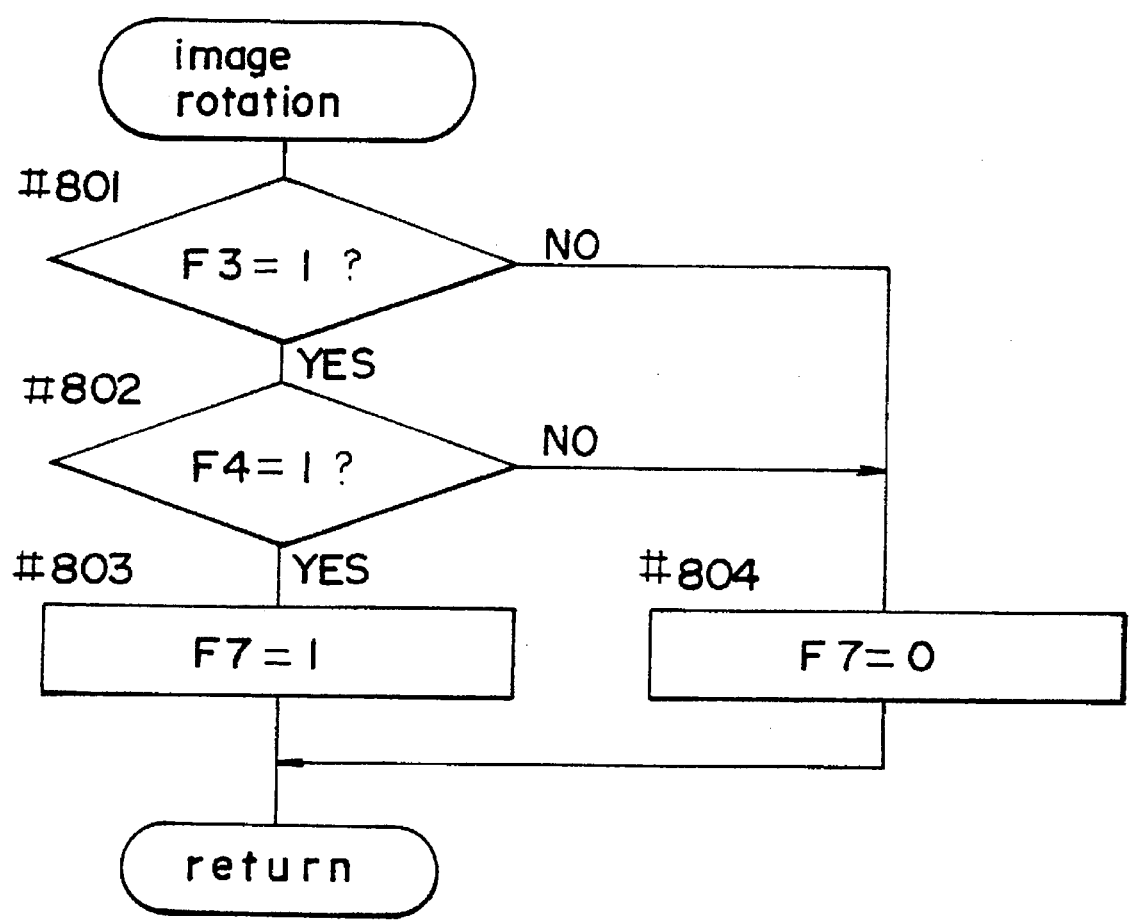
FIG. 52 is a flow chart showing image rotation.

FIG. 52 is a flow chart showing image rotation. In the present embodiment, an image rotation flag F7 is provided in addition to the previously described two-in-one cover page mode flag F3, and cover document flag F4. Referring to FIG. 52, when the two-in-one cover page mode flag F3 is set, and cover document flag F4 is set (#801, #802: YES), the image rotation flag F7 is set (#803). When either the two-in-one cover page mode flag F3 or the cover document flag F4 is not set, the image rotation flag F7 is reset (#801: NO; #802: NO; #804). When the image rotation flag F7 is set, the image is rotated 90° and copied.

Thus, the present invention provides, in a digital copying apparatus capable of copying a plurality of original documents on a single copy sheet, an apparatus capable of producing copies as desired by a user.

The image forming apparatus of the present invention is not limited to the previously described embodiments and may be modified insofar as said modifications do not depart from the scope of the invention.

What is claimed is:

1. An image forming apparatus which divides a copy sheet into a plurality of copy areas and copies a plurality of original documents on the respective divided copy areas of the copy sheet, said image forming apparatus comprising:

a detector which detects a size of each of the original documents to be copied, said original documents being different from each other in size;

determining means for determining a copy magnification for each of the original documents so that an entire area of the original document matches a respective one of said copy areas, said determined copy magnifications being different from each other depending on a difference in the sizes of the documents;

a memory which stores a table which shows the determined different copy magnifications for each of the original documents; and image forming means for forming images of the original documents on a single surface of the copy sheet in accordance with the table stored in said memory.

2. An image forming apparatus as claimed in claim 1, wherein said image forming means includes a reader which reads an image of the original documents to generate image data, and a printer which prints the image of the original documents on the copy sheet in response to said generated image data.

3. An image forming apparatus which copies a first image and a second image having a size different from a size of the first image on first and second copy areas of a single surface of a sheet, said image forming apparatus comprising:

a detector which detects the size of the first image and the size of the second image;

determining means for determining a first magnification based on the detected size of the first image so that an entire area of the magnified first image matches said first copy area, the determining means also determining a second magnification based on the detected size of the second image so that an entire area of the magnified second image matches said second copy area; and image forming means for forming a copy of the magnified first image on the first copy area with the first magnification and for forming a copy of the magnified second image on the second copy area with the second magnification which is different than the first magnification.

4. The image forming apparatus as claimed in claim 3 wherein said first and second copy areas have the same size.

5. The image forming apparatus as claimed in claim 4 wherein said first copy area is half of the single surface of the sheet and said second copy area is another half of the single surface of the sheet.

6. An image forming method for forming a plurality of original images on a respective plurality of copy areas of a single surface of a sheet, said image forming method comprising the steps of:

detecting a size of each of the original images to be formed, said original images to be formed on the single surface of the sheet being different from each other in size;

determining a magnification ratio for each of the original images so that an entire area of the original image matches a respective one of said copy areas of the sheet, said determined magnifications being different from each other depending on the difference of sizes of the original images; and reducing or enlarging the original images in accordance with the determined magnification ratio and respectively forming the reduced or enlarged images on said respective copy areas of the single surface of the sheet.

7. The image forming method as claimed in claim 6 further comprising the step of forming a table which shows the determined magnification ratio for each of the original images.

* * * * *